United States Patent
Wang et al.

(10) Patent No.: US 11,356,011 B2
(45) Date of Patent: Jun. 7, 2022

(54) COMMON MODE (CM) ELECTROMAGNETIC INTERFERENCE (EMI) FILTERS FOR REDUCING RADIATED EMI IN POWER CONVERTERS

(71) Applicant: University of Florida Research Foundation, Incorporated, Gainesville, FL (US)

(72) Inventors: Shuo Wang, Gainesville, FL (US); Juntao Yao, Gainesville, FL (US); Yiming Li, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 17/103,062

(22) Filed: Nov. 24, 2020

(65) Prior Publication Data

US 2021/0194348 A1 Jun. 24, 2021

Related U.S. Application Data

(60) Provisional application No. 63/083,698, filed on Sep. 25, 2020, provisional application No. 62/950,268, filed on Dec. 19, 2019.

(51) Int. Cl.
*H02M 1/12* (2006.01)
*H02M 7/217* (2006.01)

(52) U.S. Cl.
CPC ........... *H02M 1/126* (2013.01); *H02M 7/217* (2013.01); *H02M 1/123* (2021.05)

(58) Field of Classification Search
CPC ....... H02M 1/123; H02M 1/126; H02M 7/217
See application file for complete search history.

(56) References Cited

U.S. PATENT DOCUMENTS

| 8,917,042 | B2* | 12/2014 | Becerra | H02P 29/50 |
| | | | | 318/400.24 |
| 9,042,132 | B2 | 5/2015 | Richards et al. | |
| 9,350,231 | B2* | 5/2016 | Wu | H02M 1/44 |
| 9,674,907 | B1* | 6/2017 | Xiong | H02M 1/4208 |
| 2004/0062064 | A1* | 4/2004 | Pelly | H02M 1/126 |
| | | | | 363/100 |
| 2012/0163056 | A1* | 6/2012 | Busch | H02M 1/4225 |
| | | | | 363/128 |

(Continued)

*Primary Examiner* — Gary A Nash
(74) *Attorney, Agent, or Firm* — Alston & Bird LLP

(57) ABSTRACT

Provided are examples of electromagnetic interference (EMI) filters for reducing radiated EMI in power converters. An example EMI filter includes a common mode (CM) choke located on an input cable connected to a first side of a converter a first set of Y-capacitors located between a primary ground (PGND) node of the converter and a secondary ground (SGND) node of the converter, and a second set of Y-capacitors located between the first side of the converter and the SGND node. A first shielding may be connected to the SGND node. One or more additional shieldings may be inside the first shielding and connected to one of the PGND node or the SGND node. The converter may be one or more of an isolated converter, an LLC resonant power converter, a Flyback converter, a forward converter, or a push-pull power converter.

26 Claims, 47 Drawing Sheets

(56) References Cited

U.S. PATENT DOCUMENTS

| | | | | |
|---|---|---|---|---|
| 2013/0114305 A1* | 5/2013 | Ide | ............ | H02M 1/32 363/17 |
| 2016/0204754 A1* | 7/2016 | Kawamura | .......... | H03H 7/0115 333/184 |
| 2017/0288575 A1* | 10/2017 | Kitada | ............ | H02M 1/126 |
| 2018/0007785 A1* | 1/2018 | Kamikura | ............ | H02M 7/48 |

* cited by examiner

COMMON MODE (CM) ELECTROMAGNETIC INTERFERENCE (EMI) FILTERS FOR REDUCING RADIATED EMI IN POWER CONVERTERS

CROSS-REFERENCE TO RELATED APPLICATIONS

The present application claims priority to U.S. Provisional Application Ser. No. 63/083,698, titled "COMMON MODE (CM) ELECTROMAGNETIC INTERFERENCE (EMI) FILTERS FOR REDUCING RADIATED EMI IN POWER CONVERTERS," filed Sep. 25, 2020, and to U.S. Provisional Application Ser. No. 62/950,268, titled "NEW COMMON MODE (CM) ELECTROMAGNETIC INTERFERENCE (EMI) FILTERS FOR REDUCING RADIATED EMI IN POWER CONVERTERS," filed Dec. 19, 2019, the entire contents of both of which are incorporated herein by reference.

TECHNICAL FIELD

The present application relates generally to the field of electromagnetic interference filters, and more specifically to common mode (CM) electromagnetic interference (EMI) filters for reducing radiated EMI in power converters.

BACKGROUND

In modern power electronics, fast-switching Gallium-Nitride (GaN) devices can operate at the switching frequencies higher than conventional Si MOSFETs, so they help significantly reduce the size of passive components and increase power density. The active clamp flyback (ACF) converter is a ZVS soft-switching topology, which recycles the energy stored in leakage inductance to improve conversion efficiency. Working with GaN devices, the ACF converter operating at several hundred kHz to 1 MHz could be a game-changer for high power-density and high-efficiency power adapters.

With ever-increasing development of high switching frequency and high-power density of power electronics, electromagnetic interference has become more and more serious. For power electronics applications including power adapters and electric vehicles, and specially for isolated converter and other converters with long cables attached, common mode current is a major radiation source. Accordingly, common mode current along the cables can be a measure of the radiated emission. The common mode noise is a result of pulsating noise voltage distributed on the transformer windings, and then generating interwinding displacement current. Therefore, the common mode current can flow through the transformer parasitic from the primary side to the secondary side.

Fast-switching GaN devices lead to high switching noise especially radiated EMI. Also, high power-density layout leads to near field couplings which degrade EMI filter performance. Radiated EMI of a power converter has been analyzed: the long power cables attached to the power converter behave like an antenna driven by the noise generated by the power converter; in isolated power converters, the antenna can be driven by the voltage difference between the primary ground (PGND) and the secondary ground (SGND), which is mainly caused by the unbalanced transformer parasitics. Radiated EMI can be suppressed by reducing the common mode (CM) currents flowing between transformer primary and secondary windings. Techniques such as CM chokes with high-frequency (HF) lossy magnetic cores and coaxial shielding winding transformers can help reduce the radiated EMI; however, due to the parasitics such as parasitic capacitance and inductance, their HF performance has much to desire. In a high power-density design, near field couplings can degrade EMI filter performance, so it is important to investigate the couplings within converters.

Through applied effort, ingenuity, and innovation, the inventors have developed concepts for the use of techniques to reduce capacitive couplings and radiated EMI—embodiments of which are detailed herein.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
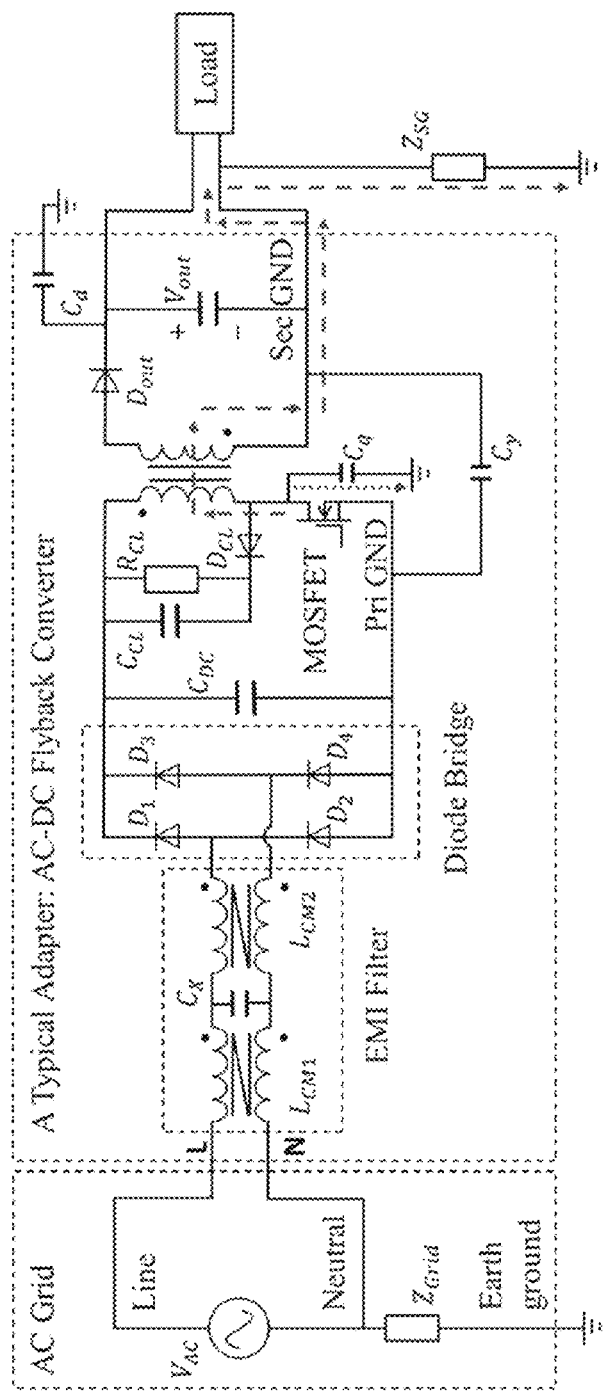
FIG. 1 illustrates a conventional CM EMI filter including a CM choke and a single set of Y-caps.

In accordance with common practice some features illustrated in the drawings cannot be drawn to scale. Accordingly, the dimensions of some features can be arbitrarily expanded or reduced for clarity. In addition, some of the drawings cannot depict all the components of a given system, method or device. Finally, like reference numerals can be used to denote like features throughout the specification and figures.

SUMMARY

Provided are examples of electromagnetic interference (EMI) filters for reducing radiated EMI in power converters. An example EMI filter includes a common mode (CM) choke located on an input cable connected to a first side of a converter a first set of Y-capacitors located between a primary ground (PGND) node of the converter and a secondary ground (SGND) node of the converter, and a second set of Y-capacitors located between the first side of the converter and the SGND node. A first shielding may be connected to the SGND node. One or more additional shieldings may be inside the first shielding and connected to one of the PGND node or the SGND node. The converter may be one or more of an isolated converter, an LLC resonant power converter, a Flyback converter, a forward converter, or a push-pull power converter.

DETAILED DESCRIPTION

Reference will now be made in detail to embodiments, examples of which are illustrated in the accompanying drawings. In the following detailed description, numerous specific details are set forth in order to provide a thorough understanding of the some described embodiments. However, it will be apparent to one of ordinary skill in the art that the some described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe some elements, these elements should not be limited by these terms. These terms are only used to distinguish one element from another. For example, a first contact could be termed a second contact, and, similarly, a second contact could be termed a first contact, without departing from the scope of the some described embodiments. The first contact and the second contact are both contacts, but they are not the same contact, unless the context clearly indicates otherwise.

The terminology used in the description of the some described embodiments herein is for the purpose of describing particular embodiments only and is not intended to be limiting. As used in the description of the some described embodiments and the appended claims, the singular forms "a," "an," and "the" are intended to comprise the plural forms as well, unless the context clearly indicates otherwise. It will also be understood that the term "and/or" as used herein refers to and encompasses any and all possible combinations of one or more of the associated listed items. It will be further understood that the terms "comprises," "comprising," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming but would nevertheless be a routine undertaking for those of ordinary skill in the art of image capture having the benefit of this disclosure.

Figure 2:
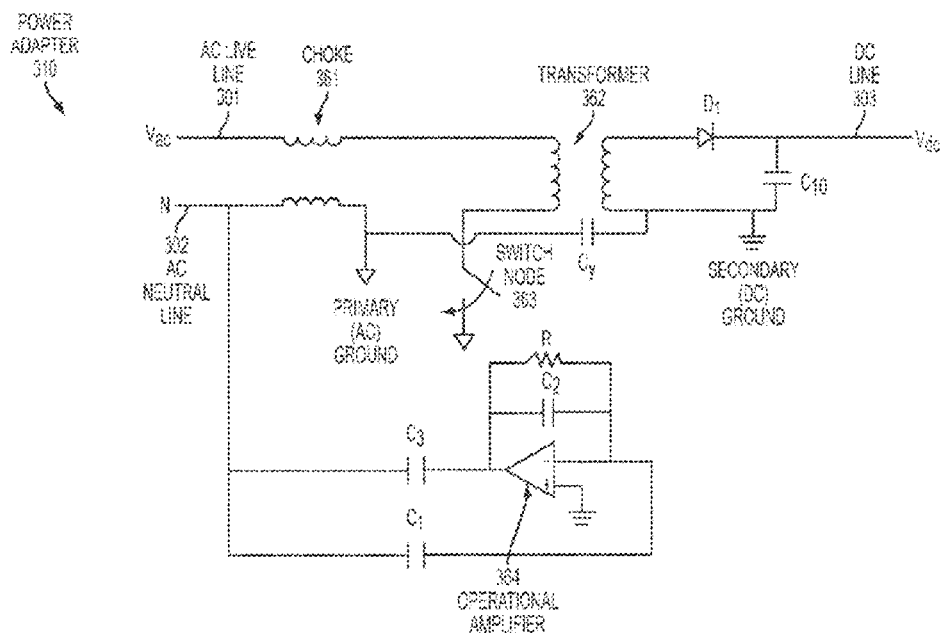
FIG. 2 illustrates a conventional noise suppression circuit for a power adapter.
Figure 3:
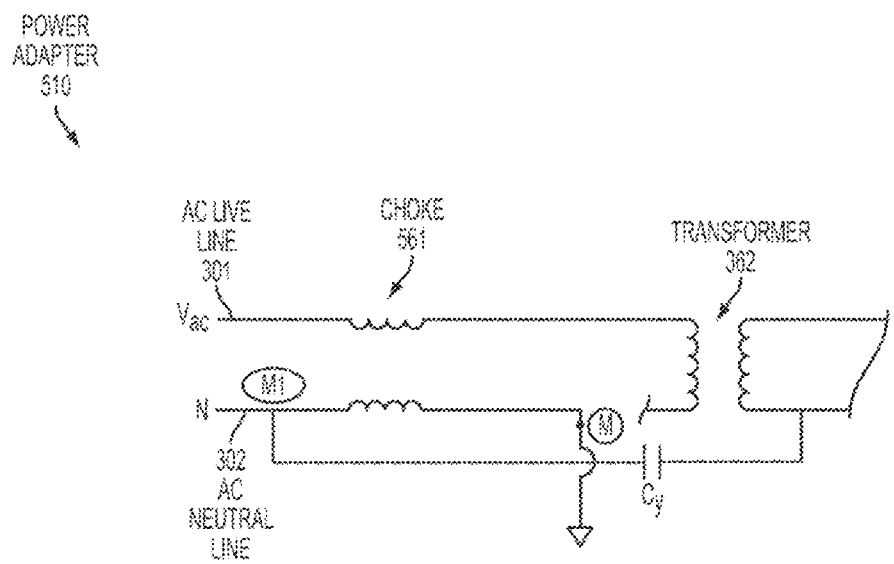
FIG. 3 illustrates a conventional noise suppression circuit for a power adapter employing a modified Y capacitor to suppress induced noise in the adapter.

Traditional common mode electromagnetic interference filers include a common mode choke and only one set of Y-caps. Moreover, traditional Y-cap strategy usually only has one set of Y-caps, and the Y-caps are connected to the primary and the secondary ground. The electromagnetic interference filter discloses using more than one set of Y-caps. Various embodiments disclose different architectures to further reduce the common mode current. Common mode (CM) noise current flows in the same direction on both power conductors and returns via the ground conductor and can be suppressed by the use of inductors within an EMI filter that are placed in series with each power line and by Y-capacitors that are connected from both power line conductors to ground. Differential mode (DM) current flows through one ac conductor and returns along another and can be suppressed by the filter which contains an inductor in series and X-capacitors connected in parallel between the two current carrying conductors. Generally, EMI filters are employed so that the end-product complies with the applicable standards. FIG. 1 illustrates a conventional CM EMI filter including a CM choke and a single set of Y-caps. FIG. 2 illustrates a conventional noise suppression circuit for a power adapter. FIG. 3 illustrates a conventional noise suppression circuit for a power adapter employing a modified Y capacitor to suppress induced noise in the adapter.

Embodiments of the present disclosure relate to the modeling and reduction of radiated EMI. An initial model is developed for the radiated EMI. The impact of the capacitive couplings on the radiated EMI are identified and analyzed. An improved radiated EMI model is then developed and presented to characterize the impact of the capacitive couplings. Techniques to reduce capacitive couplings and the radiated EMI are presented and verified. The investigation herein is based on a 60 W GaN IC-based ACF power adapter.

Figure 4:
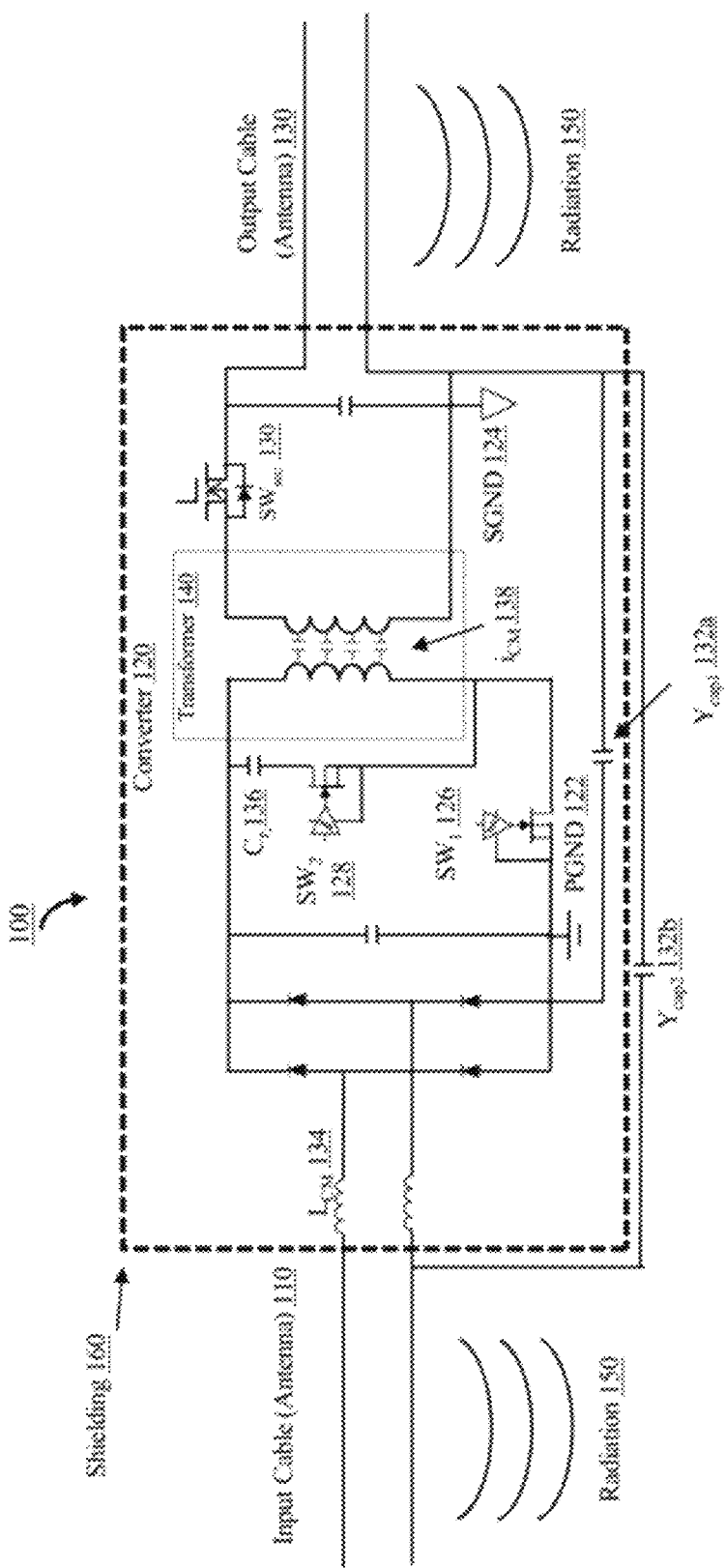
FIG. 4 illustrates a block diagram of an example EMI filter system, in accordance with some embodiments.

Referring to FIG. 4, a block diagram of an example electromagnetic interference (EMI) filter system 100 is illustrated, in accordance with some embodiments. In some embodiments, the EMI filter system 100 comprises an input cable 110, a converter 120 and an output cable 130. In some embodiments, the input cable 110 and the output cable 120 form an antenna. In some embodiments, the converter is coupled to the antenna via the input cable 110 and the output cable 120. The converter 120 is coupled on one side to the input cable 110, and on another side to the output cable 130. In some embodiments, the converter 120 comprises a primary ground (PGND) node 122, a secondary ground (SGND) node 124, a first switch (SW1) 126, a second switch (SW2) 128, a secondary switch (SWsec) 130, a first set of Y-capacitors (Ycap1) 132a, a second set of Y-capacitors (Ycap2) 132b, a common mode (CM) choke (LCM) 134, and a capacitor Cr 136. In some embodiments, the converter 120 is coupled to a transformer 140. As shown on FIG. 4, radiation 150 is emitted as a result of the current passing through the input cable 110, the converter 120 and the output cable 130. In some embodiments, the first switch (SW1) 126 is a main switch of the power converter 120. In some embodiments, the second switch (SW2) 128 is a clamping switch. In some embodiments, the secondary switch (SWsec) 130 is a secondary side switch. In some embodiments, the PGND node 122 is a primary ground in the power converter 120. In some embodiments, the SGND node 124 is a secondary ground in the power converter 120. In some embodiments, a shielding 160 covers the converter 120 to further reduce radiation emission 150. In some embodiments, a current $i_{CM}$ 138 flows inside the transformer 140.

In some embodiments, the first set of Y-capacitors are located between the PGND 122 node of the converter and the SGND 124 node of the converter 120. In some embodiments, the second set of Y-capacitors 132b are located between a first side of the converter 120, i.e., an AC side of the converter 120, and the SGND 124 node. In some embodiments, a first node on the input cable 110 to which the second set of Y-capacitors 132b is connected is farther away from the converter 120 than a second node on the input cable 110 to which the CM choke 134 is connected. In some embodiments, the CM choke 134 is located on the input cable 110 and is connected to the AC side of a converter 120. In some embodiments, the converter 120 is connected to the output cable 130 on a second side of the converter 120.

In some embodiments, the CM choke 134 withstands high DC currents without degradation of filtering performance. The CM choke 134 reduces noise over the entire desired frequency range. In some embodiments, the CM choke 134 is an electrical filter that blocks high frequency noise common to two or more data or power lines while allowing the desired DC or low-frequency signal to pass. The CM noise current is typically radiated from sources such as unwanted radio signals, unshielded electronics, inverters and motors. Left unfiltered, this noise presents interference problems in electronics and electrical circuits. In normal or differential mode (single choke), current travels on one line in one direction from the input cable 110 to the output cable 130, through the converter 120, and in the opposite direction on the return line that completes the circuit. In common mode, the noise current travels on both lines in the same direction. In some embodiments, the CM choke 134 has two or more windings arranged such that the common mode current creates a magnetic field that opposes any increase in common mode current. In common mode, the current in a group of lines travels in the same direction so the combined magnetic flux adds to create an opposing field to block the noise. On the other hand, in differential mode, the current travels in opposite directions and the flux subtracts or cancels out so that the field does not oppose the normal mode signal.

In some embodiments, one or more of the first set of Y-capacitors 132a or the second set of Y-capacitors 132b comprise a safety capacitor. In some embodiments, the EMI filter system 100 further comprises the shielding 160 connected to the SGND node 122. The shielding 160 may comprise a metal foil. In some embodiments, the metal foil comprises a copper foil. In some embodiments, the converter 120 comprises a pi-type converter. In some embodiments, the converter 120 comprises an isolated converter. In some embodiments, the converter 120 comprises an isolated LLC resonant power converter. In some embodiments, the converter 120 comprises an isolated push-pull power converter. In some embodiments, the converter 120 comprises an isolated Flyback converter. In some embodiments, the converter 120 comprises an isolated Forward converter. In some embodiments, the converter 120 comprises an isolated push-pull power converter.

Figure 5:
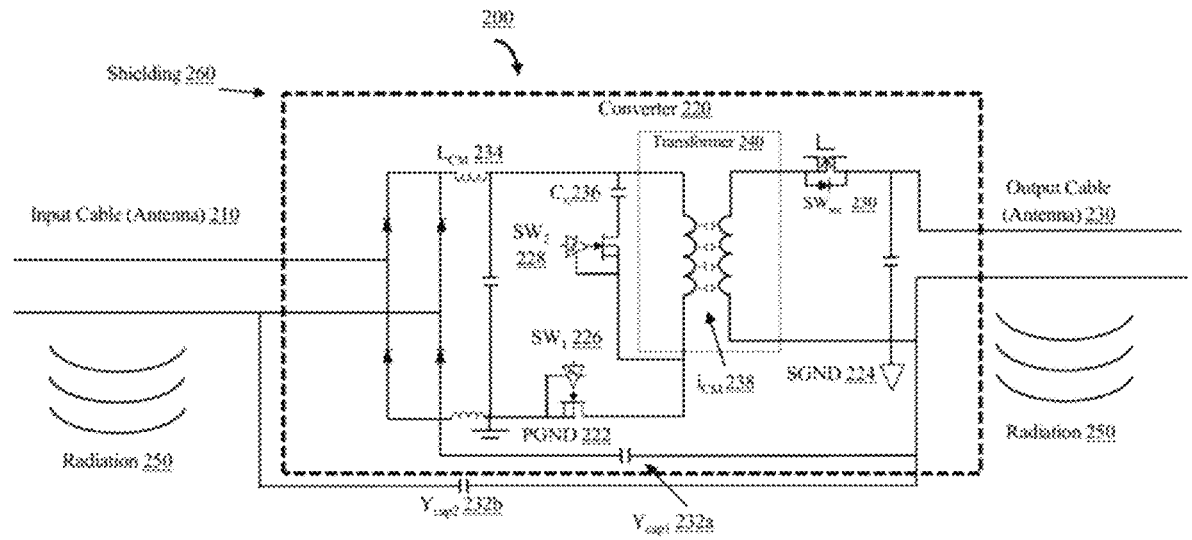
FIG. 5 illustrates a block diagram of an example EMI filter system, in accordance with some embodiments.

FIG. 5 illustrates a block diagram of an example EMI filter system, in accordance with some embodiments. In some embodiments, the EMI filter system 200 comprises an input cable 210, a converter 220 and an output cable 230. In some embodiments, the input cable 210 and the output cable 230 form an antenna. In some embodiments, the converter 220 is couples to the antenna via the input cable 210 and the output cable 230. The converter 220 is coupled on one side to the input cable 210, and on another side to the output cable 230. In some embodiments, the converter 220 comprises a primary ground (PGND) node 222, a secondary ground (SGND) node 224, a first switch ($SW_1$) 226, a second switch (SW2) 228, a secondary switch ($SW_{sec}$) 230, a first set of Y-capacitors ($Y_{cap1}$) 232a, a second set of Y-capacitors ($Y_{cap2}$) 232b, a common mode (CM) choke ($L_{CM}$) 234, and a capacitor $C_r$ 236. In some embodiments, the converter 220 is coupled to a transformer 240. As shown on FIG. 2, radiation 250 emits as a result of the current passing through the input cable 210, the converter 220 and the output cable 230. In some embodiments, the first switch ($SW_1$) 226 is a main switch of the power converter 220. In some embodiments, the second switch (SW2) 228 is a clamping switch. In some embodiments, the secondary switch ($SW_{sec}$) 230 is a secondary side switch. In some embodiments, the PGND node, 222 is a primary ground in the power converter 220. In some embodiments, the SGND node 224 is a secondary ground in the power converter 220.

In some embodiments, a shielding 260 covers the converter 220 to further reduce radiation emission 250. In some embodiments, a current $i_{CM}$ 238 flows inside the transformer 240.

In some embodiments, locations of the first set of Y-capacitors 232a and the second set of Y-capacitors 232b can be changed. In some embodiments, the first set of Y-capacitors 132a and the second set of Y-capacitors 232b are connected to the DC side of the converter 220. Alternatively, in some embodiments, the CM choke 234 is located on the AC side of the converter 220. In some embodiments, a shielding 260 covers the converter 220 to further reduce radiation emission 150. In some embodiments, a current $i_{CM}$ 238 flows inside the transformer 240.

Figure 6:
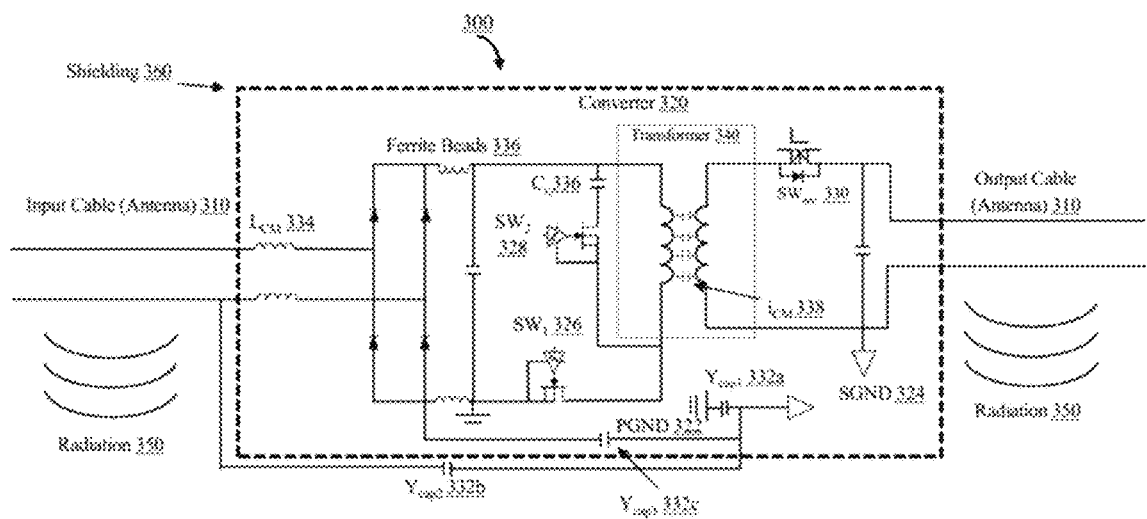
FIG. 6 illustrates a block diagram of an example EMI filter system, in accordance with some embodiments.

FIG. 6 illustrates a block diagram of an example EMI filter system, in accordance with some embodiments. In some embodiments, the EMI filter system 300 further comprises an added filter stage 336. The added filter stage 336 can be located on the DC side of the converter 320. In some embodiments, the EMI filter system 300 comprises an input cable 310, a converter 320 and an output cable 330. In some embodiments, the input cable 310 and the output cable 330 form an antenna. In some embodiments, the converter 320 is coupled to the antenna via the input cable 310 and the output cable 330. The converter 320 is coupled on one side to the input cable 310, and on another side to the output cable 330. In some embodiments, the converter 320 comprises a primary ground (PGND) node 322, a secondary ground (SGND) node 324, a first switch (SW1) 326, a second switch (SW2) 328, a secondary switch (SWsec) 330, a first set of Y-capacitors (Ycap1) 332a, a second set of Y-capacitors (Ycap2) 332b, a third set of Y-capacitors (Ycap3) 332c, and a common mode (CM) choke (LCM) 334. In some embodiments, the first switch (SW1) 326 is a main switch of the power converter. In some embodiments, the second switch (SW2) 328 is a clamping switch. In some embodiments, the secondary switch (SWsec) 330 is a secondary side switch. In some embodiments, the PGND node 322 is a primary ground in the power converter 320. In some embodiments, the SGND node 324 is a secondary ground in the power converter 320. In some embodiments, the converter 320 is coupled to a transformer 340. As shown on FIG. 3, radiation 350 emits as a result of the current passing through the input cable 310, the converter 320 and the output cable 330. In some embodiments, a current iCM 338 flows inside the transformer 340.

Figure 7:
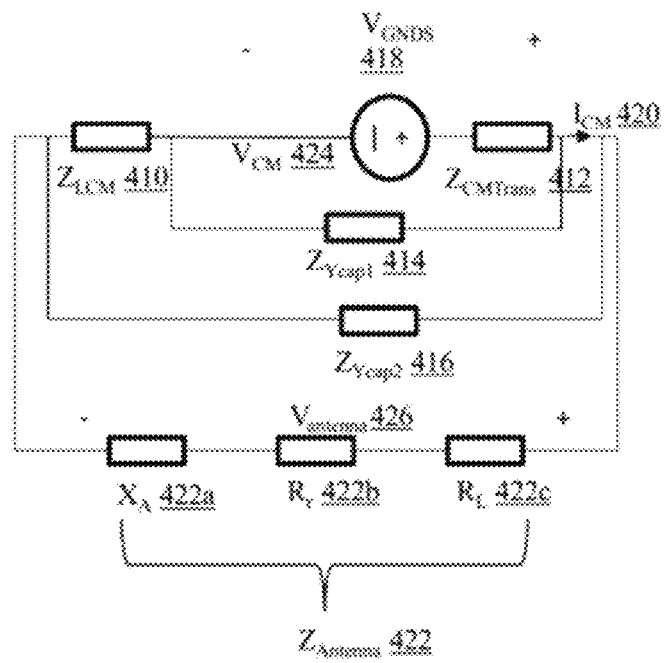
FIG. 7 illustrates an example radiated EMI model using an example EMI filter system, in accordance with some embodiments.

In some embodiments, the added filter stage 336 comprises one or more ferrite beads. Alternatively, in some embodiments, a third set of Y-capacitors 332c are added to the EMI filter system 300. In some embodiments, the third set of Y-capacitors 332c are located between the SGND node 324 and the added filter stage 336. In some embodiments, the added filter stage 336 is located on L and N lines of the DC side of the converter 320. In such embodiments, the EMI filter system 300 further comprises a shielding 360 connected to the SGND node 324. The shielding 360 can comprise a metal foil. In some embodiments, the shielding comprises a copper foil. In some embodiments, the converter 320 comprises an isolated converter. In some embodiments, the converter 320 comprises an isolated LLC resonant power converter. In some embodiments, the converter 320 comprises an isolated push-pull power converter. In some embodiments, the converter 320 comprises an isolated Flyback converter. In some embodiments, the converter 320 comprises an isolated Forward converter. In some embodiments, the converter 320 comprises an isolated push-pull power converter FIG. 7 illustrates an example radiated EMI model using an example EMI filter system, in accordance with some embodiments. In some embodiments, impedance analysis is performed to evaluate the effect of the EMI filter system 100. The impedance analysis diagram comprises CM choke impedance ZLCM 410, CM choke transformer impedance ZCMTrans 412, first set of Y-capacitors impedance ZYcap1 414, second set of Y-capacitors impedance ZYcap2 416, a ground voltage VGNDS 418, a CM choke current iCM 420, an antenna impedance Zantenna 422, a CM choke voltage VCM 424, and an antenna's voltage Vantenna 426. In some embodiments, the antenna impedance Zantenna 422 comprises reactive component representing the near field energy XA 422a, an equivalent radiation resistance Rr 422b, and a loss resistance of the power cables RL 422c. The antenna's impedance Z antenna can be calculated by Zantenna=Rr+RL+jXA.

In some embodiments, with employing the transformer's parasitic capacitance and the initial first and second sets of Y-capacitors, the equivalent CM impedance across the transformer primary and secondary is small.

Figure 8:
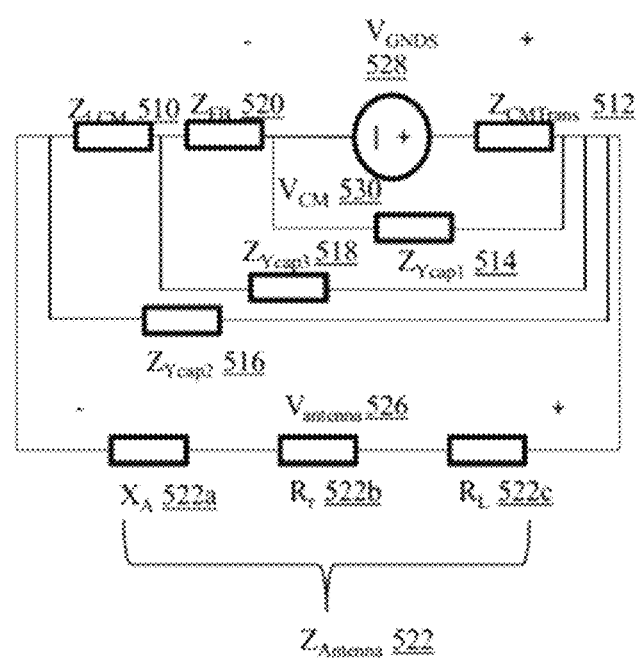
FIG. 8 illustrates an example radiated EMI model using an example EMI filter system, in accordance with some embodiments.

FIG. 8 is an example radiated EMI model using an example EMI filter system, in accordance with some embodiments. In some embodiments, impedance analysis is performed to evaluate the effect of the EMI filter system 300. The impedance analysis diagram comprises CM choke impedance Z LCM 510, CM choke transformer impedance Z CMTrans 512, first set of Y-capacitors impedance Z Ycap1 514, second set of Y-capacitors impedance Z Ycap2 516, third set of Y-capacitors impedance Z Ycap3 518, ferrite beads impedance Z FB 520, an antenna's impedance Z antenna 522, an antenna voltage Vantenna 526, a ground voltage VGNDS 528, and a CM choke voltage VCM 530. In some embodiments, the antenna impedance Z antenna 522 comprises reactive component representing the near field energy XA 522a, an equivalent radiation resistance Rr 522b, and a loss resistance of the power cables RL 522c. In some embodiments, the first set of Y-capacitors impedance Z Ycap1 514, second set of Y-capacitors' impedance Z Ycap2 516, third set of Y-capacitors impedance Z Ycap3 518 are small, e.g., smaller than about 100 in a frequency range between about 30 MHz and about 200 MHz. In some embodiments, the CM choke impedance Z LCM 510 is large, e.g., larger than about 100 in a frequency range between about 30 MHz and about 200 MHz. In some embodiments, the antenna impedance Zantenna 522 is large, e.g., larger than about 100 in a frequency range between about 30 MHz and about 200 MHz. In some embodiments, the ferrite beads impedance Z FB 520 is larger than about 100 in a frequency range between about 30 MHz and about 200 MHz.

Figure 9:
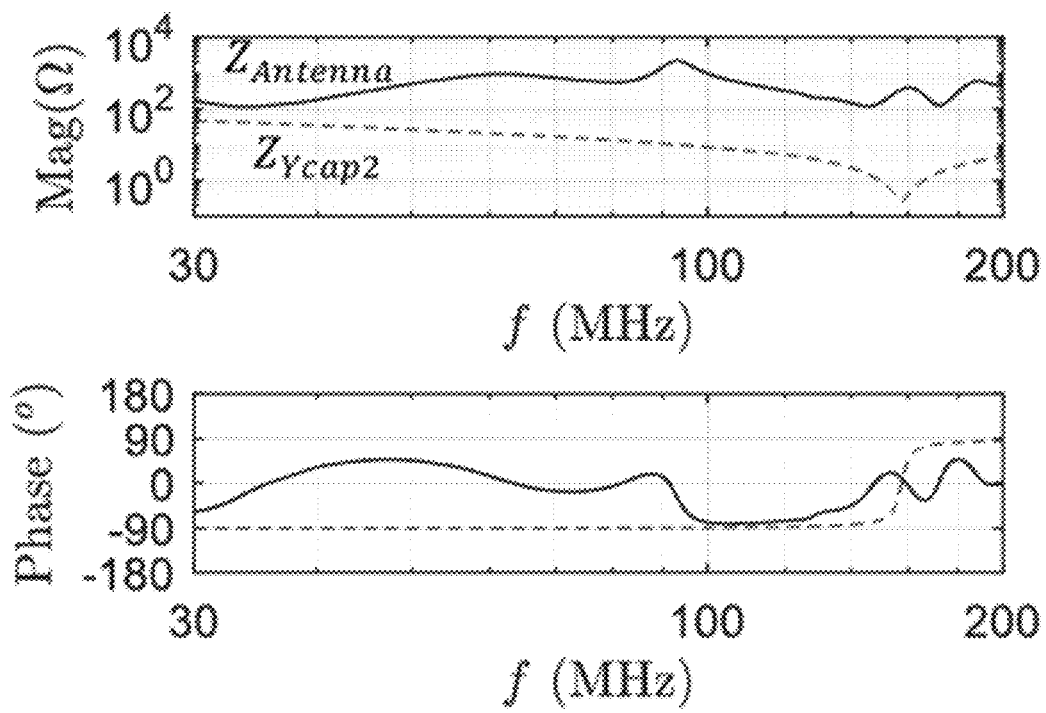
FIG. 9 compares antenna and Y-cap impedance with and without using an example EMI filter system, in accordance with some embodiments.

FIG. 9 compares antenna and Y-cap impedance with and without using an example EMI filter system, in accordance with some embodiments. In some embodiments, with employing the transformer's parasitic capacitance and the initial first and second sets of Y-capacitors, the equivalent CM impedance across the transformer primary and secondary is small.

Figure 10:
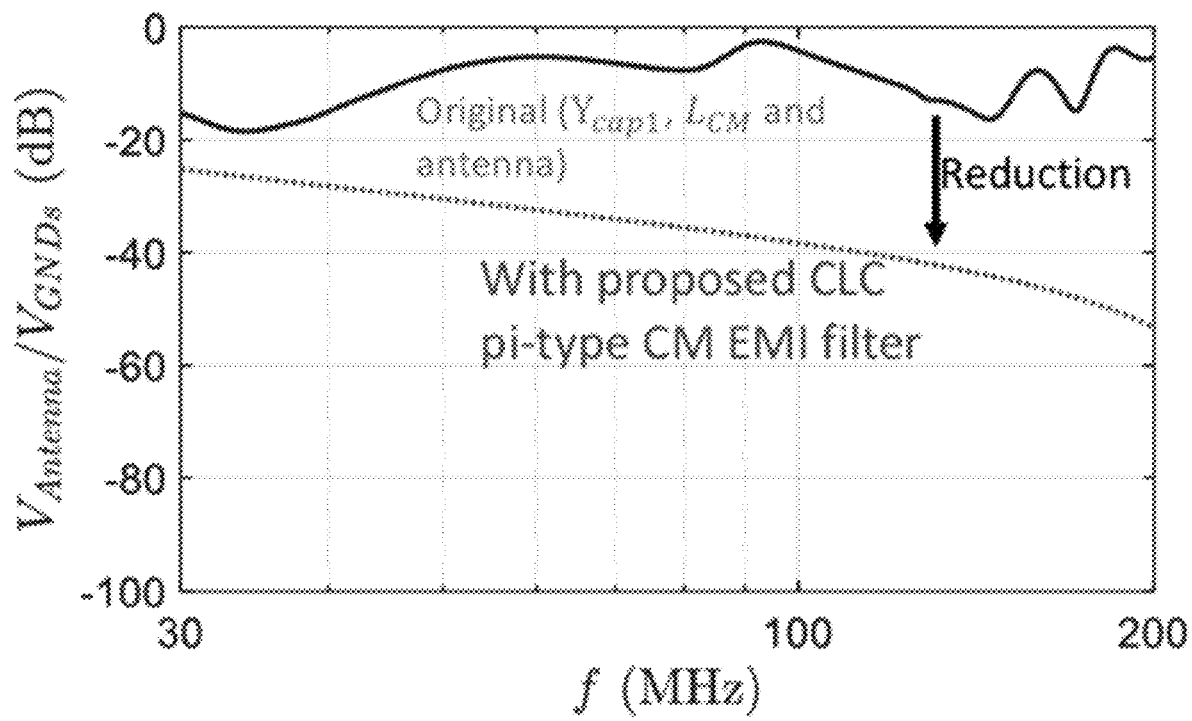
FIG. 10 compares extracted transfer gains with and without using an example EMI filter system, in accordance with some embodiments.

FIG. 10 compares extracted transfer gains with and without using an example EMI filter system, in accordance with some embodiments. In some embodiments, a noise transfer gain is reduced by using the EMI filter system.

Figure 11:
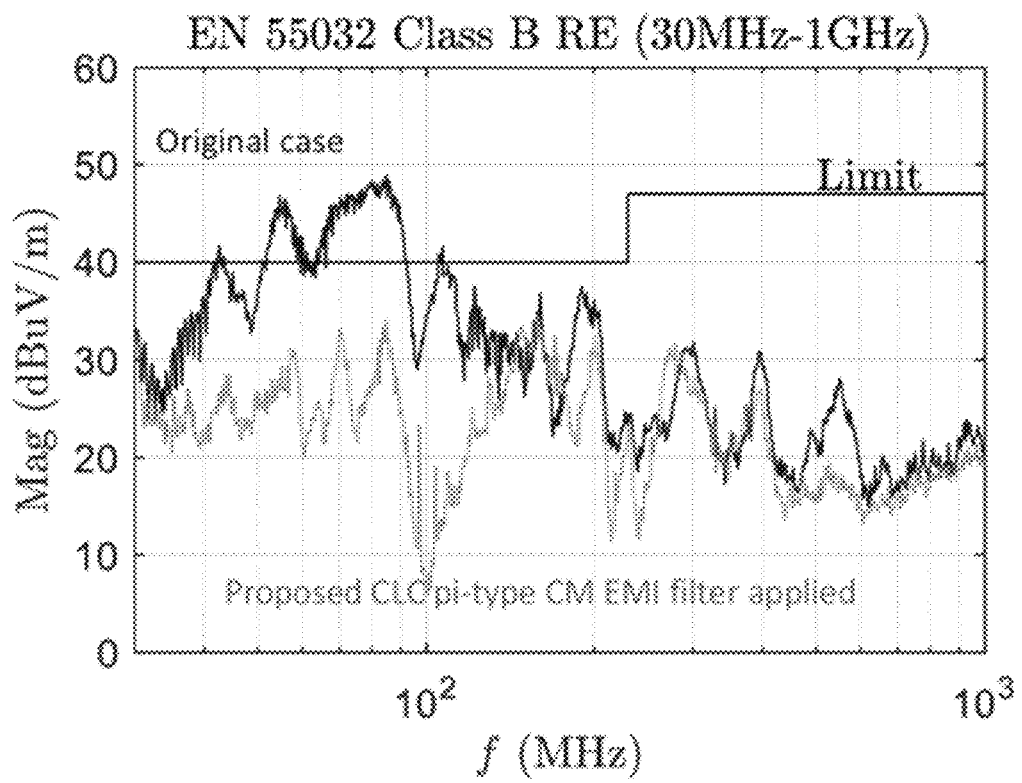
FIG. 11 illustrates validation of radiated EMI reduction by an example EMI filter system, in accordance with some embodiments.

FIG. 11 illustrates validation of radiated EMI reduction by an example EMI filter system, in accordance with some embodiments. In some embodiments, the radiated EMI is reduced by using the EMI filter system with changing locations of the first and the second sets of Y-capacitors.

Figure 12:
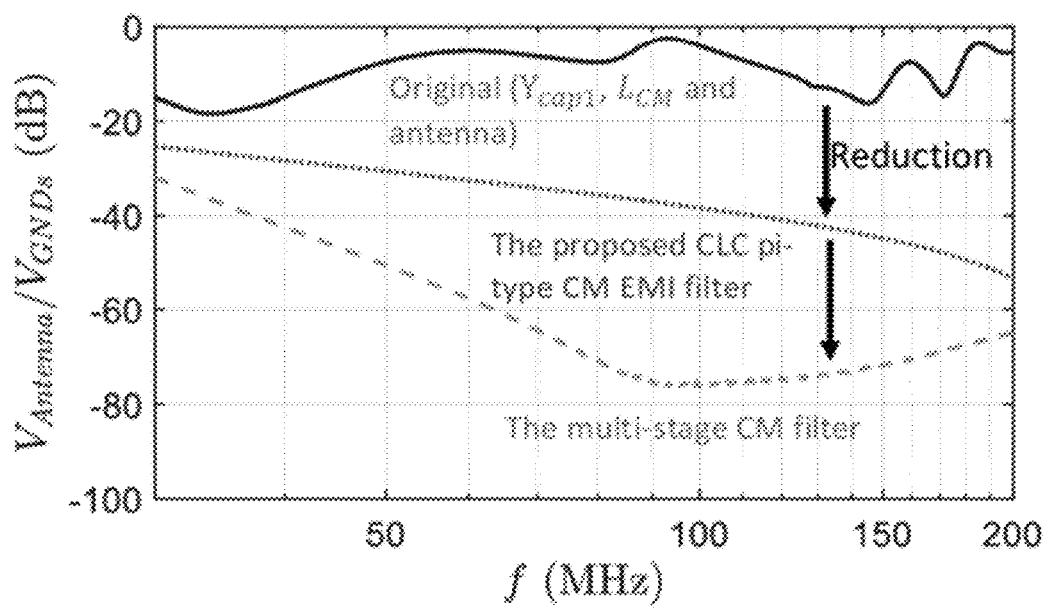
FIG. 12 compares extracted transfer gains with and without using an example EMI filter system, in accordance with some embodiments.

FIG. 12 compares extracted transfer gains with and without using an example EMI filter system, in accordance with some embodiments. In some embodiments, a noise transfer gain is further reduced by using the EMI filter system with additional third set of Y-capacitors and the ferrite beads.

Figure 13:
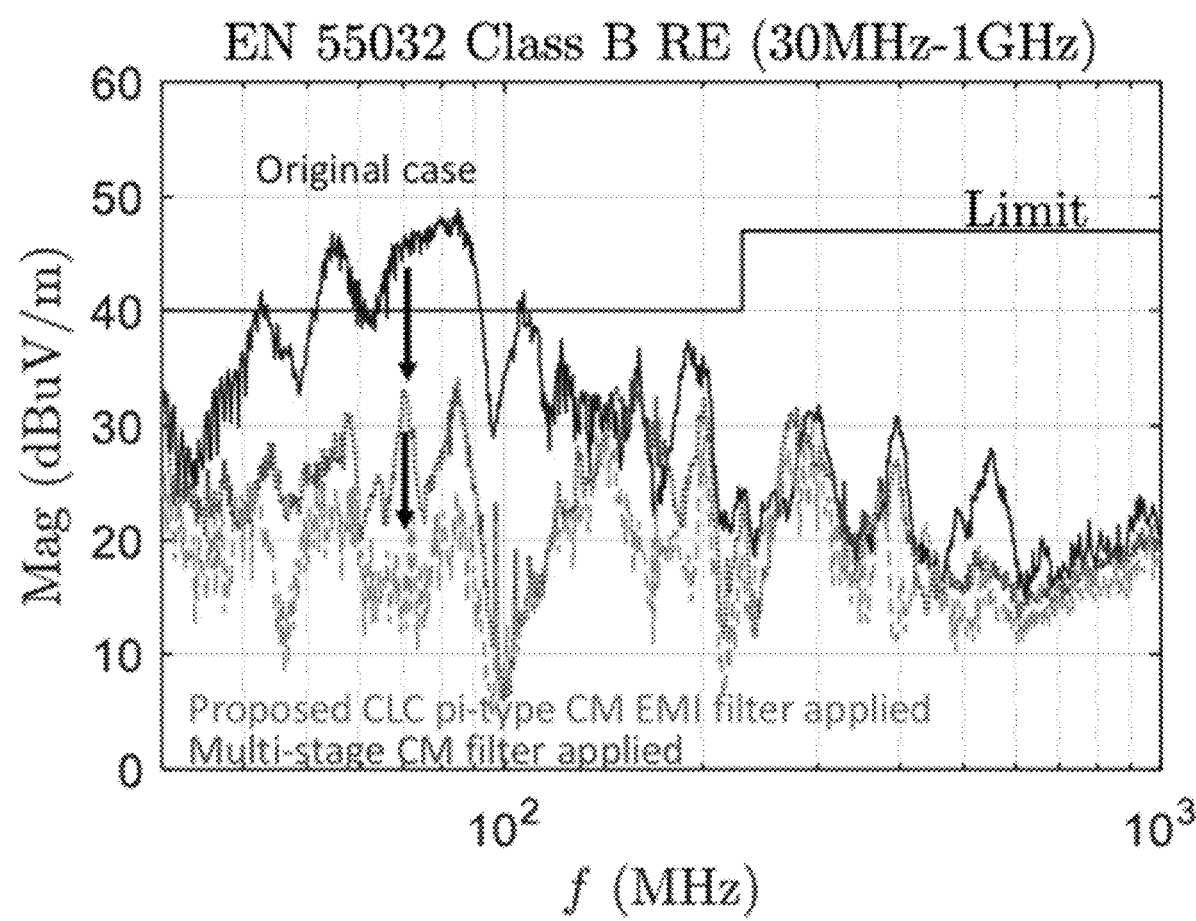
FIG. 13 illustrates validation of radiated EMI reduction by an example EMI filter system, in accordance with some embodiments.

FIG. 13 illustrates validation of radiated EMI reduction by an example EMI filter system, in accordance with some embodiments. In some embodiments, the radiated EMI is further reduced by using the EMI filter system with additional third set of Y-capacitors and the ferrite beads.

Figure 14:
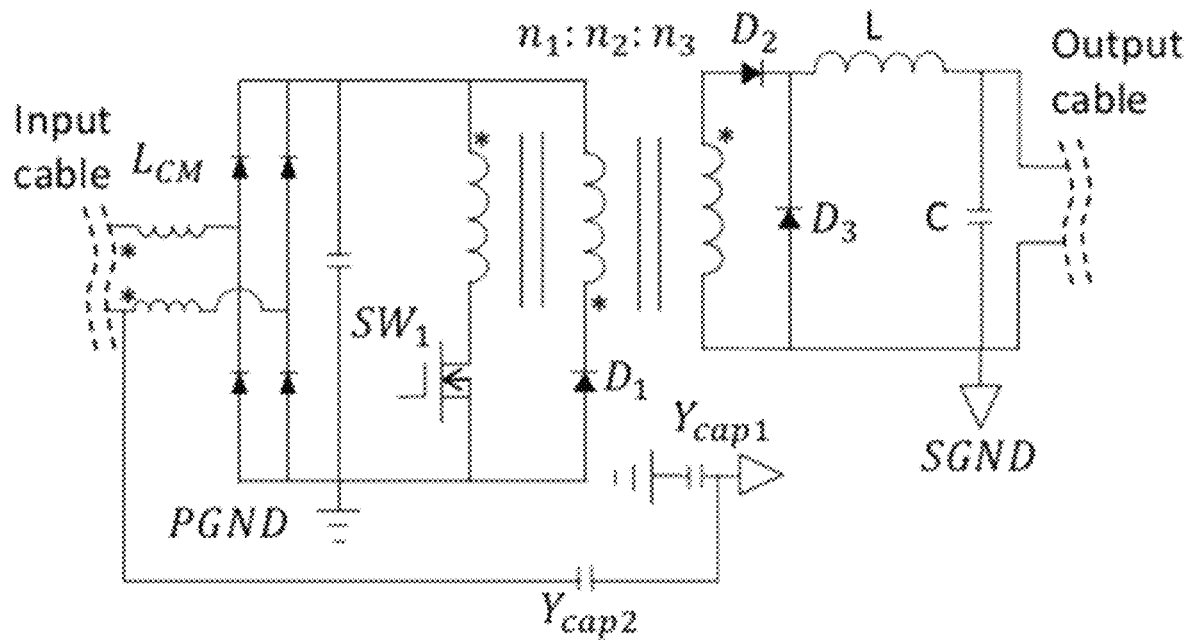
FIG. 14 illustrates a block diagram of an example EMI filter system, in accordance with some embodiments.

FIG. 14 illustrates a block diagram of an example EMI filter system, in accordance with some embodiments. In some embodiments, the EMI filter system is used with other types of converters. The EMI filter system 100 with a first set of Y-capacitors and a second set of Y-capacitors can be used with a forward power converter.

Figure 15:
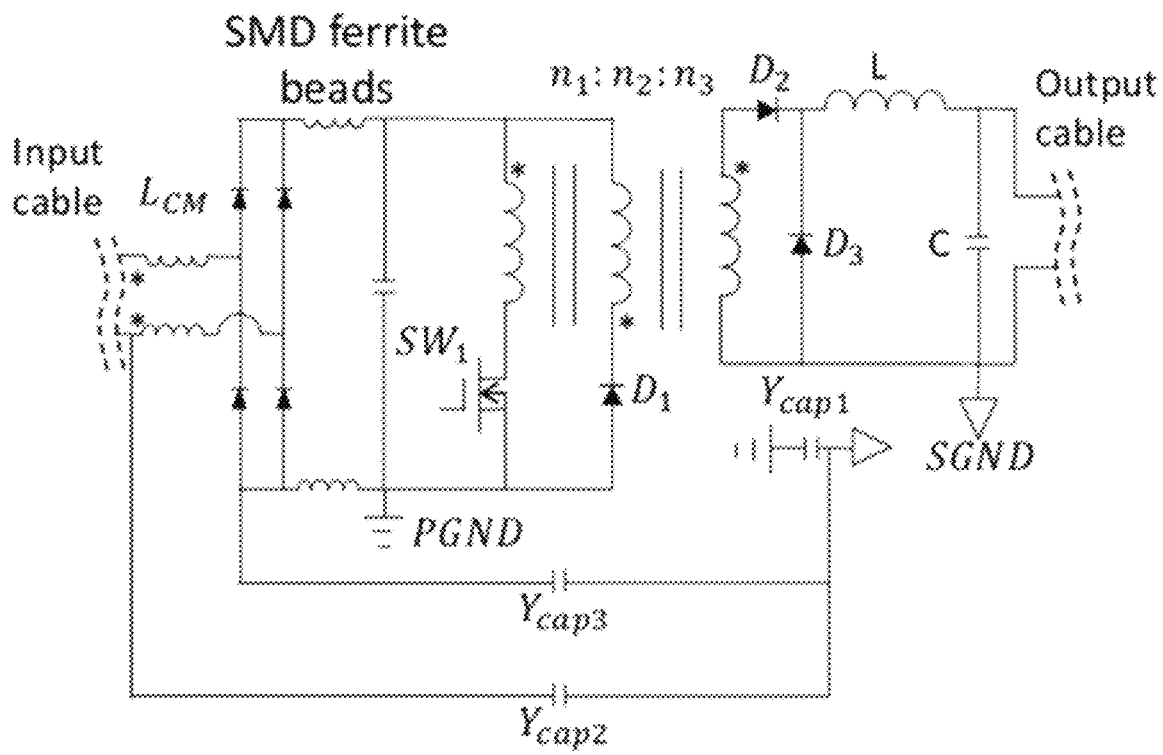
FIG. 15 illustrates a block diagram of an example EMI filter system, in accordance with some embodiments.

FIG. 15 illustrates a block diagram of an example EMI filter system, in accordance with some embodiments. In some embodiments, the EMI filter system is used with other types of converters. The EMI filter system 300 with a first set of Y-capacitors, a second set of Y-capacitors, and third set of Y-capacitors can be used with a forward power converter. In some embodiments, the EMI filter system further comprises an added filter stage coupled to a forward power converter. The added filter stage can be located on the DC side of the forward power converter.

Figure 16A:
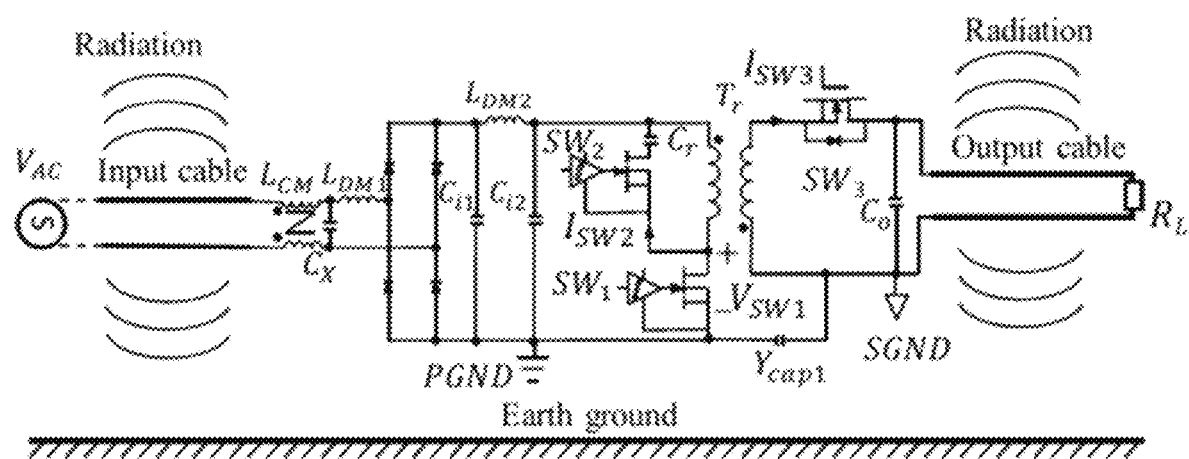
FIG. 16A illustrates an example GaN IC-based ACF power adapter.
Figure 16B:
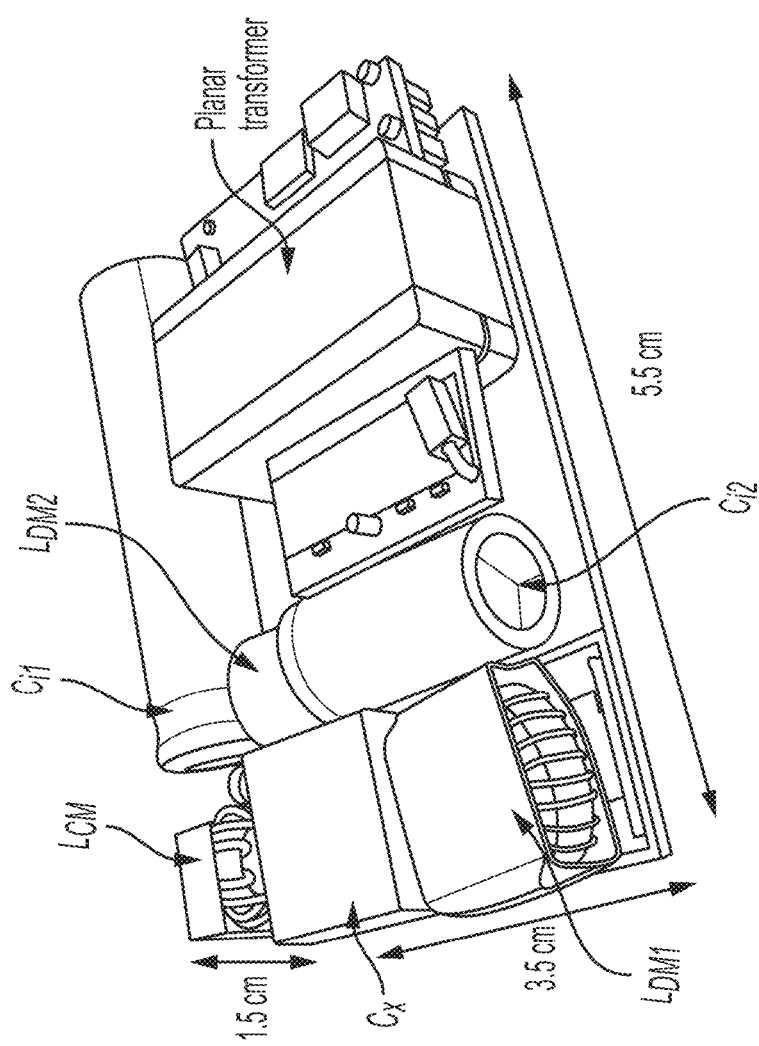
FIG. 16B illustrates a photograph of the example power adapter of FIG. 16B.

FIG. 16A shows a GaN IC-based ACF power adapter above the ground. FIG. 16B shows the prototype photo. The input and output voltages are 120 V AC and 20 V DC respectively. The main switch, the clamping switch, and gate drivers are integrated into Navitas Semiconductor's GaN ICs NV6117 and NV6115. The switching frequency is 450 kHz, and the switching slew rate in this ACF is 20 V/ns. The winding structure of the planar transformer has been optimized to minimize the conductive CM noise. The lengths of the input and output cables are 0.8 m and 0.9 m respectively. The load is a 6.67Ω power resistor.

Preliminary Radiated EMI Model

Figure 17:
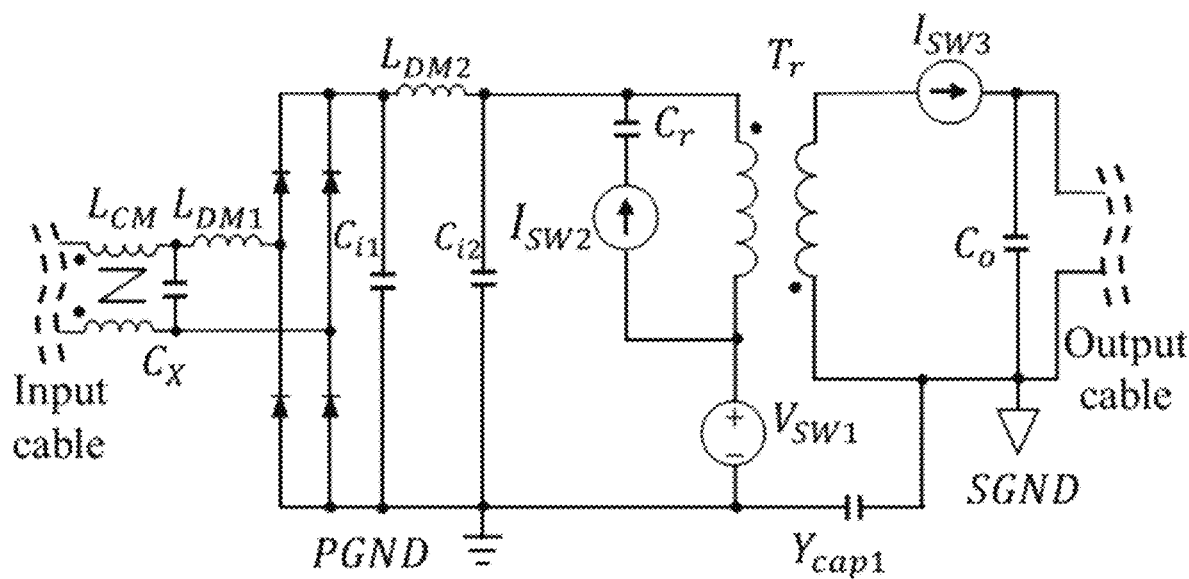
FIG. 17 illustrates an example EMI noise model of an ACF power adapter with switching devices substituted by voltage and current sources.

FIG. 17 illustrates an example EMI noise model of an ACF power adapter with switching devices substituted by voltage and current sources. The radiated EMI is mainly caused by the CM currents flowing on input and output cables. The differential mode (DM) currents of the converter do not significantly contribute to the radiated EMI. Based on the substitution theory, SW1 can be replaced with a voltage source VSW1; SW2 and SW3 can be replaced with current sources ISW2 and ISW3 in FIG. 17. Based on the superposition theory, the effect of a voltage/current source on EMI can be analyzed after shorting other voltage sources and disconnecting other current sources. It is found that only VSW1 contributes to the CM noise flowing to the attached input and output cables, causing radiated EMI. As a result, ISW2 and ISW3 can be removed in the model as shown in FIG. 18.

Figure 18:
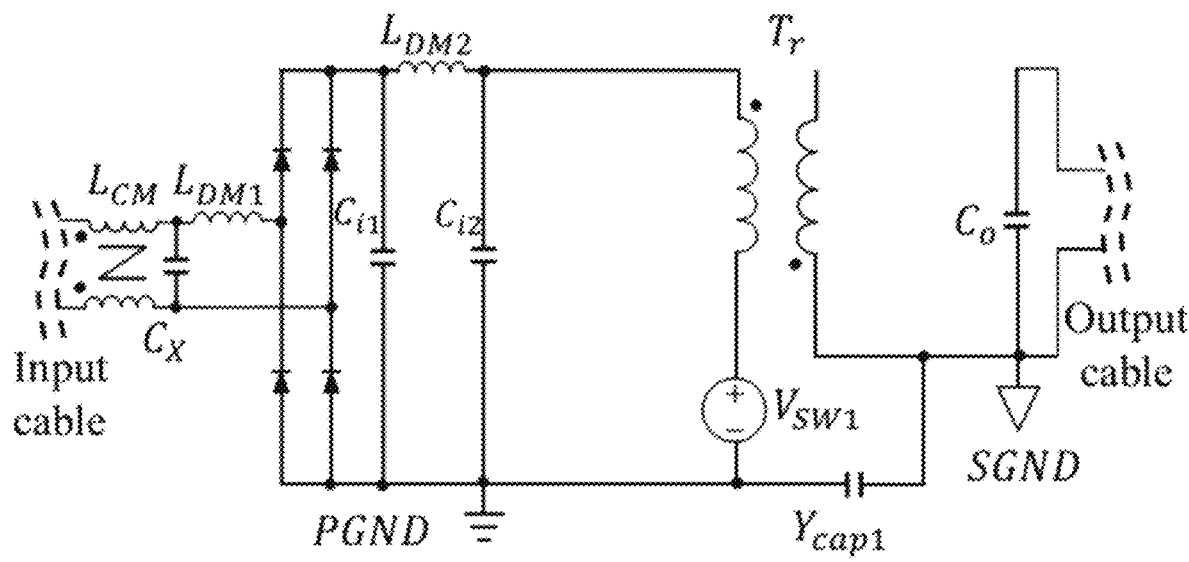
FIG. 18 illustrates an example EMI noise model as in FIG. 17, with current sources removed.
Figure 19:
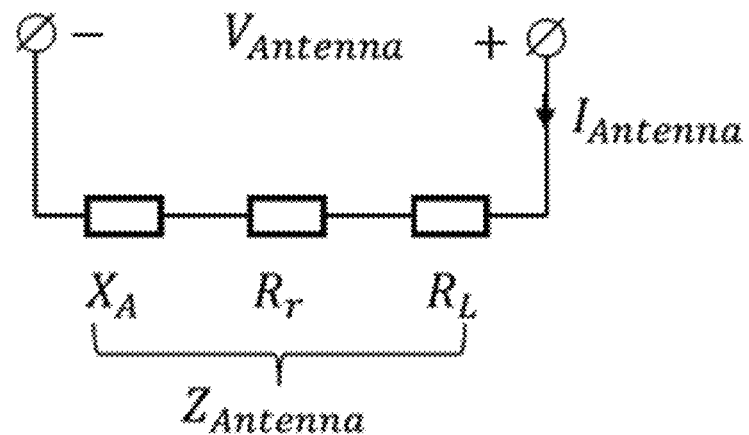
FIG. 19 illustrates an example equivalent antenna impedance.

FIG. 18 illustrates an example EMI noise model as in FIG. 17, with current sources removed. FIG. 19 illustrates an example equivalent antenna impedance.

In FIG. 18, the impedances of capacitors CX, Ci1, Ci2, and C0 are assumed to be zero for CM EMI analysis, so VSW1 is directly added to the primary winding of the transformer. Also, one terminal of the primary winding is equivalently connected to PGND. The two conductors of both input and output cables can be treated as one for CM noise analysis. The attached power cables behave like an antenna which can be characterized with an equivalent antenna impedance ZAntenna in FIG. 19. R is the equivalent radiation resistance, Rr is the loss resistance of the power cables, XA is the reactance representing the near field energy, so ZAntenna=Rr+RL+jXA.

Figure 20:
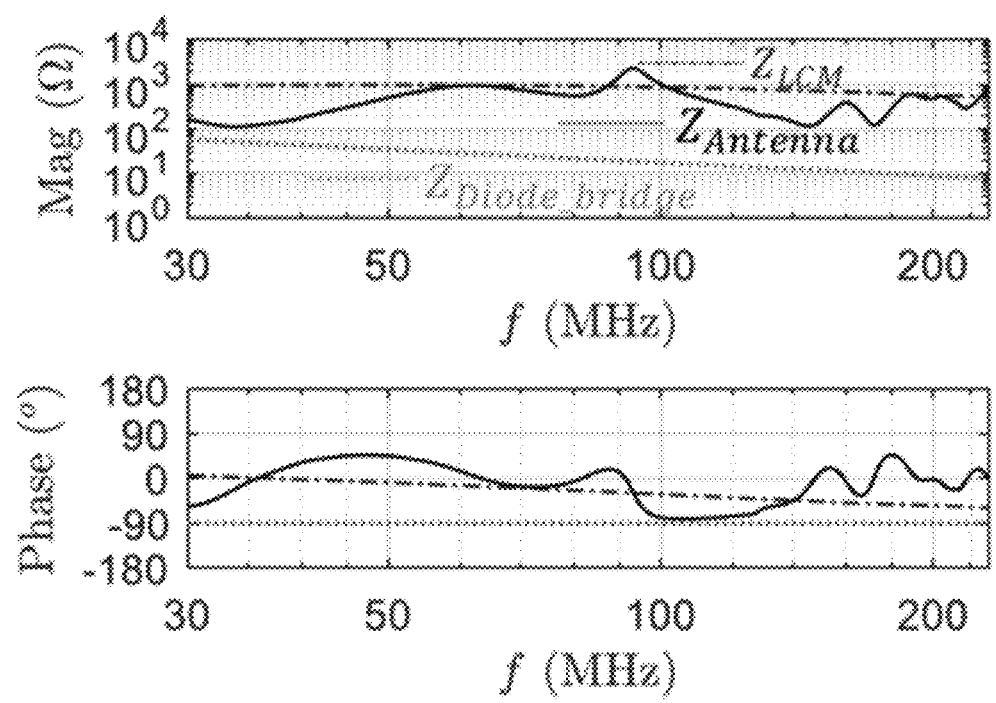
FIG. 20 illustrates measured impedances of an antenna, CM choke, and diode bridge.

The measured impedance ZAntenna of the cable antenna and ZLCM of the CM choke LCM are shown in FIG. 20. It should be noted that based on the antenna theory, the antenna impedance includes the effect of the real ground, so the real ground's effect is included in the antenna impedance ZAntenna.

The CM choke uses a Ni—Zn NL16D core from Hitachi, with an outer diameter 8 mm, an inner diameter 4 mm, a thickness 2 mm, and a 9-turn (AWG26) bifilar winding structure. In the concerned frequency range from 30 MHz to 230 MHz (EN55032 3m class B has the strictest radiated EMI limit in this range), ZLCM, which is equivalently in series with ZAntenna, is higher or comparable to ZAntenna so it can help reduce the CM currents on the antenna.

Figure 21A:
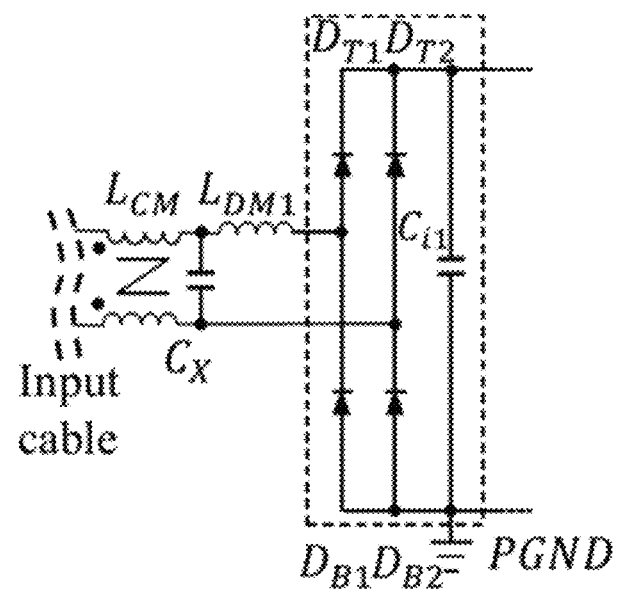
FIGS. 21A, 21B, 21C illustrate an example analysis where by an impedance of a diode bridge is ignored for radiated CM current.
Figure 21B:
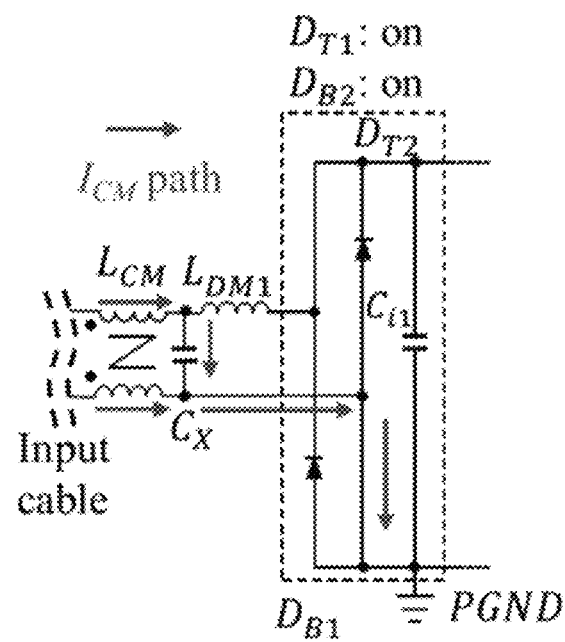
Figure 21C:
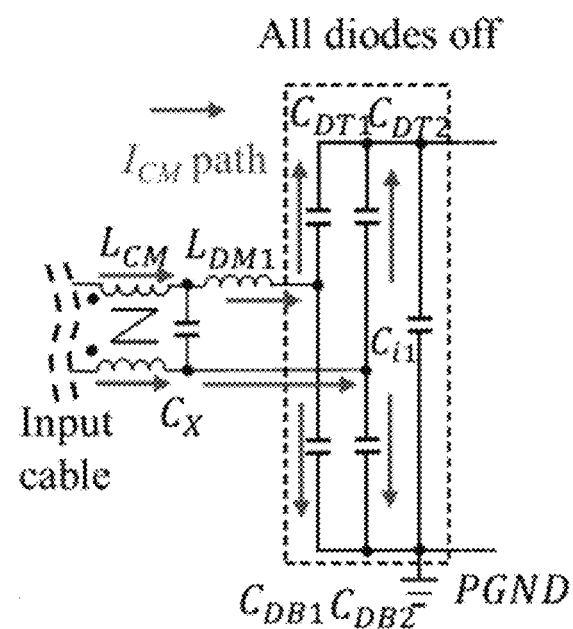

FIGS. 21A, 21B, 21C illustrate an example analysis where by an impedance of a diode bridge is ignored for radiated CM current. For the diode-bridge (Z4DGP406L-HF from Comchip Technology) in FIG. 21A, when two diodes conduct currents in FIG. 21B, the CM impedance of the diode bridge is negligible. In FIG. 21C, when all diodes are off, the CM current will flow through diode junction capacitances. Due to the impedance of DM inductor LDM1, two lines may have different CM currents. For the worst scenario, when the CM current only flows through the line without LDM1, the impedance ZDiode bridge of the diode bridge is the two parallel 45-pF diode junction capacitances. ZDiode bridge is much smaller than the impedances of the antenna and LCM, as shown in FIG. 20. The impedance of the diode bridge can therefore be ignored in the radiated EMI analysis. Also, in FIG. 21C, since the diode bridge impedance is ignored, the CM current bypasses LDM1 via the other line, so LDM1 can be ignored too.

Figure 22A:
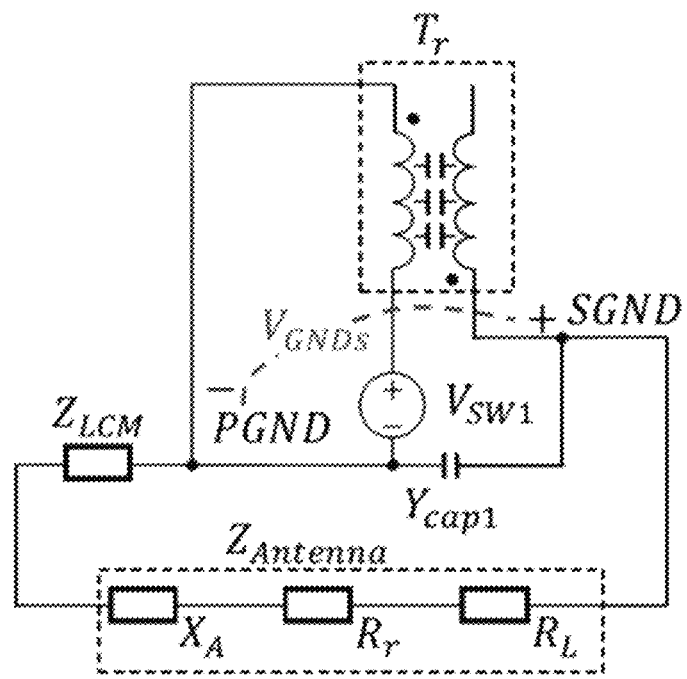
FIGS. 22A, 22B, 22C, and 22D illustrate an example system EMI model and variations thereof.
Figure 22B:
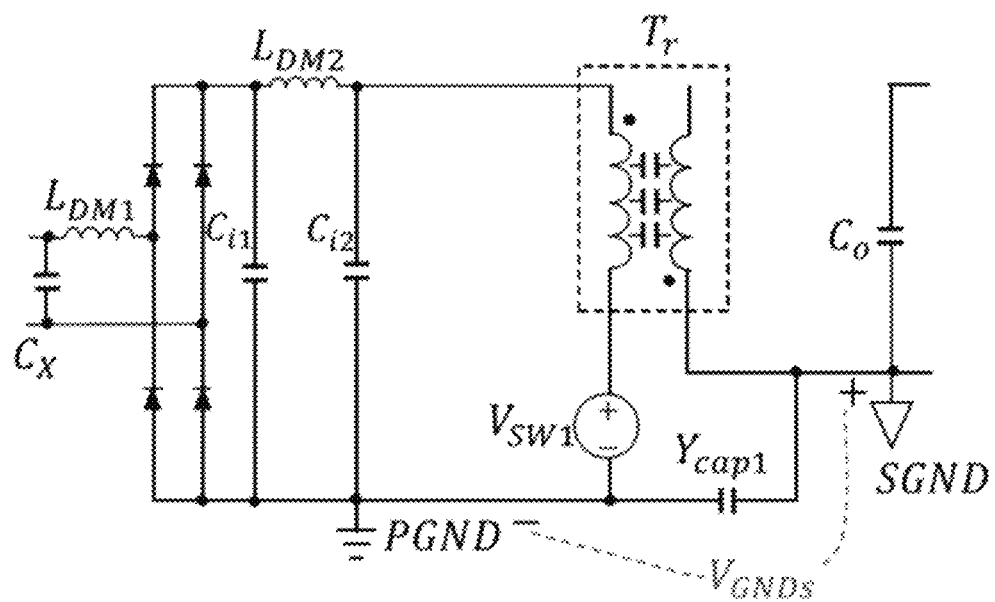
Figure 22C:
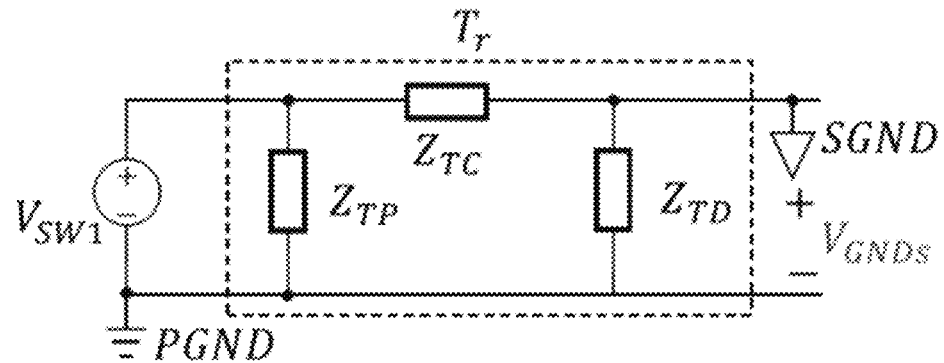
Figure 22D:
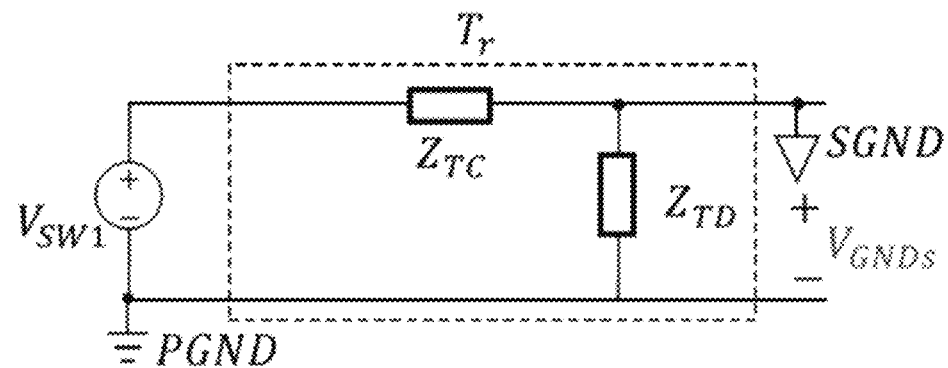

FIGS. 22A, 22B, 22C, and 22D illustrate an example system EMI model and variations thereof. Based on the analysis above, the EMI model with transformer parasitics can be simplified to FIG. 22A with both the impedances of the diode bridge and LDM1 ignored. VGNDs between PGND and SGND is the excitation voltage to drive LCM and antenna for EMI radiation. To investigate VGNDs in FIG. 22A, LCM, input and output cables are removed in FIG. 22B. Because any parasitics across PGND and SGND may contribute to VGNDs, although the impedances of Ci1, Ci2, C0, CX, the diode bridge and the related PCB trace connections are ignored, they may contribute to the parasitic mutual capacitance across PGND and SGND, so they will be kept on the PCB for the parasitic extraction. Because VSW1 is the equivalent switching voltage source added to the primary winding of the transformer, and the resultant excitation voltage VGNDs is the voltage difference between PGND and SGND, the circuit including all parasitics between PGND and SGND in FIG. 22B can be modeled as a two-port network: the PGND, which is connected to one of the primary winding's two terminals in FIG. 22B is the reference ground; the other primary winding's terminal, which is connected to VSW1, is the input port, and the SGND is the output port. The output port voltage is therefore VGNDs. Based on the network theory, a two-port network can be represented with a π network including ZTP, ZTD, and ZTC in FIG. 22C. Since ZTP is in parallel with VSW1, it can be removed. The network is reduced to FIG. 22D. ZTD and ZTC can be extracted via S-parameters using the Copper Mountain planar 808/1 vector network analyzer (VNA) and the results are shown in FIG. 23.

Figure 23:
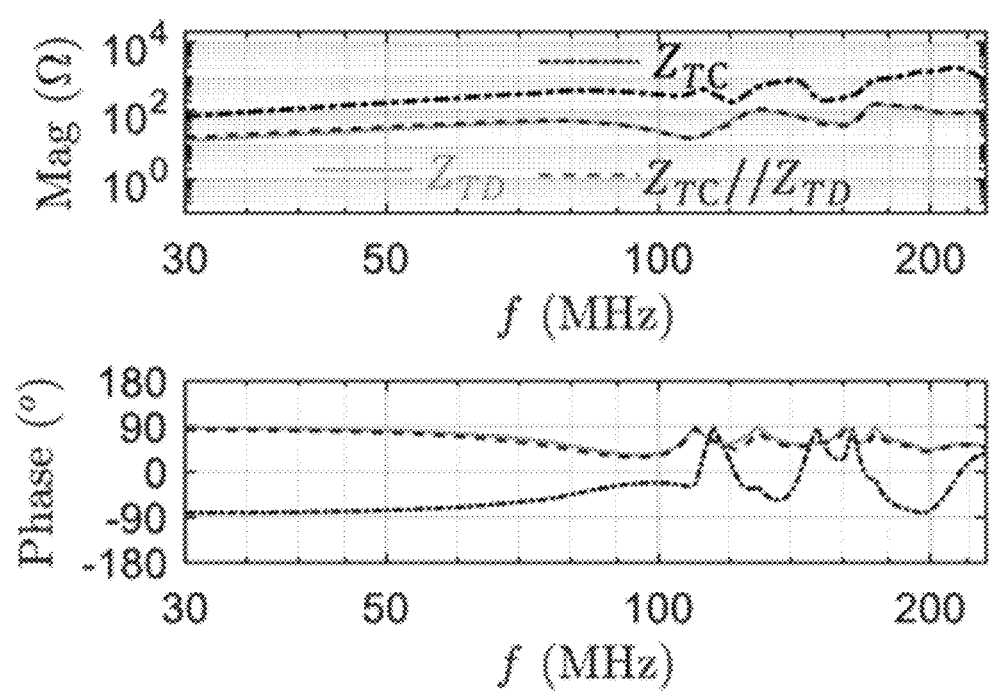
FIG. 23 illustrates example extracted impedances.

In FIG. 23, based on the magnitude and positive phase information, ZTD behaves like an inductive impedance in the whole frequency range from 30 MHz to 230 MHz. ZTD is determined by the transformer parasitics, the impedance of Ycap1 and its related parasitic inductance. Ycap1 has an SMD 1808 package with capacitance 1.5 nF. On the other hand, the phase of ZTC is negative from 30 MHz to 107 MHz, but the polarity changes frequently above 107 MHz. ZTC is much bigger than ZTD below 230 MHz, so the transformer's total CM impedance ZTC//ZTD is mostly determined by ZTD for this converter.

Figure 24A:
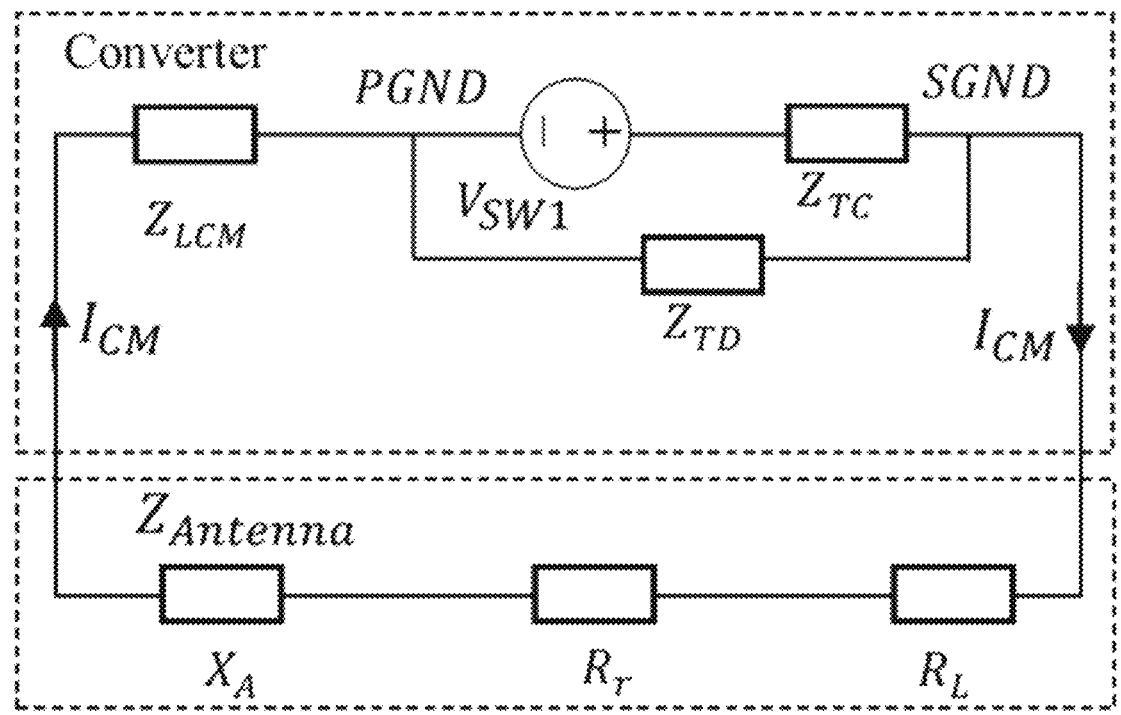
FIGS. 24A and 24B illustrate an example preliminary and reduced, respectively, radiated EMI model of an ACF, for use with embodiments of the present disclosure.
Figure 24B:
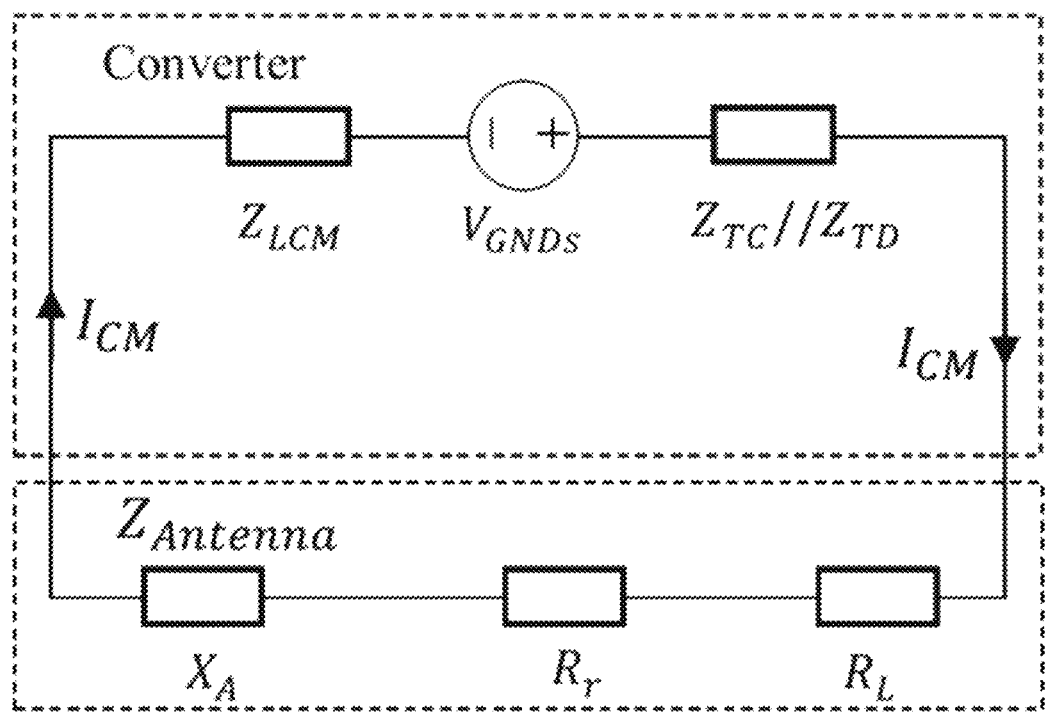

FIGS. 24A and 24B illustrate an example preliminary and reduced, respectively, radiated EMI model of an ACF, for use with embodiments of the present disclosure. With the transformer model in FIG. 22D, the radiated EMI model can be developed in FIG. 24A, where ICM is the CM current flowing through the power cables, causing the radiated EMI. Applying Thevenin equivalence between PGND and SGND, it can be further reduced to FIG. 24B. ZTC//ZTD is the Thevenin equivalent impedance. It is much smaller than ZLCM and ZAntenna based on FIG. 20 and FIG. 23, so it can be ignored.

Improved Radiated EMI Model Including Capacitive Couplings

Figure 25A:
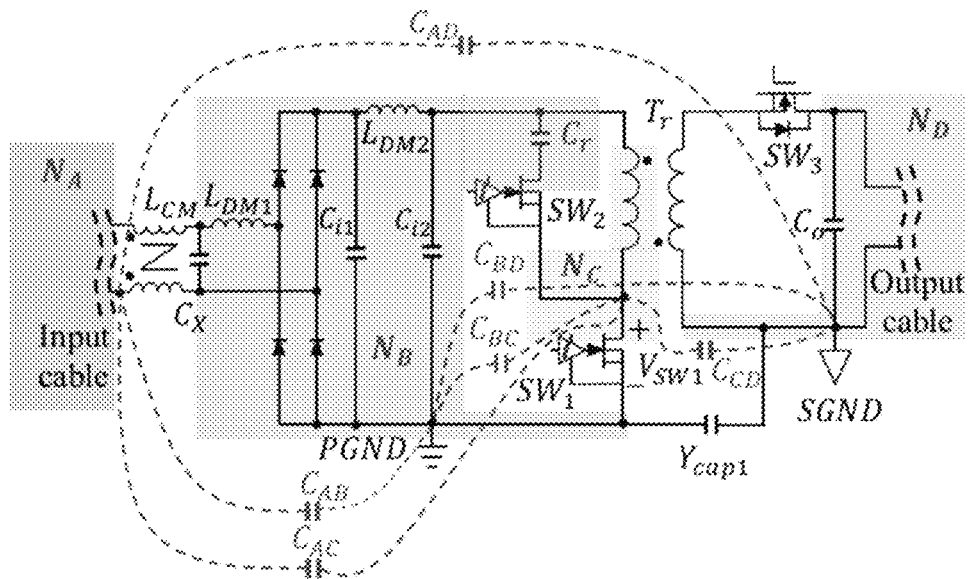
FIG. 25A illustrates an example ACF and associated identified voltage nodes and capacitive couplings, for use with embodiments of the present disclosure.
Figure 25B:
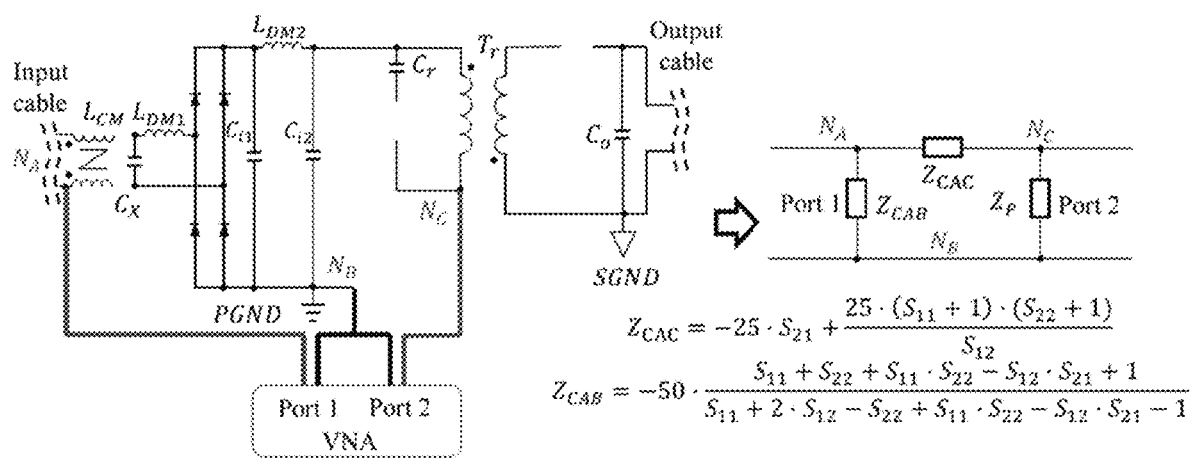
FIG. 25B illustrates an example extraction of $C_{AC}$ and $C_{AB}$ of the example ACF of FIG. 25A, for use with embodiments of the present disclosure.

FIG. 25A illustrates an example ACF and associated identified voltage nodes and capacitive couplings, for use with embodiments of the present disclosure. FIG. 25B illustrates an example extraction of $C_{AC}$ and $C_{AB}$ of the example ACF of FIG. 25A, for use with embodiments of the present disclosure.

In the experiments, it was found that capacitive couplings play a big role in the radiated EMI. The undesired capacitive couplings exist between conductors with pulsating voltage difference, especially between sensitive nodes and noisy nodes. In order to identify possible capacitive couplings in FIGS. 16A and 16B, components and PCB traces with similar voltage levels are identified as voltage nodes in shaded areas in FIG. 25A. The explanations of these nodes are in Table I. The capacitive couplings between any two nodes are analyzed in Table II.

TABLE I

IDENTIFIED VOLTAGE NODES

| Node | Components and PCB traces with a similar voltage level |
|---|---|
| $N_A$ | Input cable before CM choke (victim) |
| $N_B$ | $C_X$, $L_{DM1}$, diode bridge, $C_{i1}$, $C_{i2}$, $L_{DM2}$, and DC bus |
| $N_C$ | Drain of $SW_1$, source of $SW_2$, PCB traces and the transformer winding with a gradient voltage |
| $N_D$ | Output DC bus, $C_0$, and output cable |

TABLE II

CAPACITIVE COUPLINGS BETWEEN CM NODES

| Involved nodes | | Analyses about the significance |
|---|---|---|
| $C_{AC}$ | $N_A$ & $N_C$ | Couplings front the pulsating node to the victim node can inject noise to the input cable, so it is a critical coupling. |
| $C_{AB}$ | $N_A$ & $N_B$ | $C_{AB}$ is in parallel with the CM choke, so it may degrade CM choke performance. |
| $C_{AD}$ | $N_A$ & $N_D$ | $C_{AD}$ is part of the antenna composed of input and output cables; it is determined by the test setup. However, an external capacitance between input and output cables can help reduce the antenna impedance and the radiated EMI. |
| $C_{BC}$ | $N_B$ & $N_C$ | $C_{BC}$ is in parallel with $SW_1$, so it does not influence the gain from $V_{SW1}$ to the CM noise |

TABLE II-continued

CAPACITIVE COUPLINGS BETWEEN CM NODES

| | Involved nodes | Analyses about the significance |
|---|---|---|
| | | and to the radiated EMI. |
| $C_{BD}$ | $N_B$ & $N_D$ | Effect of $C_{BD}$ has been included in the extracted $Z_{TD}$ in FIG. 7; if its impedance is much bigger than those of $Y_{cap1}$ and the transformer, it has negligible influence. |
| $C_{CD}$ | $N_C$ & $N_D$ | Effect of $C_{CD}$ has been included in the extracted $Z_{TC}$ in FIG. 7; if its impedance is much larger than that of the transformer, it can be ignored. |

The extraction of the impedances ZCAC and ZCAB of CAC and CAB using a two-port VNA is shown in FIG. 25B. Before the measurement, the calibration was made to the exact measurement points, so no additional test wires are needed to do the measurement. The effect of the gradient voltage on the transformer primary winding on capacitive couplings is also included in the measurement because the voltage excitation from port 2 is directly added to the primary winding and this voltage is a gradient voltage on the primary winding. It should be noted that, to extract the coupling parasitics due to VSW1, based on the superposition theory, other switching devices SW2 and SW3 are removed. The extracted S-parameters are converted to a π impedance network. The three impedances of the network correspond to ZCAC, ZCAB, and ZP. ZP, which is the impedance between NC and NB in FIG. 25B, is not needed in the EMI model. Other parasitic capacitances can be extracted similarly. CAC and CAB are extracted as 1.05 pF and 0.63 pF. The EPC of the CM choke is 1.29 pF. CCD and CBD are extracted as 1.59 pF and 3.7 pF with port 1 connected between NC and NB, port 2 connected between ND and NB, and the transformer removed. Their effects have been included in ZTC and ZTD as discussed in Table II. Based on the analysis in Table II, the capacitive coupling CAC between the victim node NA and the pulsating node NC is a very important coupling. It should be pointed out that within the radiated EMI frequency range, the voltage along a cable antenna is not constant, so representing the distributed capacitive coupling between a node and a long cable using a lumped capacitance can give a qualitative analysis but not quantitative analysis. However, the qualitative analysis can still help identify important couplings and develop techniques to reduce the coupling and the radiated EMI.

Figure 26:
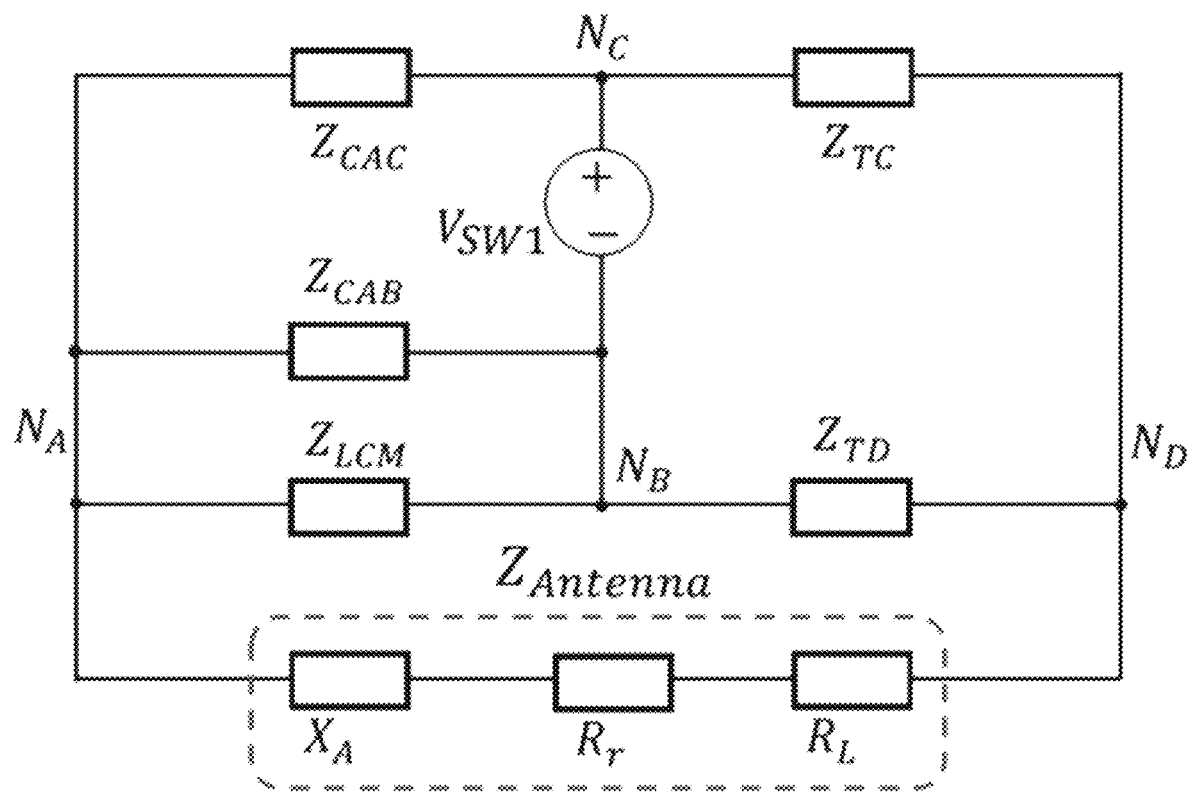
FIG. 26 illustrates an example radiated EMI model including capacitive couplings, for use with embodiments of the present disclosure.
Figure 27:
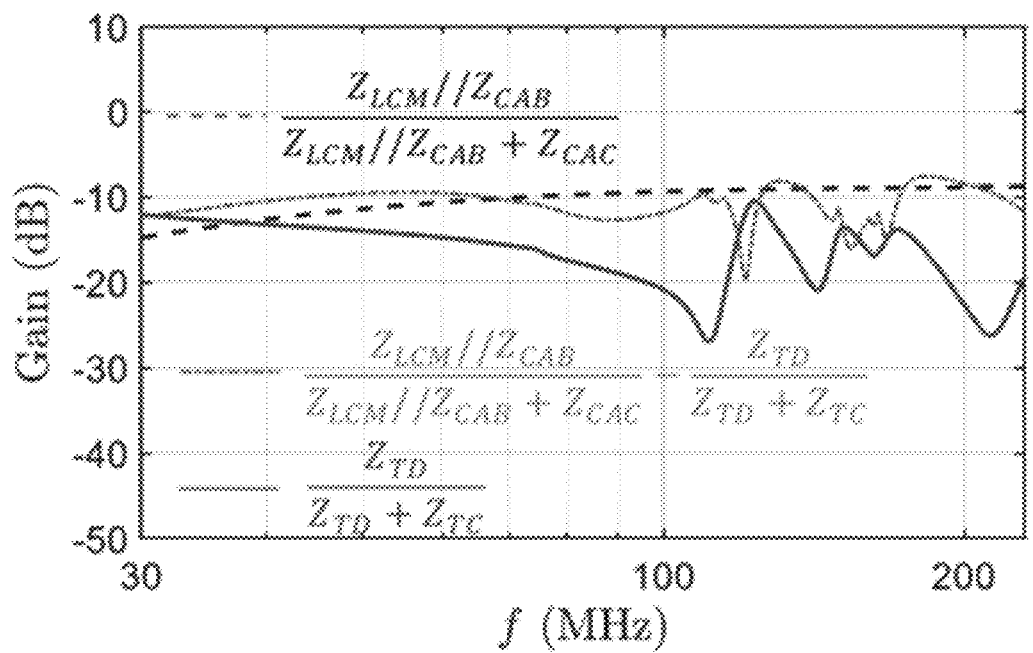
FIG. 27 illustrates results associated with a balance condition of a Wheatstone-bridge of FIG. 26, for use with embodiments of the present disclosure.

FIG. 26 illustrates an example radiated EMI model including capacitive couplings, for use with embodiments of the present disclosure. FIG. 27 illustrates results associated with a balance condition of a Wheatstone-bridge of FIG. 26, for use with embodiments of the present disclosure.

The radiated EMI model is improved from FIG. 24B to include the impedances of CAC and CAB in FIG. 26. The improved model is a Wheatstone bridge with VSW1 as the noise source and the antenna impedance as the load. The output voltage VAD (voltage between nodes NA and ND) of the bridge due to the unbalance is the excitation voltage of the antenna. The voltage gain is defined in (1) below:

$$\frac{V_{AD}}{V_{SW1}} \approx \left(\frac{Z_{Antenna}}{Z_{LCM} // Z_{CAB} // Z_{CAC} + Z_{Antenna}}\right) \quad (1)$$

$$\left(\frac{Z_{LCM} // Z_{CAB}}{Z_{LCM} // Z_{CAB} + Z_{CAC}} - \frac{Z_{TD}}{Z_{TD} + Z_{TC}}\right)$$

In equation (1), the 2nd factor represents the balance condition of the Wheatstone-bridge. Based on the extracted parasitic impedances in FIG. 20 and FIG. 23, FIG. 27 shows the results of the 2nd factor. Compared with the balance curve without CAC, i.e. ZTD/(ZTD ZTC) in the same figure, the capacitive coupling CAC introduces more unbalance, so it greatly increases VAD and the radiated EMI.

Based on the preliminary radiation model in FIG. 24B the radiated power Pr on Rr can be predicted and the radiated maximum electric field intensity Emax at distance r from the converter is given by (2) for this preliminary model:

$$E_{max} = \sqrt{\frac{nD_o P_r}{2\pi r^2}} = \sqrt{\frac{nD_o}{2\pi r^2}} \times \frac{|V_{GNDs}|}{|Z_{Antenna} + Z_{LCM} + Z_{TC} // Z_{TD}|} \sqrt{R_r} \quad (2)$$

where n is the characteristic impedance $120\pi\Omega$; Do is the maximum directivity of the antenna at distance r.

Based on (2), the insertion gain $IG_{LCM}$ of $L_{CM}$, which is defined as the ratio of the radiated $E_{max}$ with $L_{CM}$ to that without $L_{CM}$, can be derived in (3):

$$IG_{LCM} = \frac{1}{|1 + Z_{LCM} / (Z_{Antenna} + Z_{TC} // Z_{TD})|} \approx \frac{1}{|1 + Z_{LCM} / Z_{Antenna}|} \quad (3)$$

Figure 28:
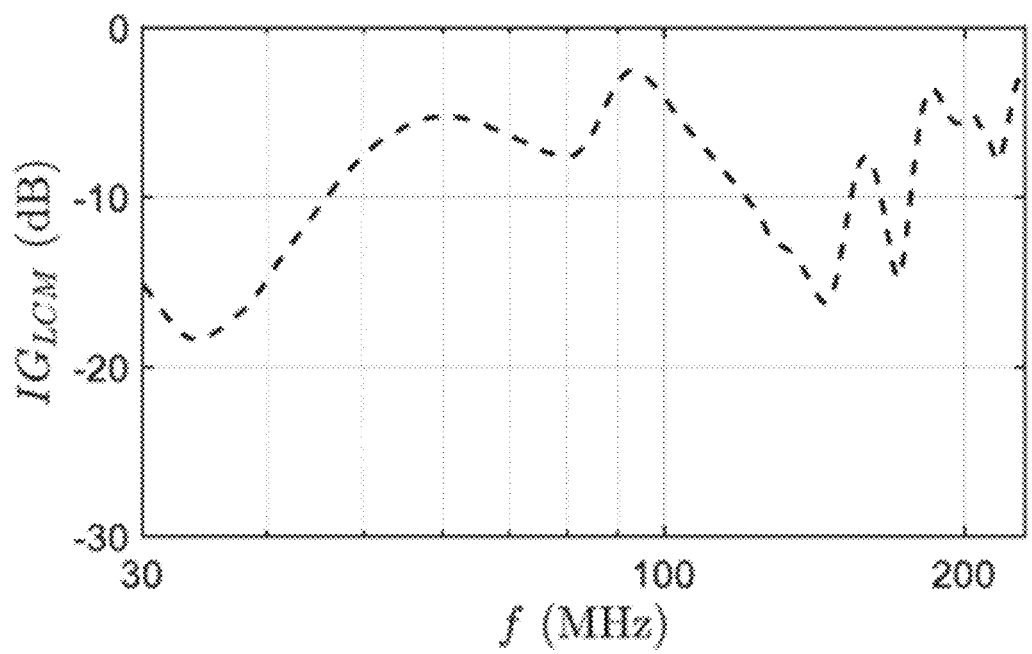
FIG. 28 illustrates example calculated insertion gain of a CM choke for the example radiated EMI model of the present disclosure.

From (3), high $Z_{LCM}$ can reduce radiated EMI. FIG. 28 illustrates example calculated insertion gain of a CM choke for the example radiated EMI model of the present disclosure (e.g., calculated based on (3)). $L_{CM}$ can reduce radiated EMI by 3 dB to 18 dB from 30 MHz to 230 MHz.

Figure 29A:
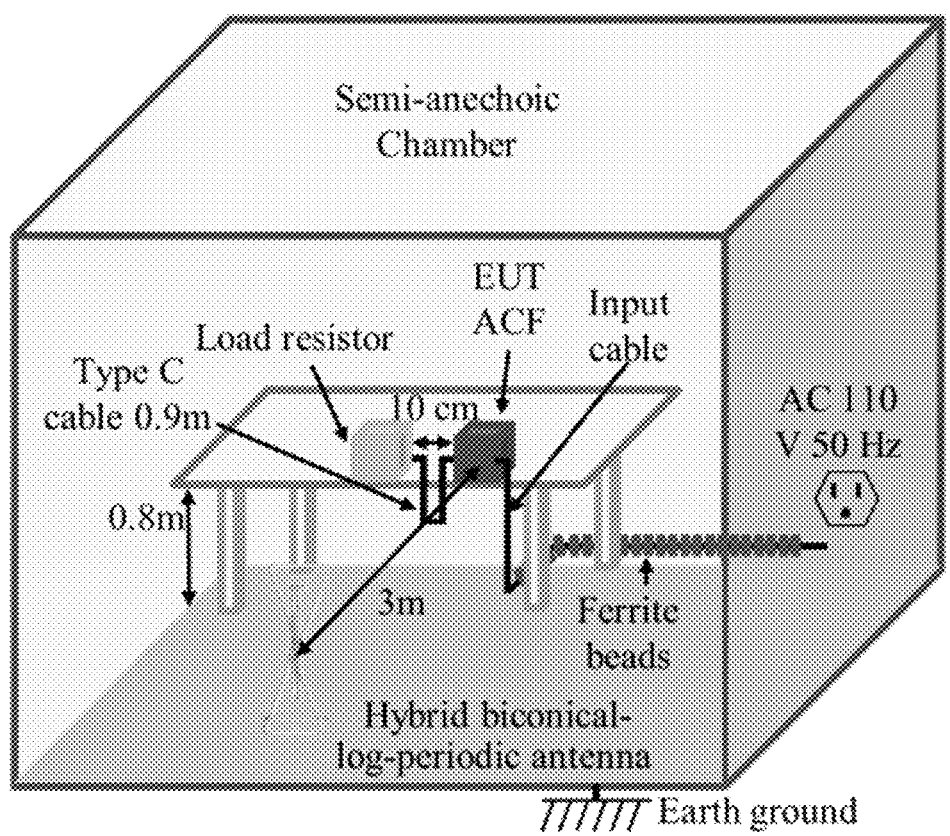
FIGS. 29A and 29B illustrate an example radiated EMI measurement in a semi-anechoic chamber, for use with embodiments of the present disclosure.
Figure 29B:
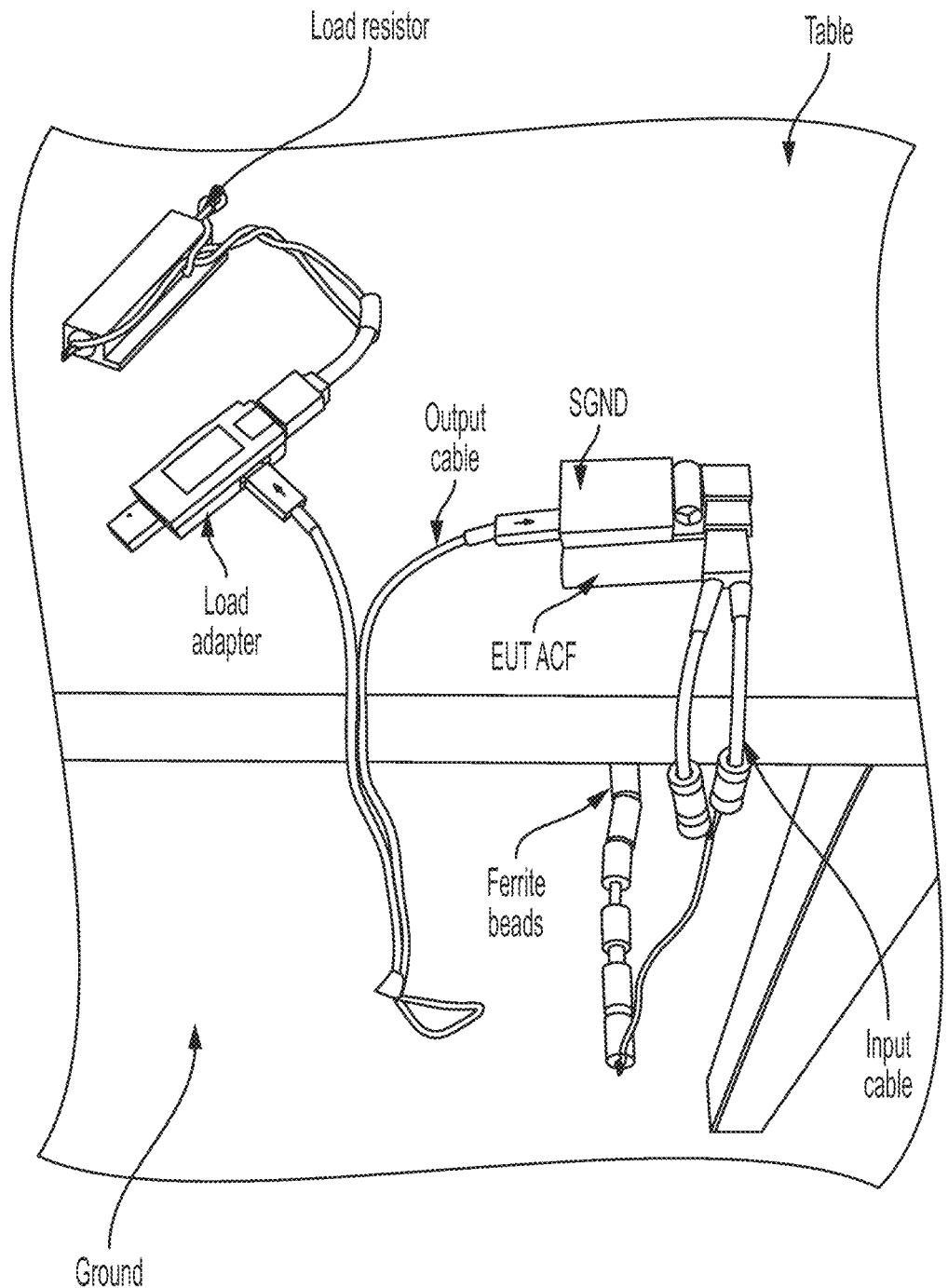

FIGS. 29A and 29B illustrate an example radiated EMI measurement in a semi-anechoic chamber, for use with embodiments of the present disclosure. The radiated EMI of the ACF can be measured in a 3-meter semi-anechoic chamber as shown in FIGS. 29A-29B, according to the EMI standard EN55032 class B for power adapters. Ferrite beads (Fair-Rite 0431167281) are used on the input cable before the AC plug to isolate the grid from the measurement.

Figure 30:
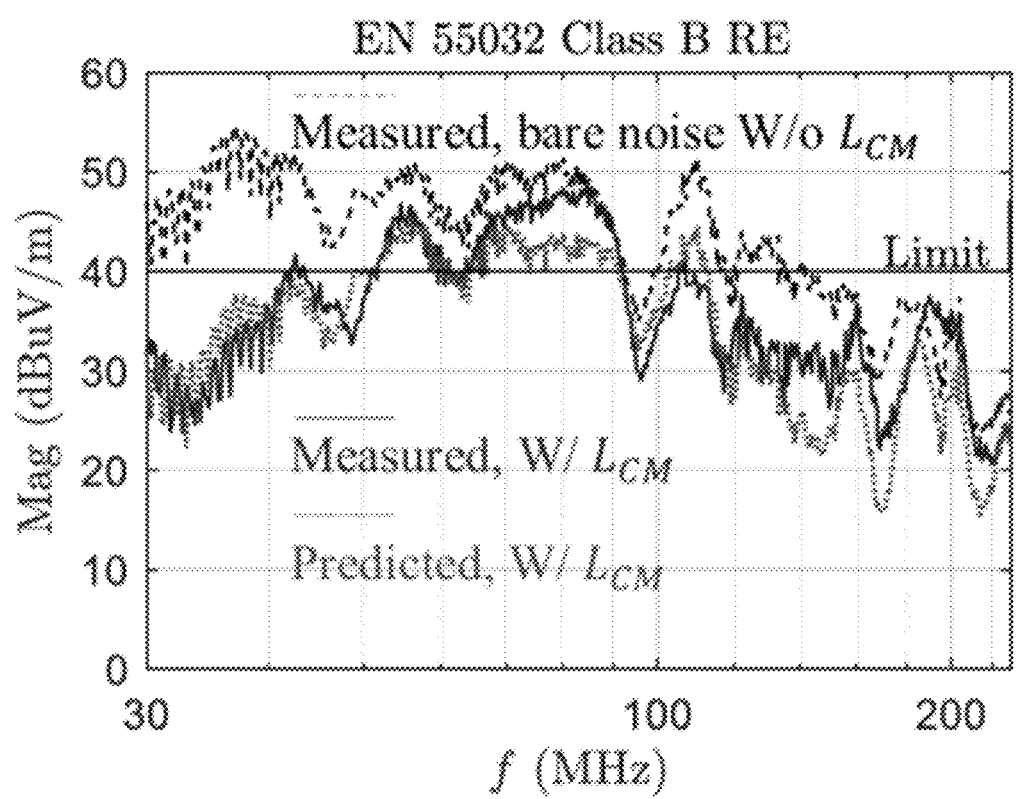
FIG. 30 illustrates a comparison of measured and predicted radiated EMI, according to embodiments of the present disclosure.

Based on the measured EMI without the CM choke and the calculated insertion gain of the CM choke, the radiated EMI with the CM choke is predicted and compared with the measured in FIG. 30. The measured is several dB higher than the predicted above 70 MHz because of the capacitive coupling CAC as analyzed above. Furthermore, the radiated EMI cannot meet the EMI limit below 120 MHz.

Figure 31A:
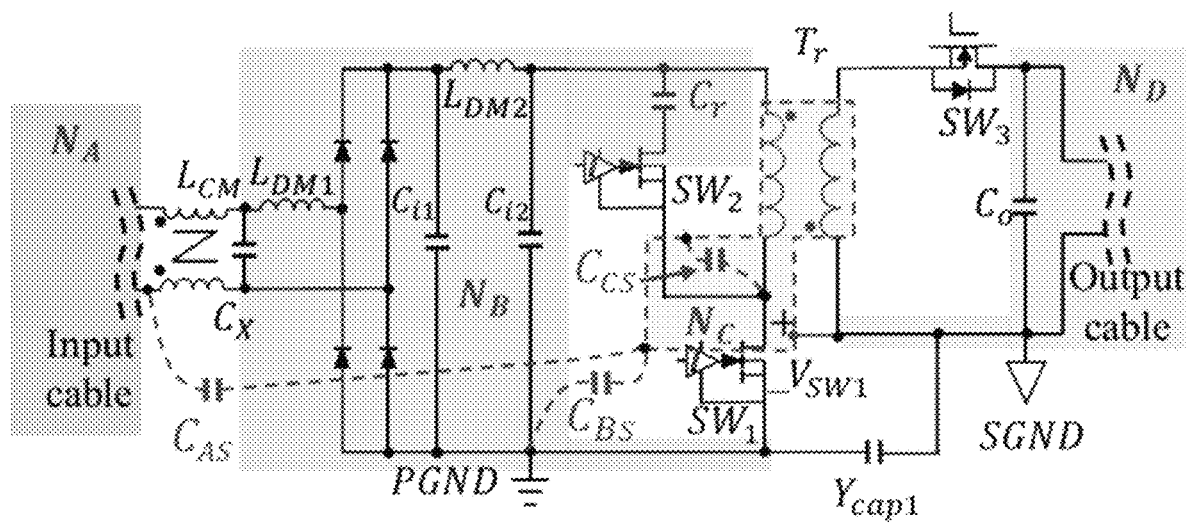
FIGS. 31A and 31B illustrate an example of applying a shielding to a pulsating node, according to embodiments of the present disclosure.
Figure 31B:
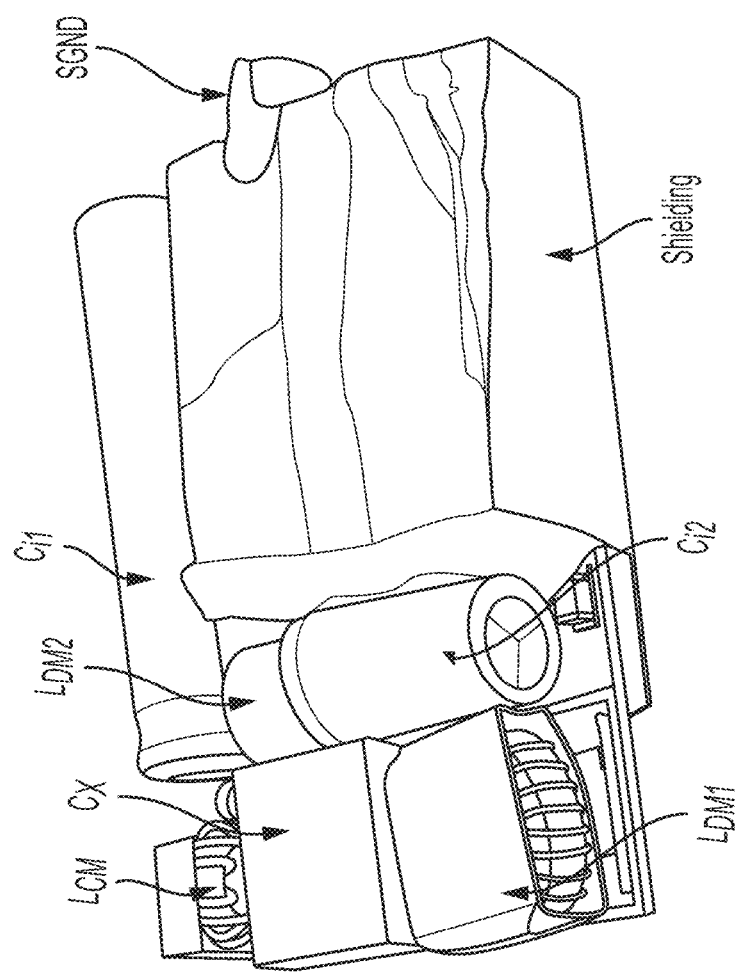

FIGS. 31A and 31B illustrate an example of applying a shielding to a pulsating node, according to embodiments of the present disclosure. Based on the analysis above, the capacitive coupling $C_{AC}$ should be reduced to reduce the radiated EMI. To validate the impacts of capacitive coupling $C_{AC}$, an experiment is illustrated conducted in FIGS. 31A and 31B. A copper shielding is applied to node NC with the traces and components including the whole transformer identified in Table I as shielded. The shielding is connected to SGND, so the capacitive coupling between NA and NC is bypassed to SGND, and the $C_{AC}$ is eliminated. With the shielding, CCD and CBC in FIG. 31A are also eliminated. The parasitic capacitance CCS and CAS represent the capacitive couplings between NC and the shielding, and between shielding and NA. CAS is in parallel with ZAntenna, so it can help reduce the radiated EMI. CCS is part of Z'TC. CBS between the shielding and NB is part of Z'TD.

Figure 32:
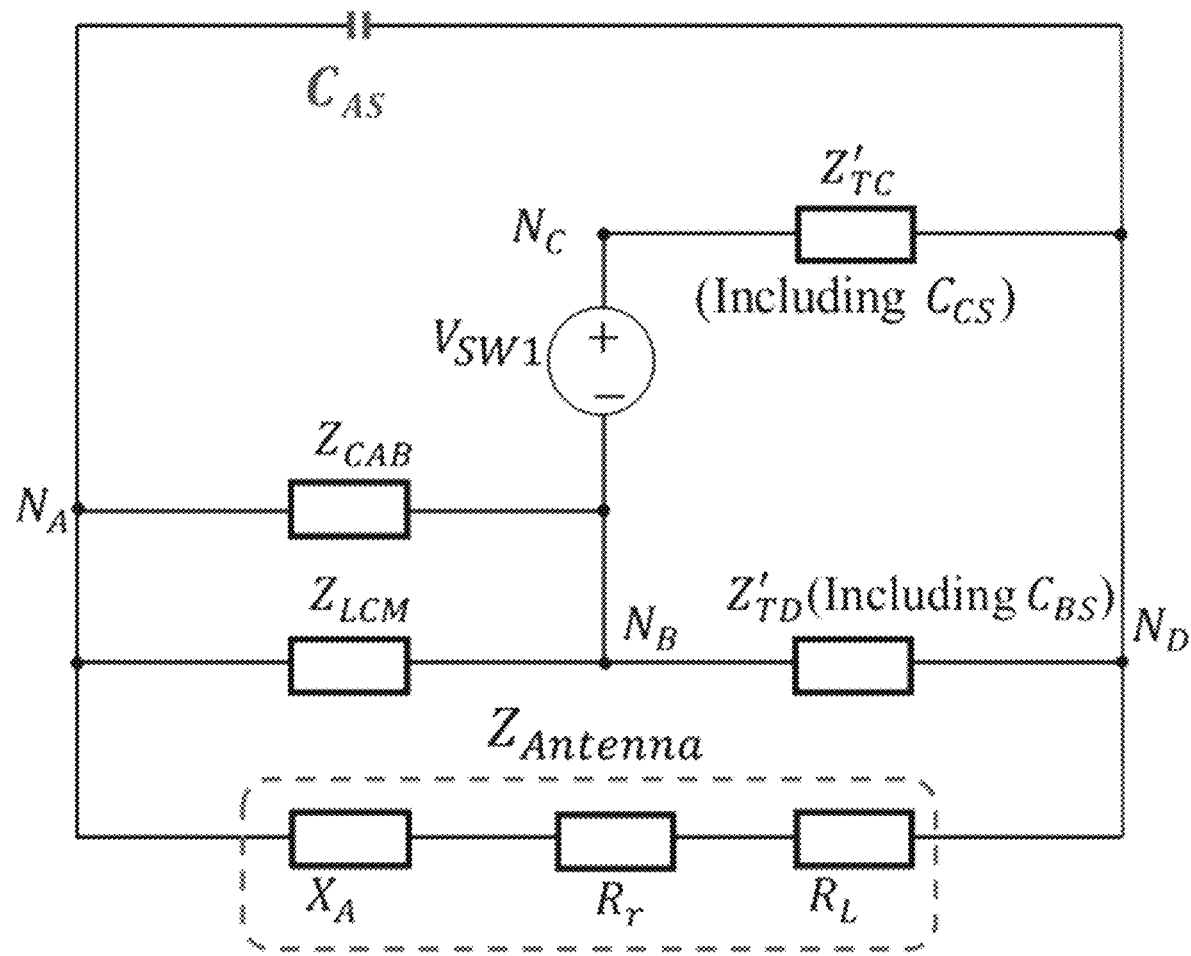
FIG. 32 illustrates an example radiated EMI model with a node Nc shielded, for use with embodiments of the present disclosure.

FIG. 32 illustrates an example radiated EMI model with a node Nc shielded, for use with embodiments of the present disclosure. Z'TC and Z'TD can be extracted similar to that of ZTC and ZTD in FIGS. 22A-D.

Figure 33:
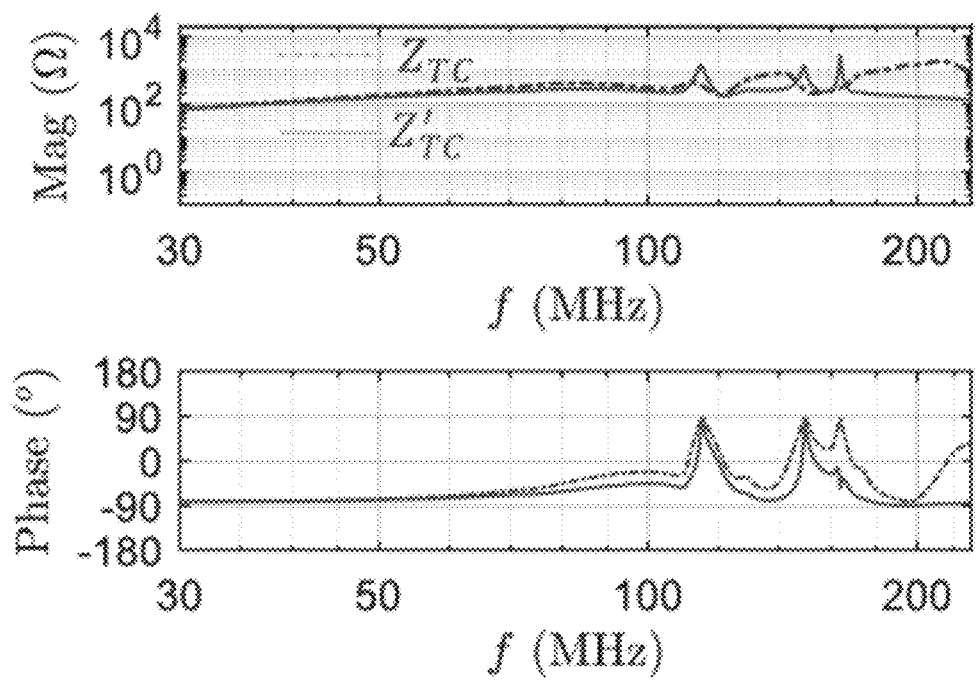
FIG. 33 illustrates a comparison of extract $Z_{TC}$ and $Z'_{TC}$, according to embodiments of the present disclosure.

FIG. 33 illustrates a comparison of extract ZTC and Z'TC, according to embodiments of the present disclosure. Similar to the extraction of CBD and CCD with the transformer removed, CCS and CBS are extracted as 1.93 pF and 4.7 pF. They are only slightly bigger than CCD and CBD, so Z'TC and Z'TD are close to ZTC and ZTD. It should be pointed out that because the extracted impedance of CCS above 160 MHz is determined by high order parasitics, the difference between Z'TC and ZTC is bigger above 160 MHz in FIG. 33. The capacitive coupling between the shielding and ND is shorted so it does not contribute to the radiated EMI. It should be pointed out that, the shielding should be connected to SGND rather than PGND. If the shielding is connected to PGND, the capacitive couplings between NA and the shielding can increase CAB which degrades the performance of the CM choke.

Figure 34:
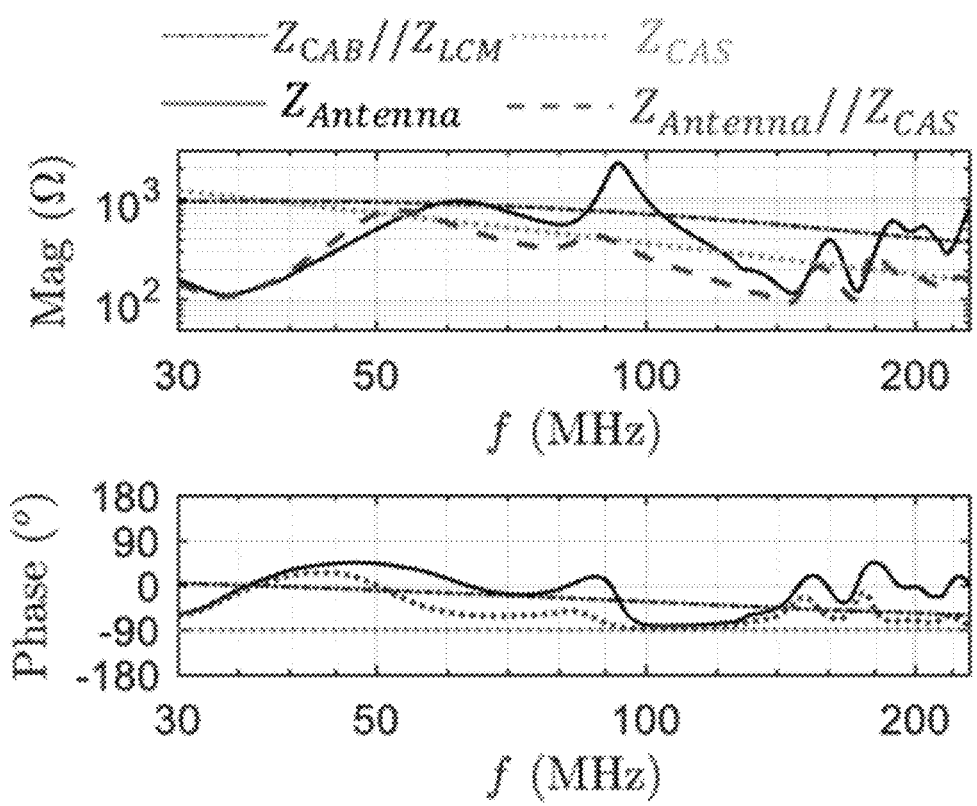
FIG. 34 illustrates an impedance comparison, according to embodiments of the present disclosure.

FIG. 34 illustrates an impedance comparison, according to embodiments of the present disclosure. CAS is extracted as 4.38 pF. It is in parallel with the cable antenna, so the parallel impedance is smaller than the antenna impedance above 55 MHz as in FIG. 34. Because the parallel impedance is smaller than ZCAB//ZLCM, based on the model in FIG. 32, CAS helps reduce the radiated EMI above 55 MHz. The voltage gain from $V_{SW1}$ to $V_{AD}$ is:

$$\frac{V_{AD}}{V_{SW1}} \approx \left(\frac{Z_{Antenna} // Z_{CAS}}{Z_{CAB} // Z_{LCM} + Z_{Antenna} // Z_{CAS}}\right)\left(\frac{Z'_{TD}}{Z'_{TC} + Z'_{TD}}\right) \quad (4)$$

Figure 35:
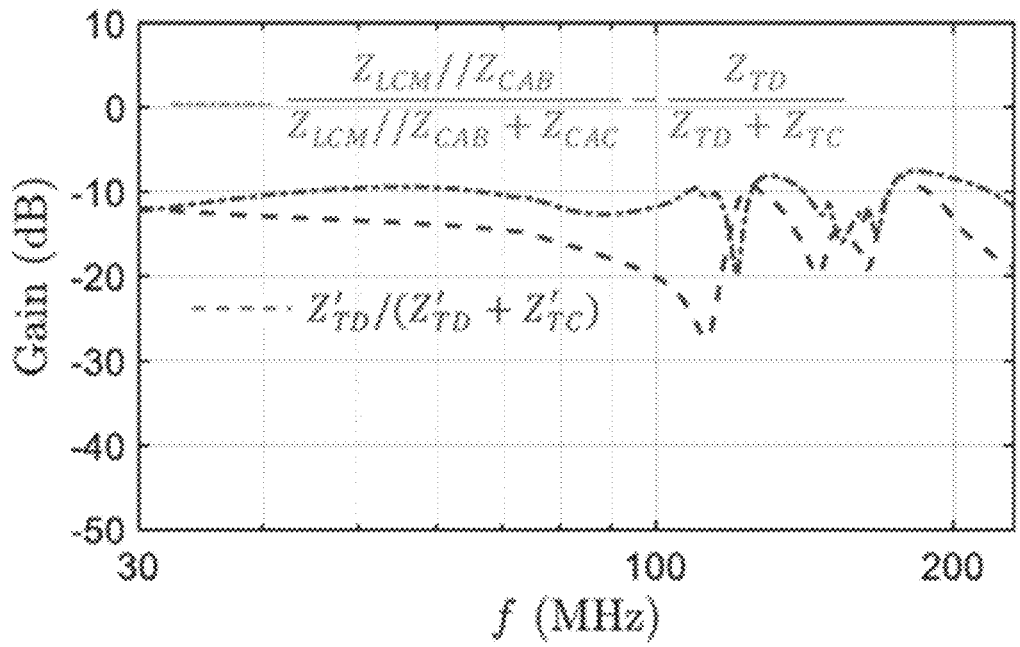
FIG. 35 illustrates a gain comparison, according to embodiments of the present disclosure.
Figure 36:
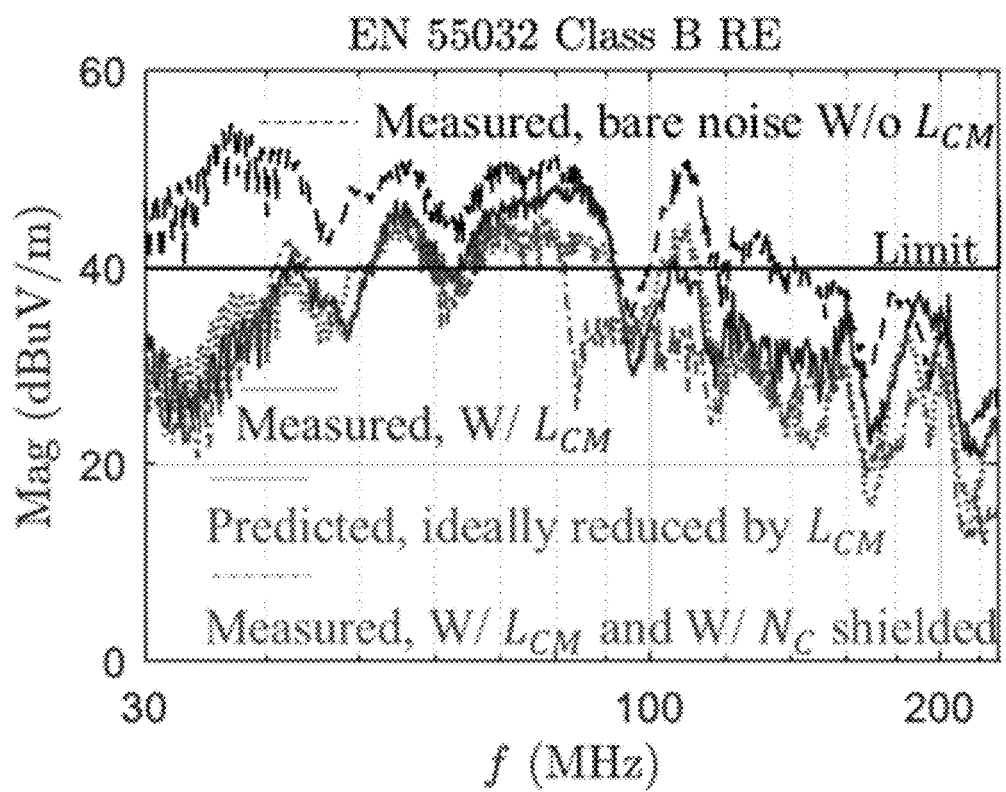
FIG. 36 illustrates measured radiated EMI reduction as a result of shielding Nc, according to embodiments of the present disclosure.

FIG. 35 illustrates a gain comparison, according to embodiments of the present disclosure. FIG. 36 illustrates measured radiated EMI reduction as a result of shielding Nc, according to embodiments of the present disclosure. Comparing (4) with (1), the 1st factor in (4) is greatly smaller than that in (1) due to the impedance of CAS, which will be shown later in FIG. 40A. The 2nd factor in (4) is also smaller than that in (1) as shown in FIG. 35. The measured radiated EMI in FIG. 36 verified this. In FIG. 36, the radiated EMI with the shielding applied is even lower than the predicted one with LCM but no capacitive couplings because the shielding not only eliminates the undesired capacitive couplings such as CAC but also introduces desired capacitive coupling such as CAS, which helps further reduce the radiated EMI.

Whole Converter Shielding Technique

Figure 37:
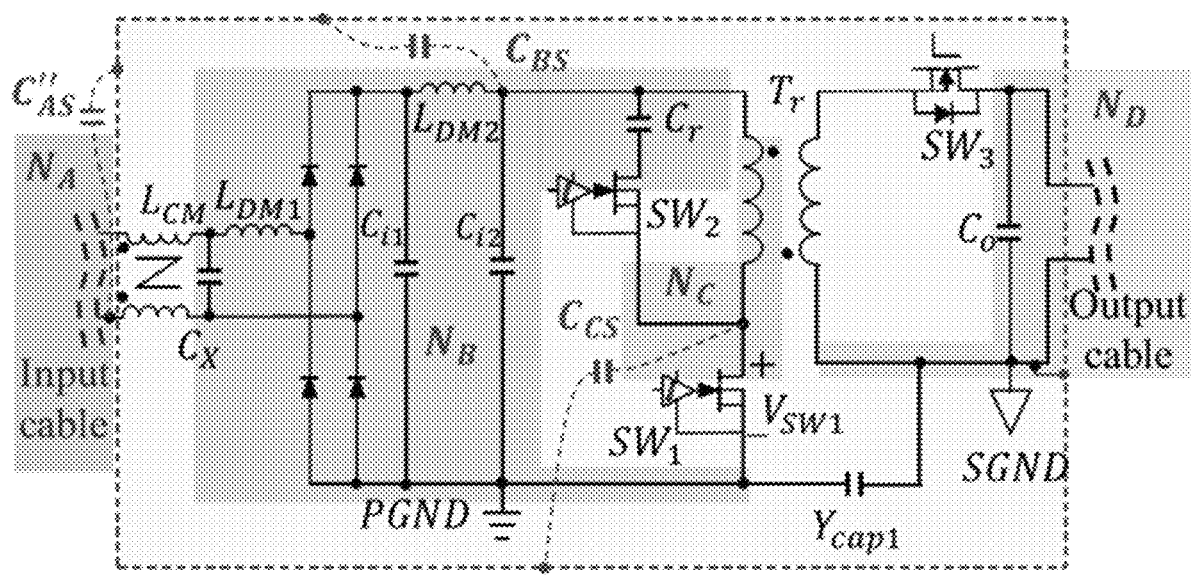
FIG. 37 illustrates an example of applying shielding to an entire example converter, for use with embodiments of the present disclosure.

FIG. 37 illustrates an example of applying shielding to an entire example converter, for use with embodiments of the present disclosure. Shielding the whole converter with the shielding connected to SGND, as shown in FIG. 37, will have better performance than shielding NC because of four reasons: 1) CAC is eliminated because the whole converter shielding can bypass the capacitive couplings between NA and NC to SGND; 2) CAB is eliminated by the shielding because the shielding bypasses the coupling to SGND so ZLCM is not compromised; 3) CAS (C"AS for this case), which is in parallel with the antenna, is increased; 4) the capacitive coupling CBS between the shielding (SGND) and node NB (PGND) is increased to help further reduce the high frequency radiated EMI. For 3) and 4) above, compared with the partial shielding in FIGS. 31A and 31B, the whole converter shielding has a bigger shielding area, is closer to input cable NA, and covers much more area of NB, including Ci1, Ci2, LDM1, LDM2, and the diode bridge, than the partial shielding, so it has a bigger CBS and C"AS>CAS. The parasitics are extracted as CCS=1.93 pF, C"AS=8.58 pF, and CBS=11.3 pF.

Figure 38:
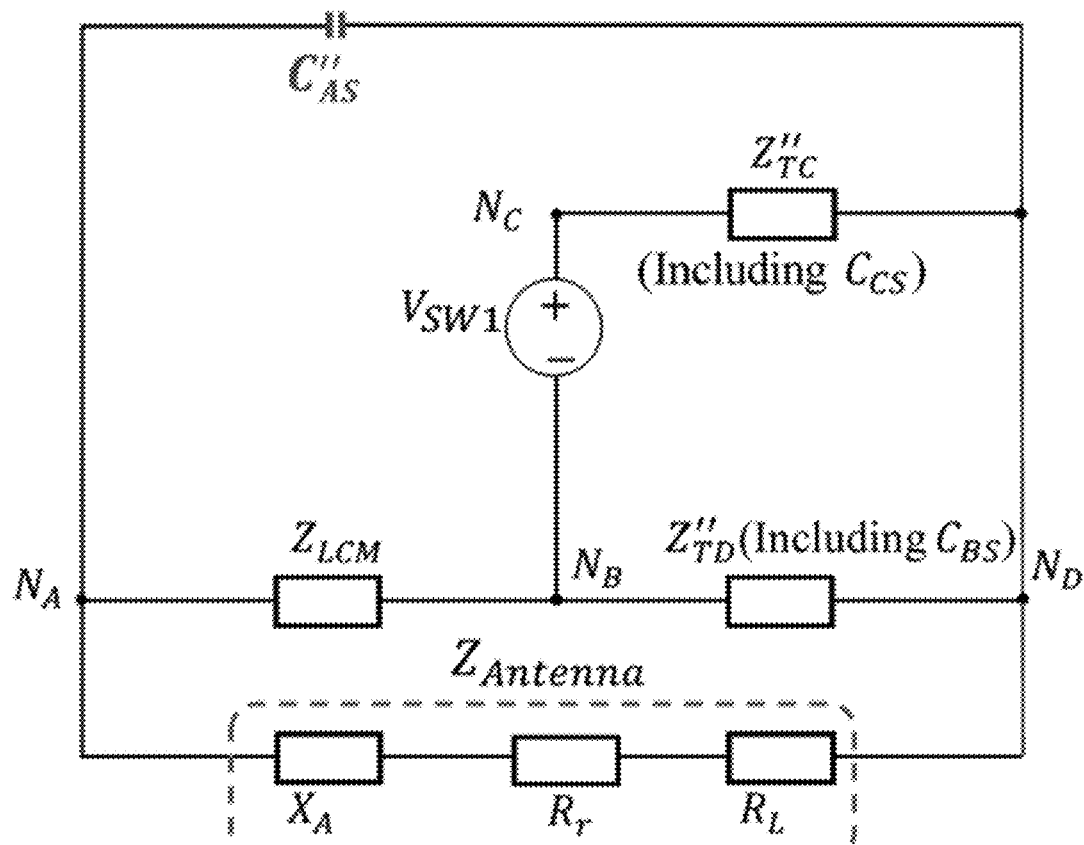
FIG. 38 illustrates an example radiated EMI model with the example entire converter shielded, for use with embodiments of the present disclosure.
Figure 39:
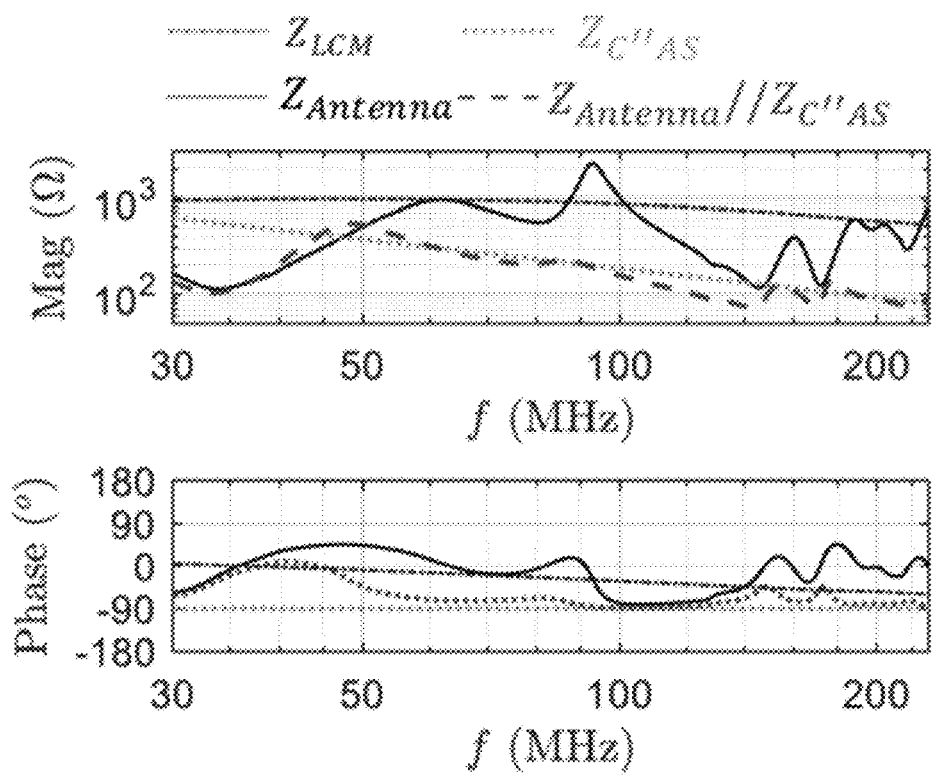
FIG. 39 illustrates an impedance comparison, according to embodiments of the present disclosure.

FIG. 38 illustrates an example radiated EMI model with the example entire converter shielded, for use with embodiments of the present disclosure. FIG. 39 illustrates an impedance comparison, according to embodiments of the present disclosure. The radiated EMI model is in FIG. 38. Compared with FIG. 32, Z"TD is smaller than Z'TD; ZLCM is bigger than ZLCM//ZCAB and C"AS is bigger than CAS. All of these help greatly reduce radiated EMI. In FIG. 39, the impedance of the CM choke is much bigger than the parallel impedance of antenna and C"AS in the whole frequency range. The voltage gain is:

$$\frac{V_{AD}}{V_{SW1}} \approx \left(\frac{V_{Antenna} // V_{C''AS}}{V_{LCM} + V_{Antenna} // V_{C''AS}}\right)\left(\frac{Z''_{TD}}{Z''_{TC} + Z''_{TD}}\right) \quad (5)$$

Figure 41:
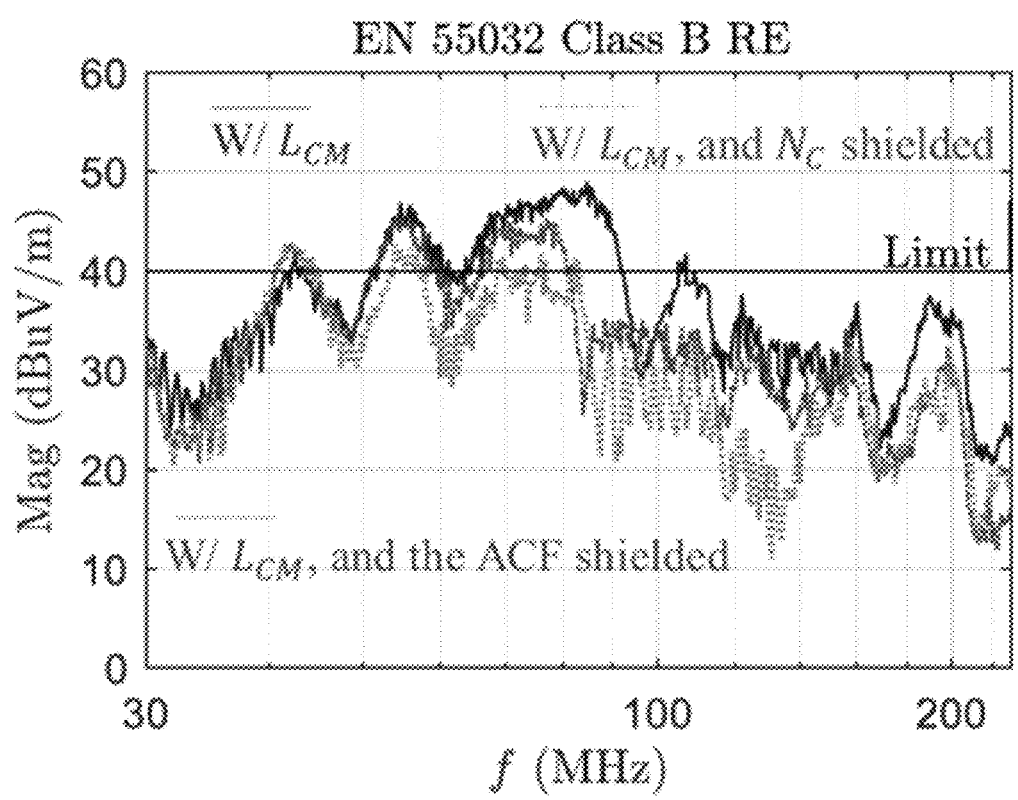
FIG. 41 illustrates example reduction in radiated EMI by shielding the entire converter, according to embodiments of the present disclosure.

FIG. 41 illustrates example reduction in radiated EMI by shielding the entire converter, according to embodiments of the present disclosure. In FIG. 41, it is shown that, with the whole converter shielding, the radiated EMI can be further reduced above 50 MHz compared with the NC shielding. This validates the analysis. It should be noted that based on the measurements, the shielding does not sacrifice the converter efficiency (93%) because the eddy current due to the leakage magnetic field of the transformer is very small. Similar to the shielding in FIGS. 31A and 31B, the total capacitance C"AS+CBS+CCS between the shielding, which is grounded to SGND, and the converter's primary side is around 21.8 pF whose impedance is much higher than the transformer's interwinding impedance and the 1.5 nF Y-capacitor. Its effect on the 50/60 Hz safety leakage current is therefore ignorable.

Figure 40A:
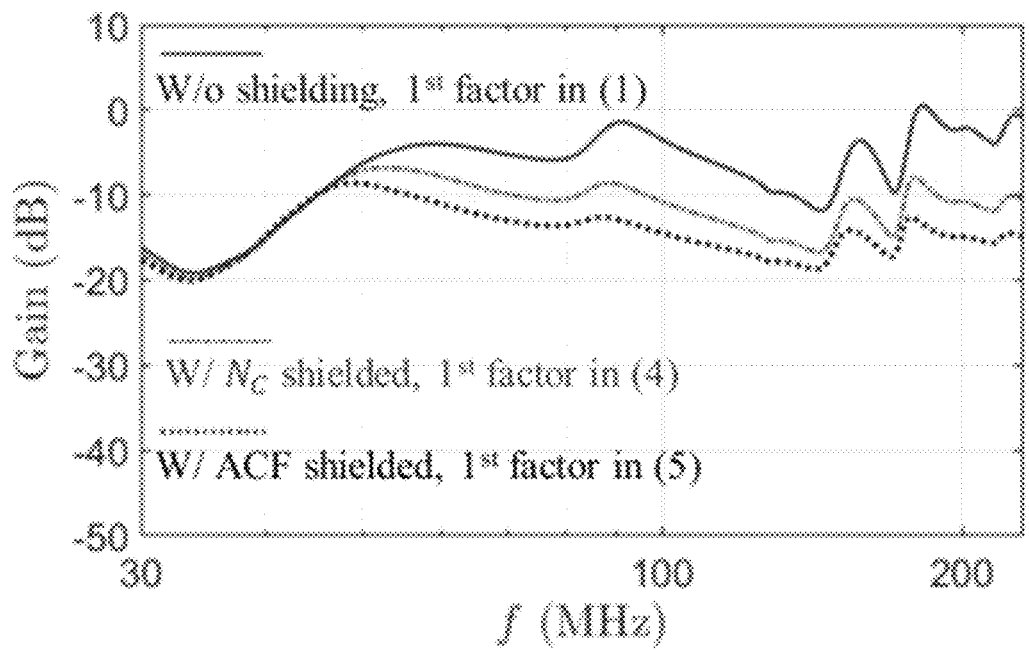
FIGS. 40A and 40B illustrate comparisons of predicted voltage gains, according to embodiments of the present disclosure.
Figure 40B:
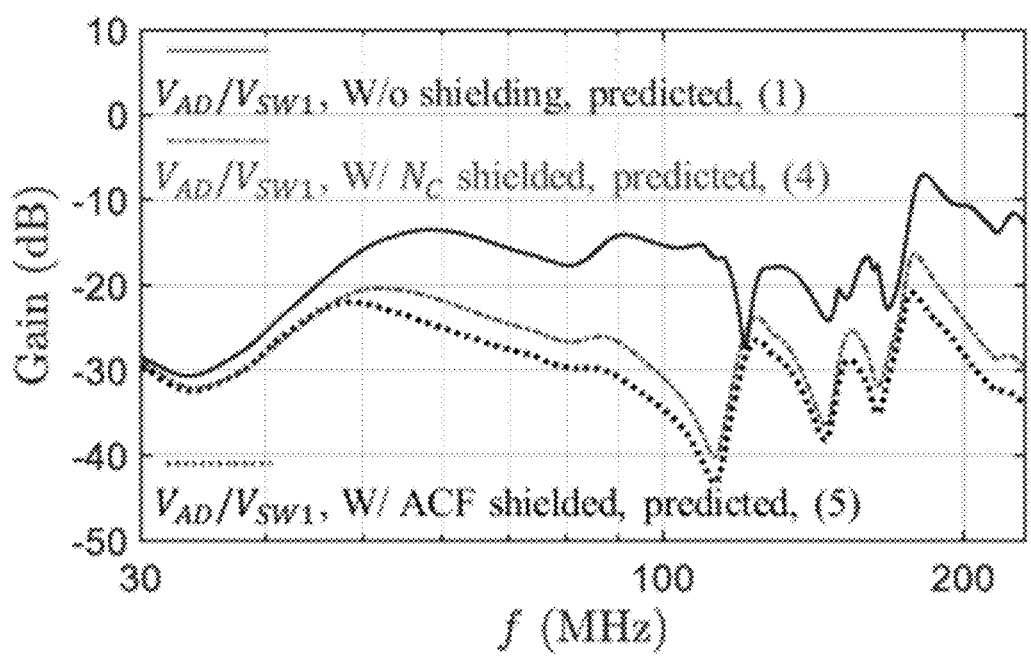

FIGS. 40A and 40B illustrate comparisons of predicted voltage gains, according to embodiments of the present disclosure. The predicted radiated EMI reduction in FIGS. 40A and 40B is larger than the measured in FIG. 41 because, as discussed herein, the model in FIG. 38 is based on the lumped instead of distributed capacitive couplings, so it gives a qualitative view but not a quantitative view.

Improved Whole Converter Shielding Technique

Figure 42A:
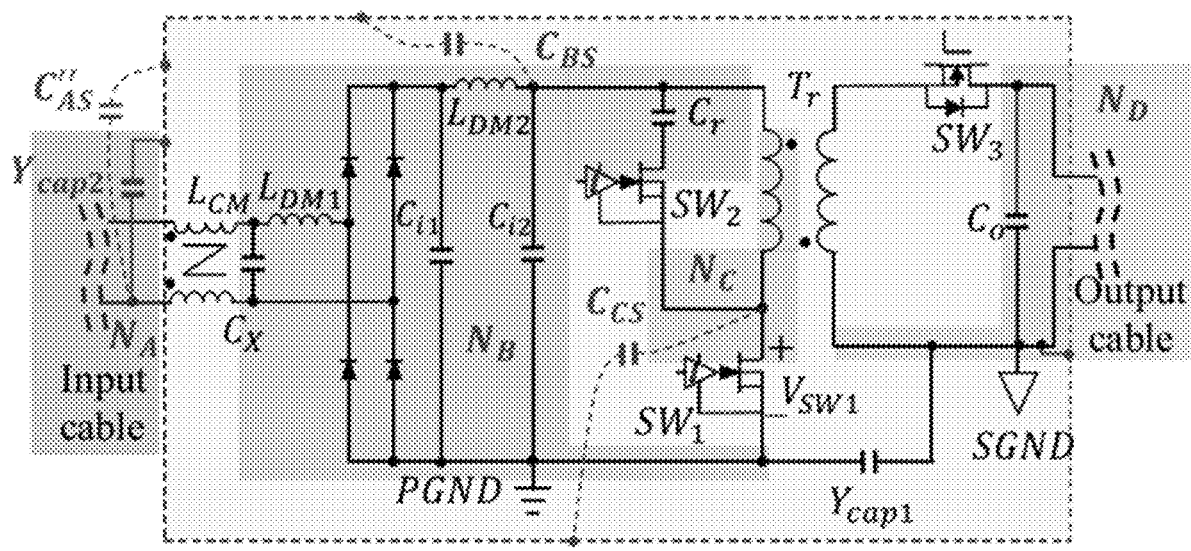
FIGS. 42A and 42B illustrate an example CLC shielded CM filter, according to embodiments of the present disclosure.
Figure 42B:
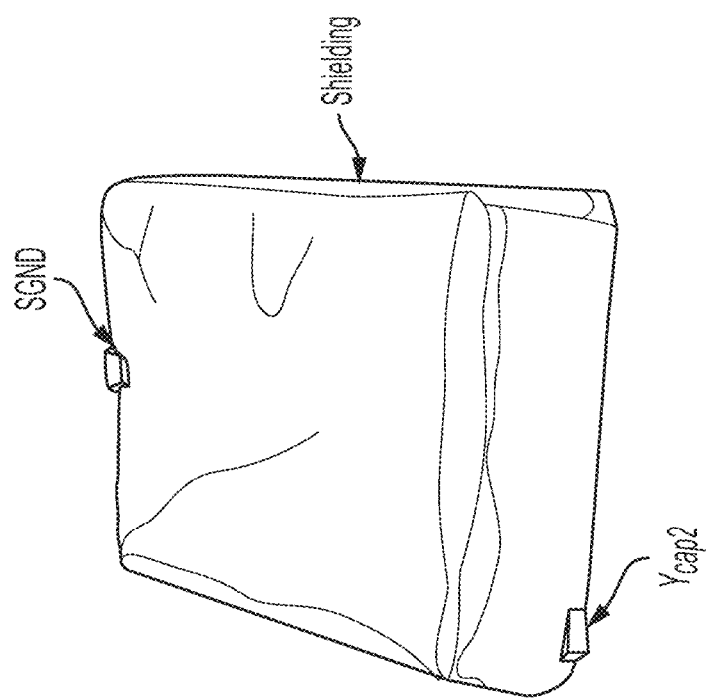

FIGS. 42A and 42B illustrate an example CLC shielded CM filter, according to embodiments of the present disclosure. Since the whole converter shielding and the increased CAS can help reduce the radiated EMI, it is appropriate to add a small capacitor Ycap2 from NA to the shielding as shown in FIGS. 42A and 42B to increase CAS on purpose. Ycap2, LCM, and Ycap1 form a CLC CM EMI filter. Ycap2 is connected to SGND via the shielding which has a very small inductance, so it has good HF performance.

The impedance of Ycap2 should be as small as possible to reduce the excitation voltage on the antenna. At the same time, Ycap1 has been designed to meet the conductive EMI standard, so it should be not changed. Because both Ycap1 and Ycap2 generate leakage current from the AC line to DC output, Ycap2 should be kept small to meet safety requirements. In high-frequency range, the equivalent series inductance (ESL) of a Y-capacitor is significantly influenced by the packaging technique. Therefore, a small form factor SMD 1808, 100 pF safety capacitor is selected.

Figure 43:
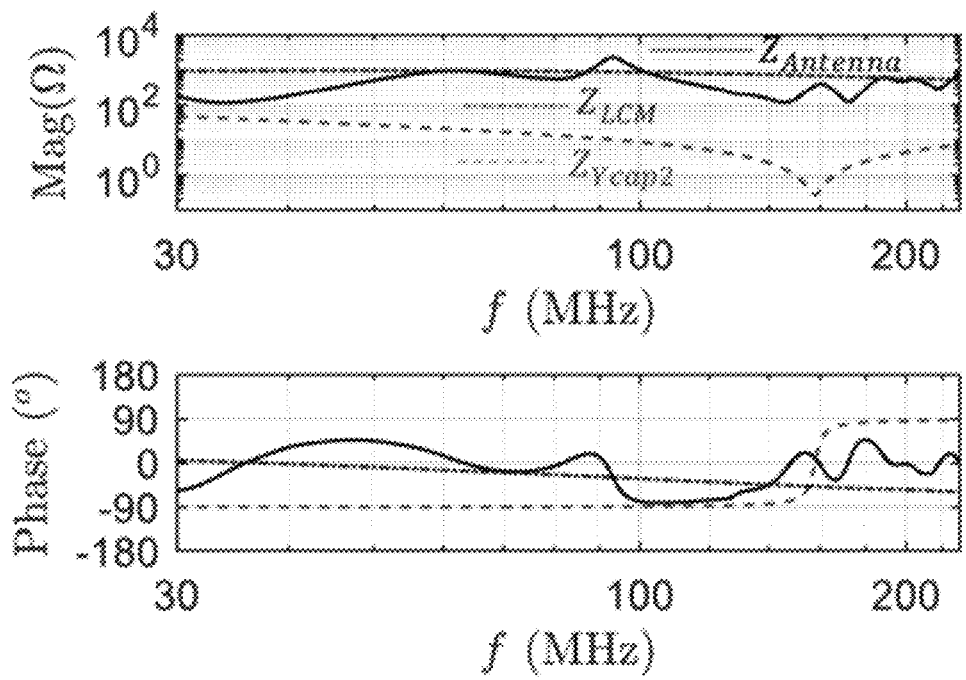
FIG. 43 illustrates an impedance comparison, according to embodiments of the present disclosure.

FIG. 43 illustrates an impedance comparison, according to embodiments of the present disclosure. The impedance ZYcap2 including both the impedances of Ycap2 and the shielding from NA to ND is much smaller than other impedances above 50 MHz in FIG. 43. Because of this, the excitation voltage of the antenna, thus the radiated EMI can be greatly reduced.

Figure 44:
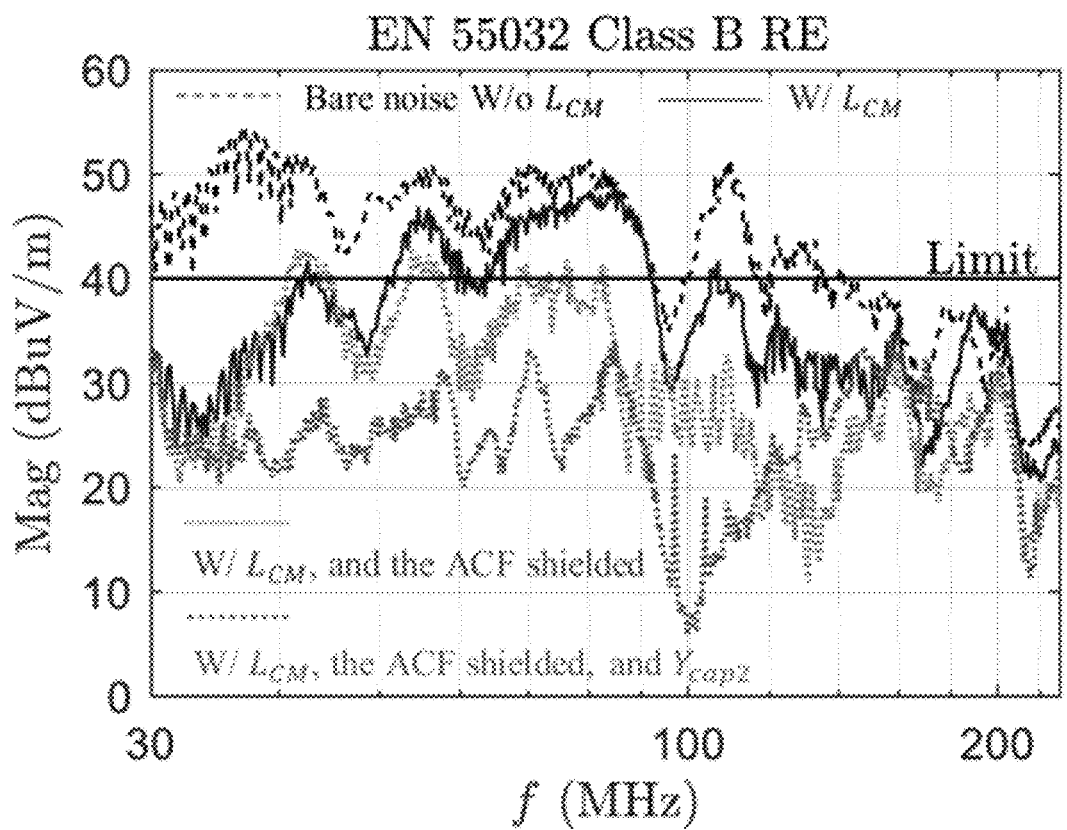
FIG. 44 illustrates a radiated EMI comparison, according to various embodiments of the present disclosure.

FIG. 44 illustrates a radiated EMI comparison, according to various embodiments of the present disclosure. The measured radiated EMI compared with the other three cases is shown in FIG. 44. In FIG. 44, the radiated EMI is greatly reduced from 40 MHz to 120 MHz compared with that without Ycap2. It can meet the radiated EMI limit.

Figure 45:
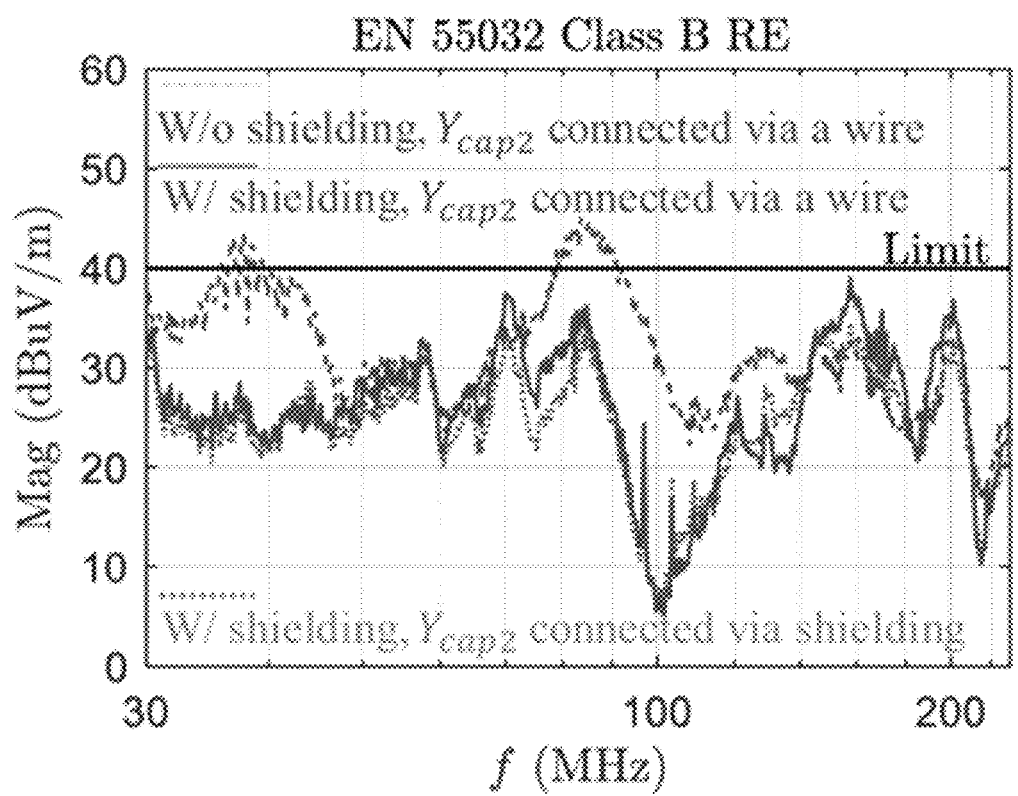
FIG. 45 illustrates a radiated EMI comparison, according to various embodiments of the present disclosure.

When implementing the proposed techniques herein, a full converter shielding grounded to SGND with Ycap2 connected to the shielding gives the best radiated EMI reduction. FIG. 45 illustrates a radiated EMI comparison, according to various embodiments of the present disclosure.

FIG. 45 shows the comparison of the measured radiated EMI with different Ycap2 connection patterns. In the first case, without the shielding applied, Ycap2 is directly connected to SGND via a piece of wire. Due to the capacitive couplings CAB and CAC as analyzed herein, the CLC filter (Ycap2-LCM-Ycap1)'s performance is degraded, so it cannot meet the radiated EMI limit. In the second case, the shielding is applied, but Ycap2 is directly connected to SGND via a piece of wire instead of via the shielding. The radiated EMI is much lower than the 1st case. In the 3rd case, the Ycap2 is connected to SGND via the shielding. It leads to the lowest radiated EMI to meet the EMI limit with enough margin.

Figure 46A:
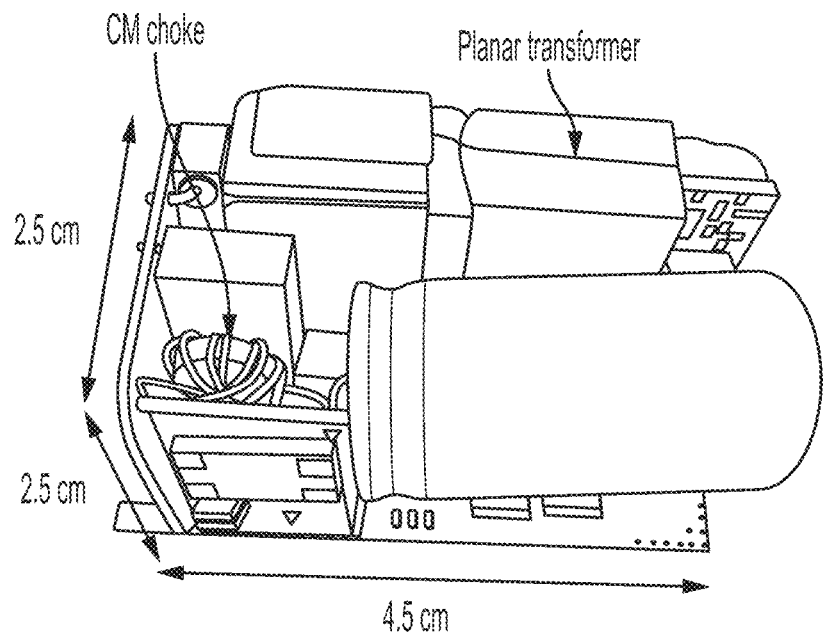
FIGS. 46A and 46B illustrate an alternative ACF converter prototype, according to embodiments of the present disclosure.
Figure 46B:
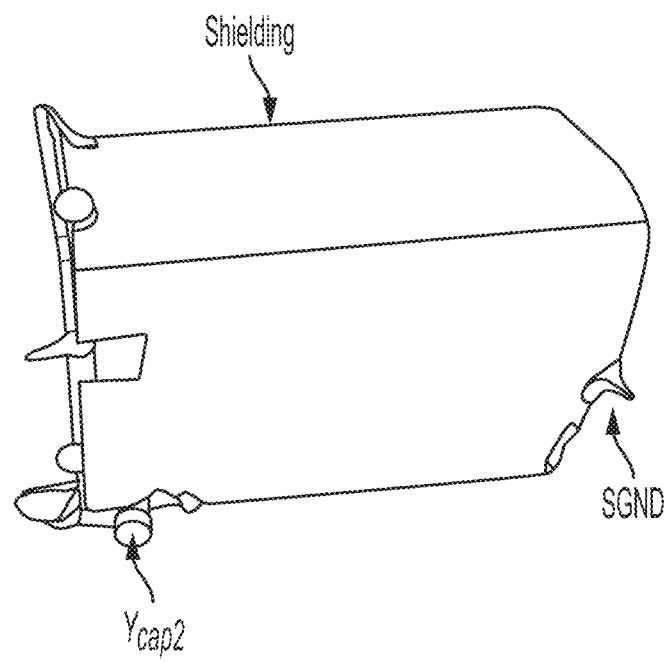
Figure 47:
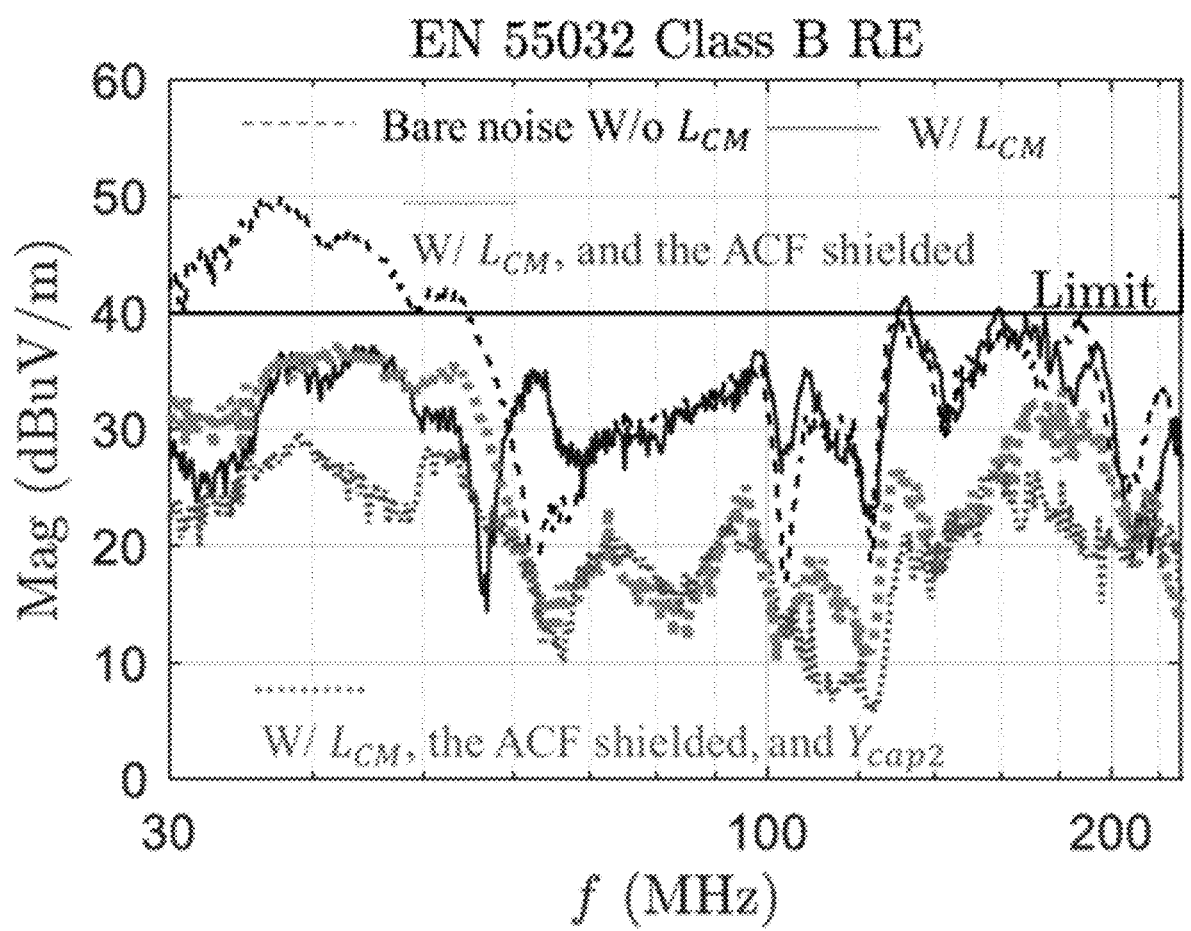
FIG. 47 illustrates a radiated EMI comparison, according to various embodiments of the present disclosure.

FIGS. 46A and 46B illustrate an alternative ACF converter prototype, according to embodiments of the present disclosure. Embodiments described herein are insensitive to different prototypes because of the following: 1) the proposed techniques can eliminate the most important capacitive couplings between NA and NC, and 2) the parasitic capacitance CAS between the shielding and NA can reduce the radiation because it is in parallel with the cable antenna. FIG. 46A shows the proposed techniques applied to another ACF prototype which has different structures and dimensions from the one in FIG. 16B. The measured radiated EMI in FIG. 47 shows that the proposed techniques are very effective.

Figure 48A:
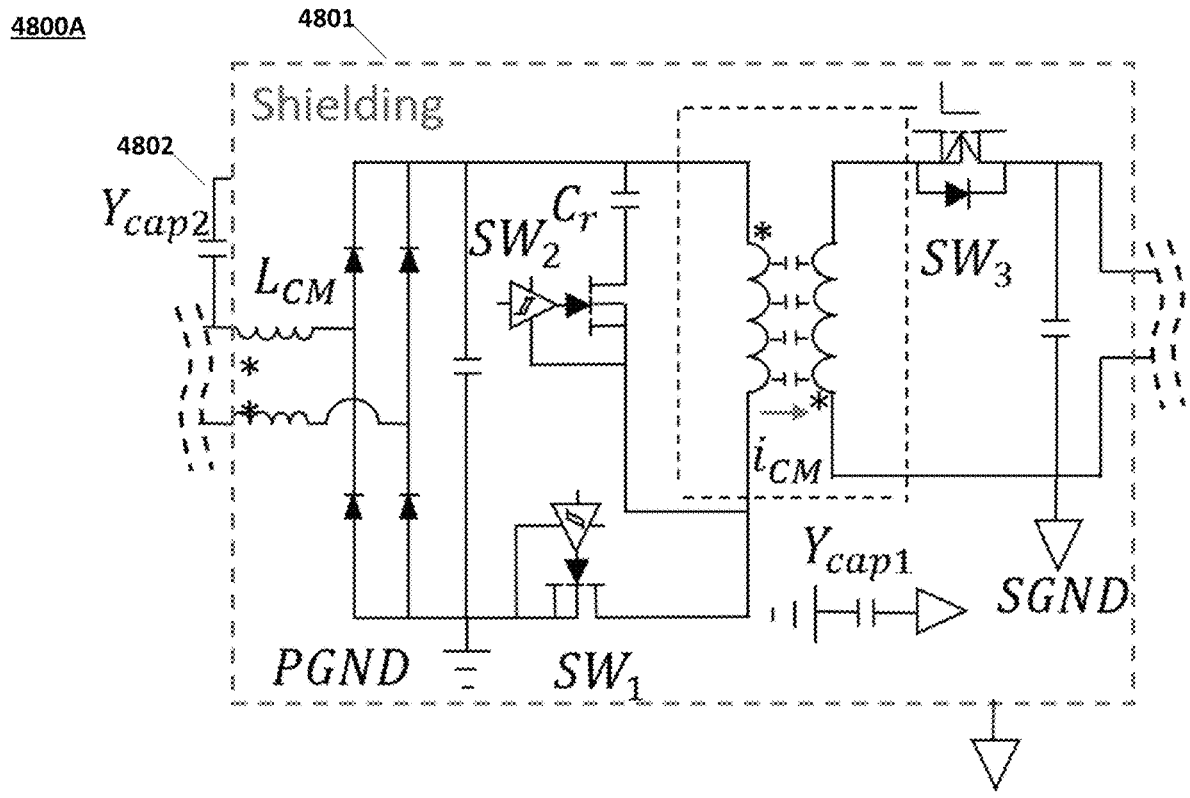
FIGS. 48A, 48B and 48C illustrate example topology variations with CLC shielding CM EMI filters, according to various embodiments of the present disclosure.
Figure 48B:
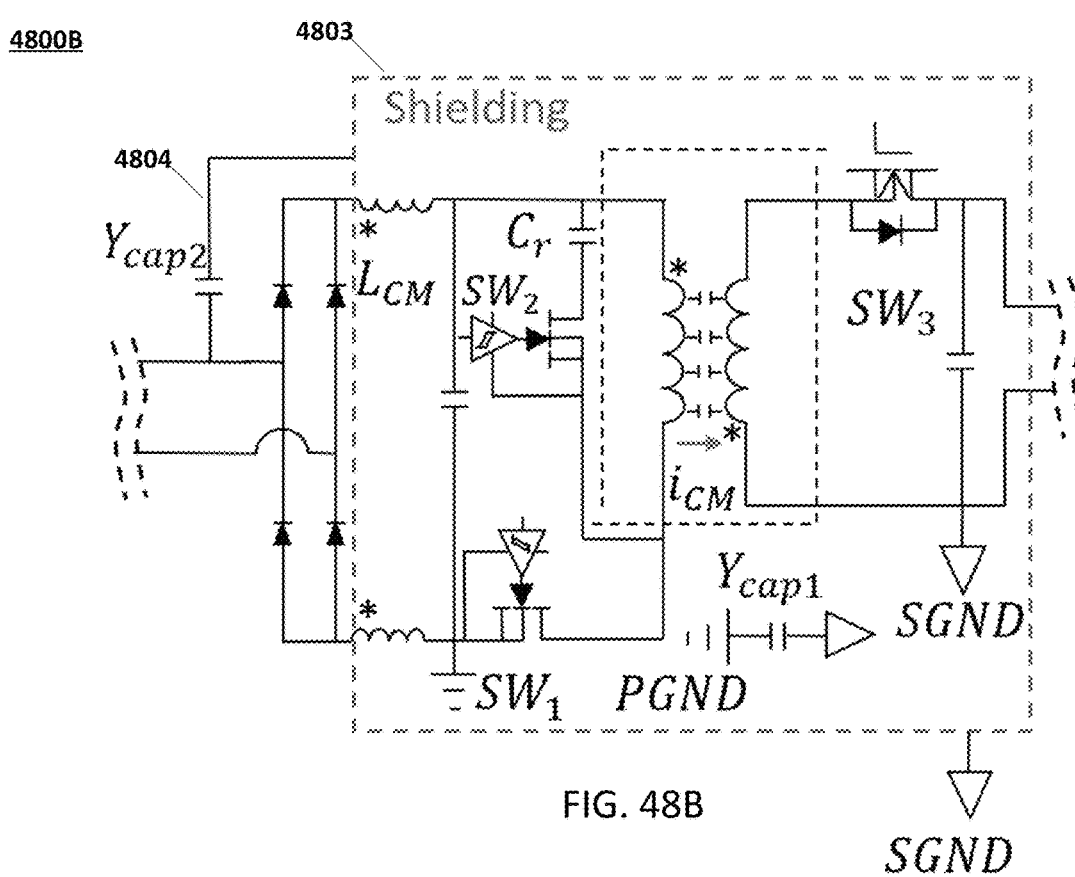
Figure 48C:
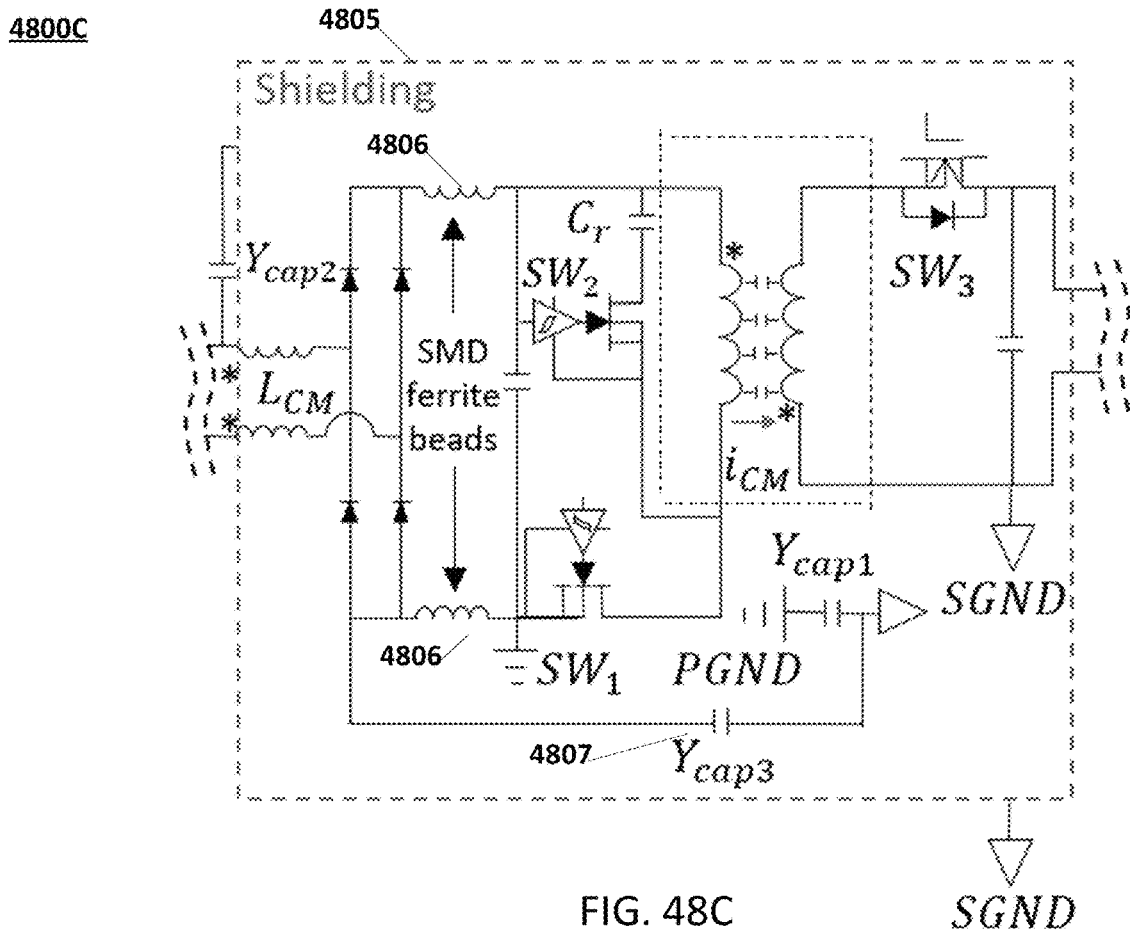

FIGS. 48A, 48B and 48C illustrate example topology variations with CLC shielding CM EMI filters, according to various embodiments of the present disclosure. Shown in FIG. 48A, an example CLC shielding CM EMI filter topology 4800A includes shielding 4801 and Ycap2 4802. It will be appreciated that the shielding 4801 can be applied to either part of or the entirety of the converter. Shown in FIG. 48B, an example CLC shielding CM EMI filter topology 4800B includes shielding 4803, a different placement of $L_{CM}$, and Ycap2 4804 is connected to the DC side in 4800B. Shown in FIG. 48C, an example CLC shielding CM EMI filter topology 4800C includes shielding 4805, an increase in filter stages by way of ferrite beads 4806 to the L and N lines on the DC side, and another set of Y-caps (Ycap3 4807) before the SMD ferrite beads 4806.

Figure 49A:
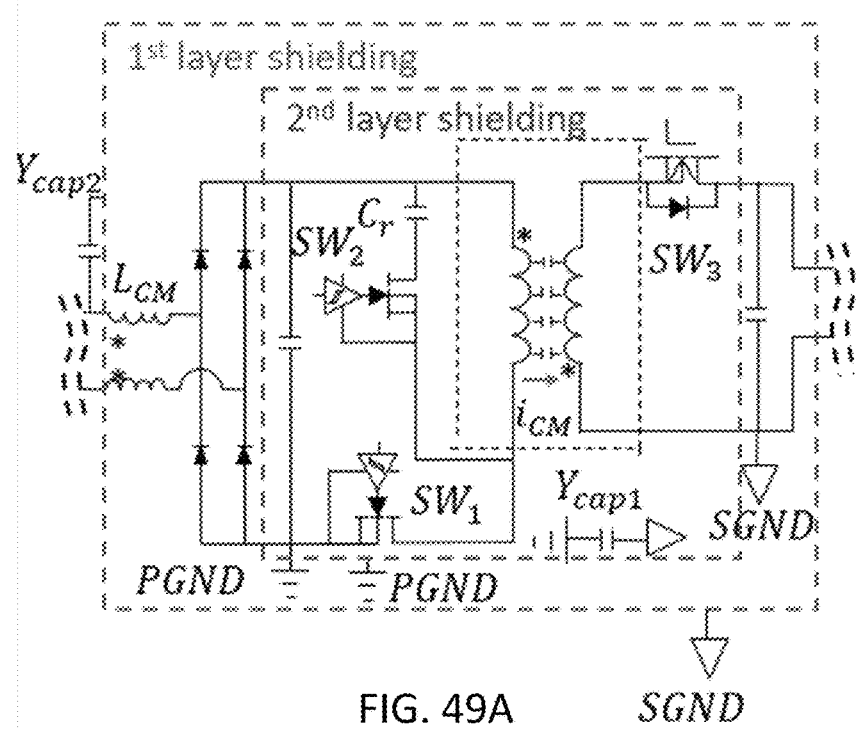
FIGS. 49A, 49B, 49C illustrate example topology variations with multi-stage shielding CM EMI filters, according to various embodiments of the present disclosure.
Figure 49B:
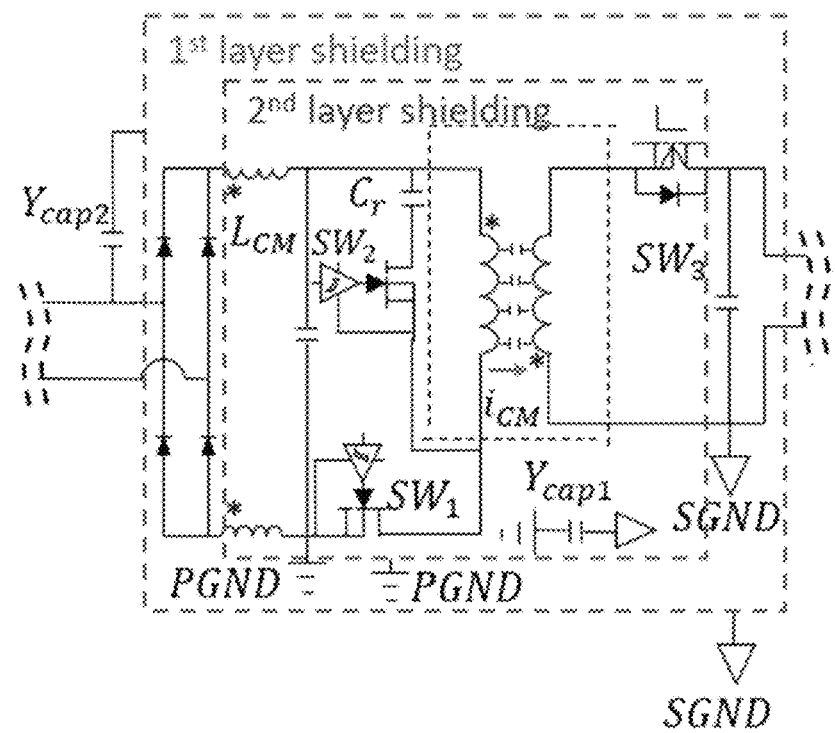
Figure 49C:
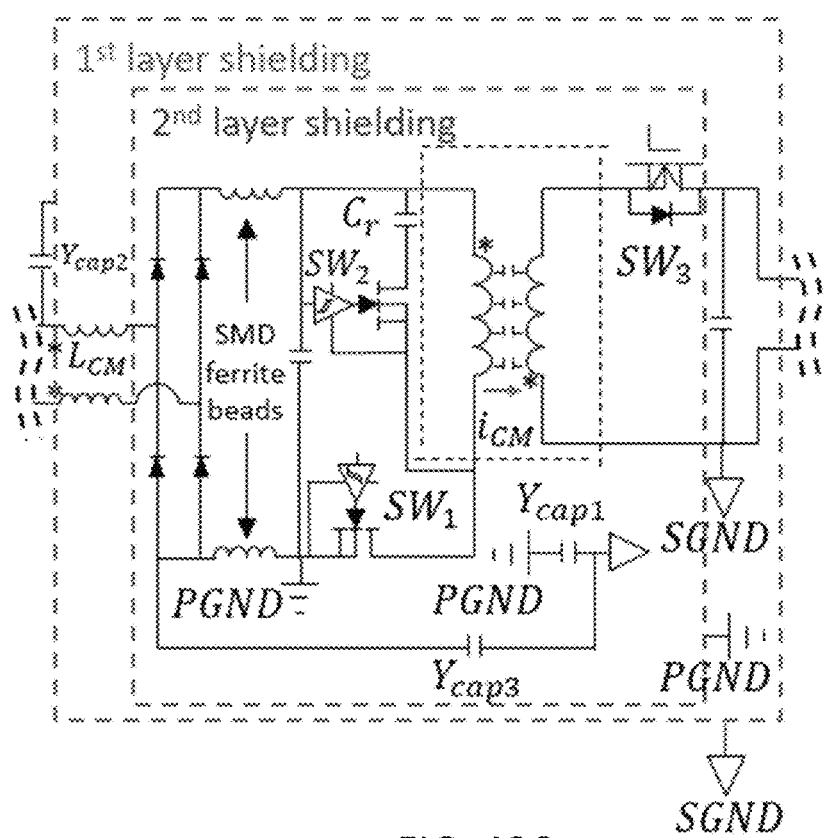

FIG. 49A, 49B, 49C illustrate example topology variations with multi-stage shielding CM EMI filters, according to various embodiments of the present disclosure. Shown in FIGS. 49A-49C, multiple shielding layers may be applied. For example, in FIGS. 49A-49C, a second shielding layer is added inside a first shielding layer. The second shielding layer can be connected to either PGND or SGND. It will be appreciated that more than two shielding layers can be utilized in embodiments herein without departing from the scope of the present disclosure.

Figure 50A:
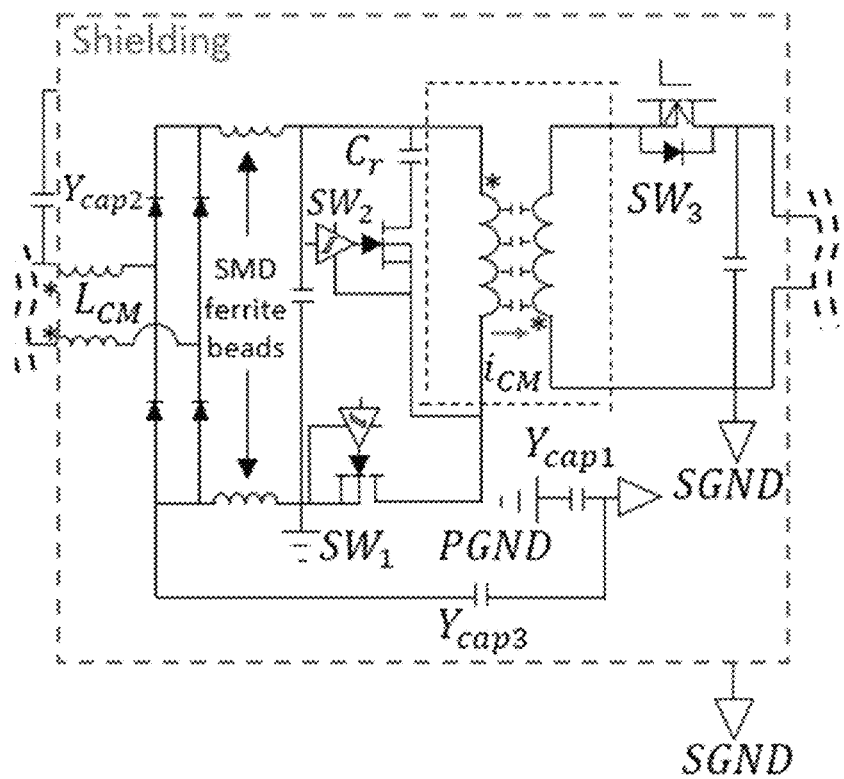
FIGS. 50A and 50B illustrate an analysis of circuit parameters associated with an example multi-stage shielding CM filter, according to embodiments of the present disclosure.
Figure 50B:
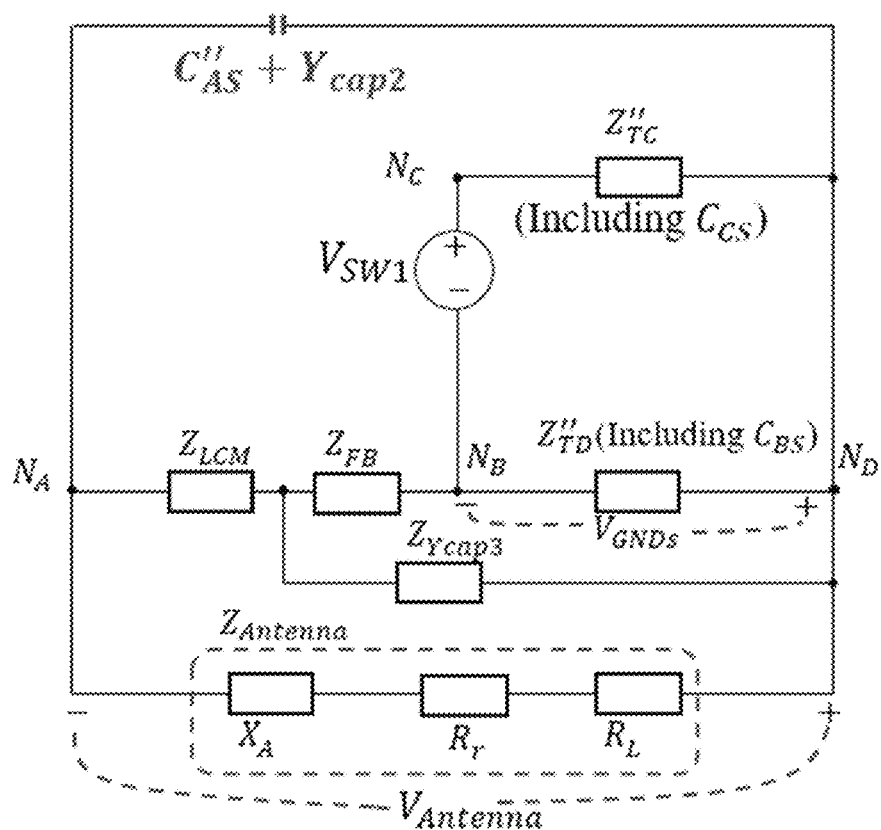

FIGS. 50A and 50B illustrate an analysis of circuit parameters associated with an example multi-stage shielding CM filter, according to embodiments of the present disclosure. In FIG. 50A, an example multi-stage shielding CM EMI filter similar to the embodiment presented in FIG. 48C is shown with a first layer of shielding. In FIG. 50B, a radiated EMI model of the multi-stage shielding CM EMI filter is presented. Based on an analysis of circuit parameters associated with FIGS. 50A and 50B: 1) there exists a small impedance of $Z_{Ycap1}$, $Z_{Ycap2}$, $Z_{Ycap3}$ (<<100Ω in (30 MHz, 200 MHz); 2) there exists high impedance of $Z_{LCM}$ (>>100Ω in (30 MHz, 200 MHz); and 3) there exists high impedance of ZAntenna (overall>100Ω in (30 MHz, 200 MHz). Accordingly, a $Z_{FB}$>100Ω in (30 MHz, 200 MHz) is desirable.

Figure 51:
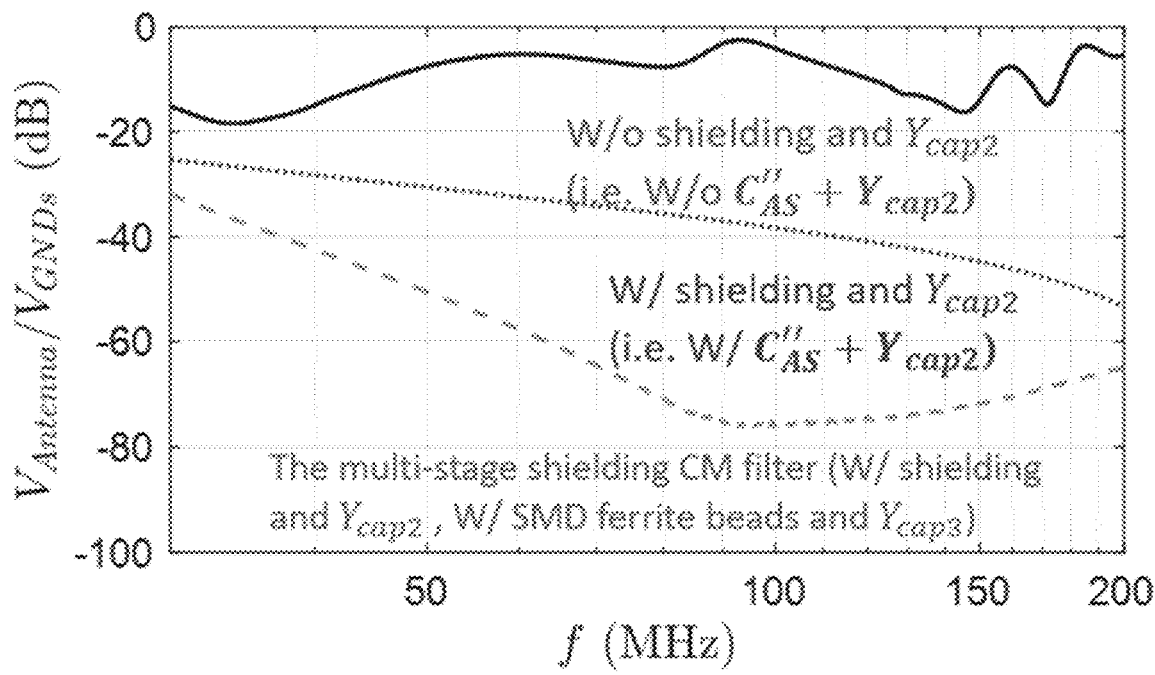
FIG. 51 illustrates a noise transfer gain reduction analysis, according to embodiments of the present disclosure.

FIG. 51 illustrates a noise transfer gain reduction analysis, according to embodiments of the present disclosure. Shown in FIG. 51, the noise transfer gain is reduced with application of an example CLC shielding CM EMI filter (e.g., as shown in FIGS. 48A-48C). Further, the noise transfer gain is shown as reduced in FIG. 51 with application of an example multi-stage shielding CM filter (e.g., as shown in FIGS. 49A-49C).

Figure 52:
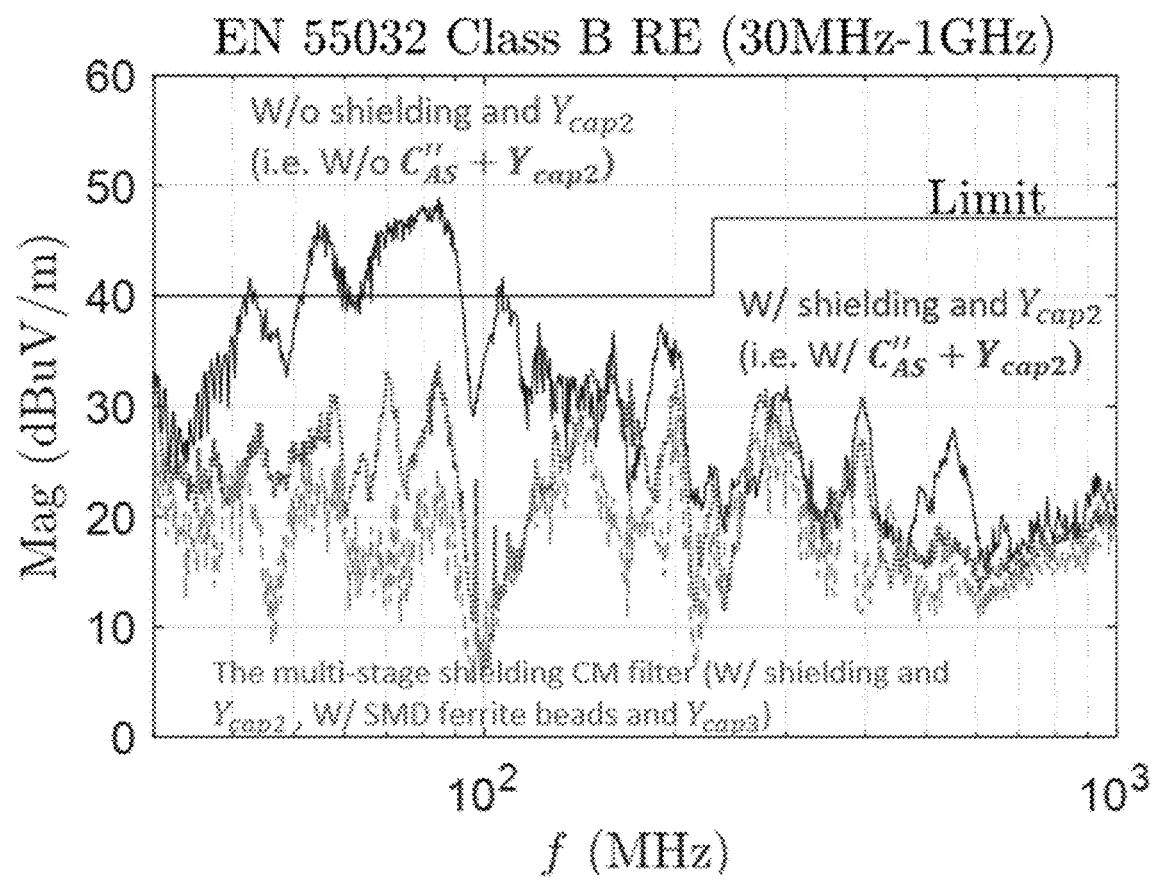
FIG. 52 illustrates a radiated EMI reduction analysis, according to embodiments of the present disclosure.

FIG. 52 illustrates a radiated EMI reduction analysis, according to embodiments of the present disclosure. Shown in FIG. 52, radiated EMI is reduced even further with the multi-stage shielding CM EMI filter applied (e.g., as shown in FIGS. 50A-B).

Figure 53A:
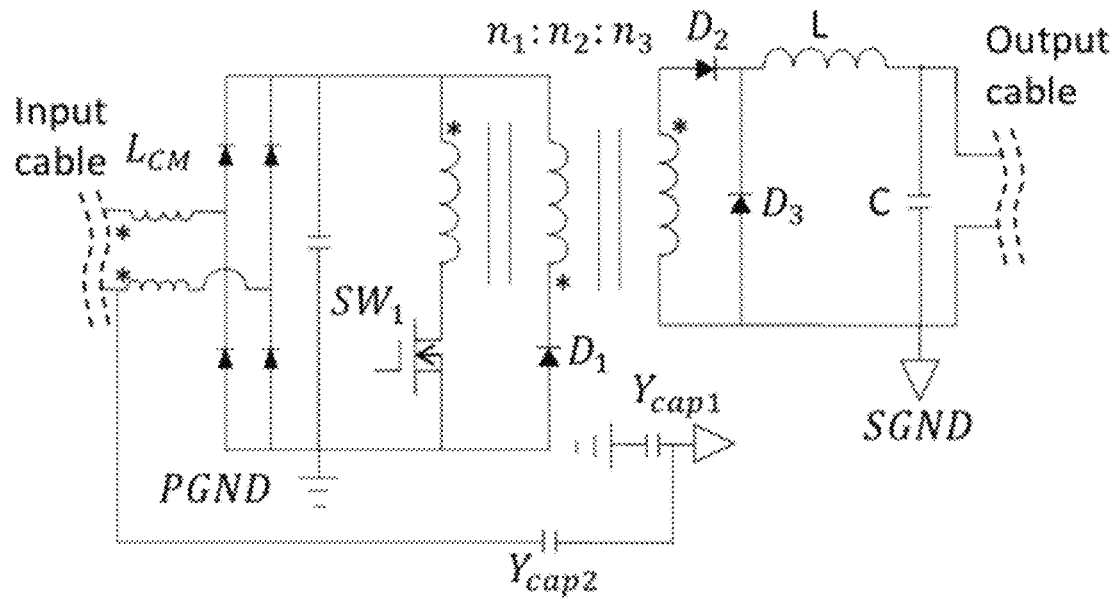
FIGS. 53A and 53B illustrate example applications of example CLC pi-type CM EMI filters and multi-stage CM EMI filters disclosed herein, for use in various embodiments of the present disclosure.
Figure 53B:
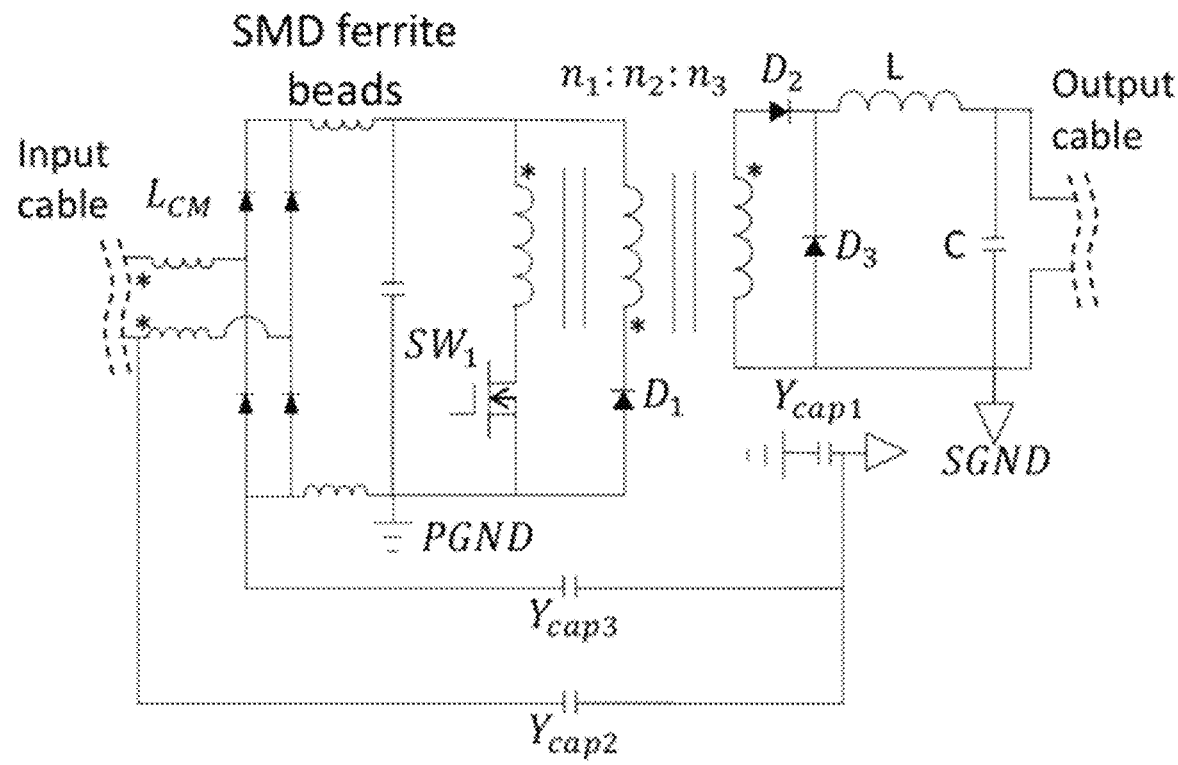

FIGS. 53A and 53B illustrate example applications of example CLC pi-type CM EMI filters and multi-stage CM EMI filters disclosed herein, for use in various embodiments of the present disclosure. For example, in FIG. 53A, an example CLC pi-type CM EMI filter according to embodiments herein is applied to a forward power converter. In FIG. 53B, an example multi-stage CM EMI filter according to embodiments herein is applied to a forward power converter. It will be appreciated that the example CLC pi-type CM EMI filters herein and the multi-stage CM EMI filters herein can be applied universally to other power converters including isolated power converters and non-isolated power converters. For example, but not limited to, in isolated power converters (e.g., forward power converters, push-pull power converters, LLC resonant power converters, dual active bridge power converters) and other power converters. It will be appreciated that the techniques herein and their variations reduce the radiated EMI of power converters.

Figure 53C:
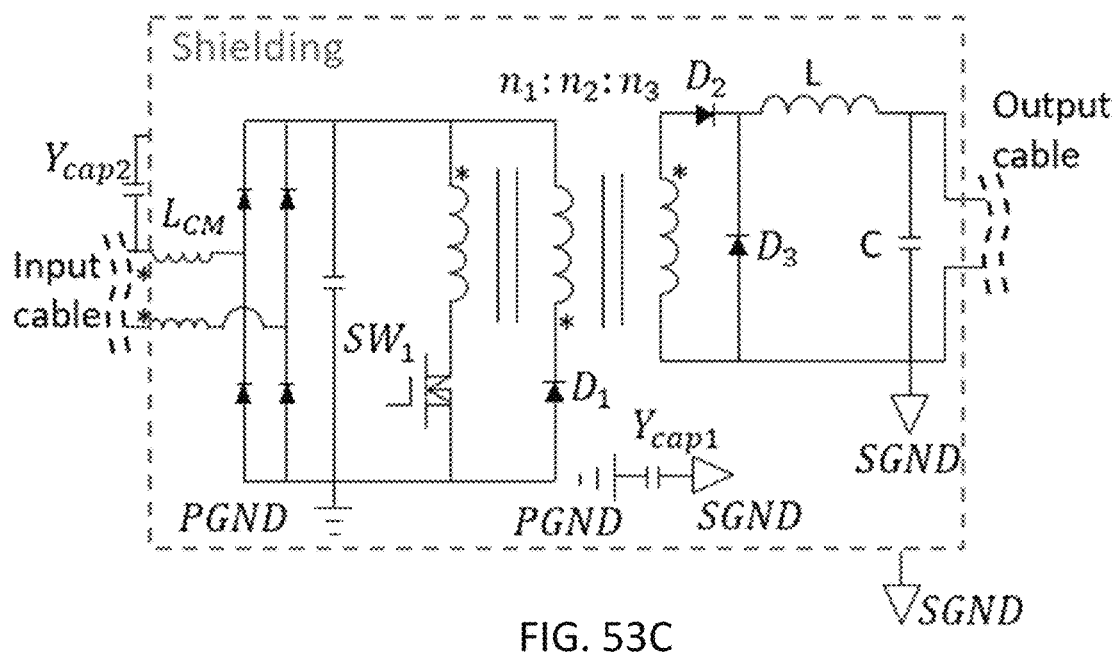
FIGS. 53C and 53D example applications of example CLC shielding CM EMI filters and multi-stage shielding CM EMI filters disclosed herein, for use in various embodiments of the present disclosure.
Figure 53D:
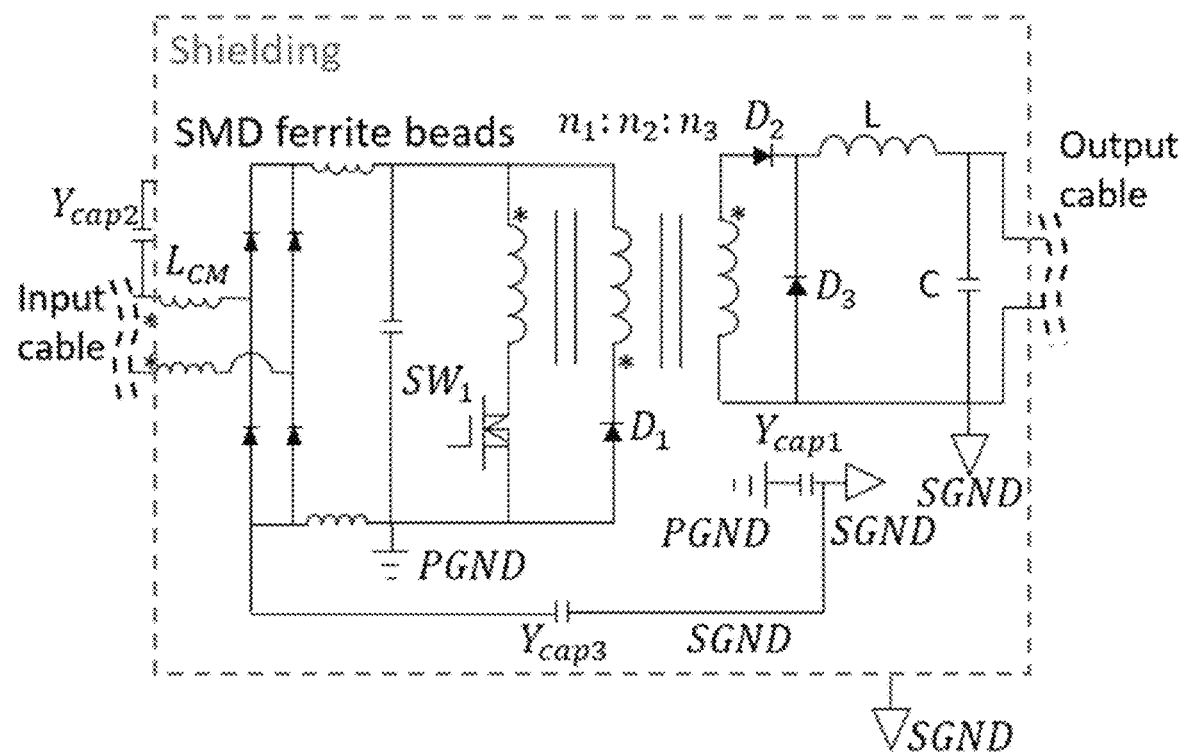

FIGS. 53C and 53D example applications of example CLC shielding CM EMI filters and multi-stage shielding CM EMI filters disclosed herein, for use in various embodiments of the present disclosure. For example, in FIG. 53C, an example CLC shielding CM EMI filter according to embodiments herein is applied to a forward power converter. In FIG. 53D, an example multi-stage shielding CM EMI filter according to embodiments herein is applied to a forward power converter. It will be appreciated that the example CLC shielding CM EMI filters herein and the multi-stage shielding CM EMI filters herein can be applied universally to other power converter topologies without limitation and without departing from the scope of the present disclosure (e.g., forward power converters, push-pull power converters, LLC resonant power converters, dual active bridge power converters, and the like).

Embodiments herein present a radiated EMI model for an active clamp flyback converter employing GaN switching devices. For the radiated EMI analysis, the switching transformer and the parasitic impedances between the primary and secondary sides can be modeled with two impedances; the impedance of a diode bridge can be ignored no matter it is in on or off status; the capacitive couplings between pulsating voltage nodes and the input and output cables are critical to radiated EMI. Based on the developed model, an improved whole converter shielding technique is presented herein to greatly reduce the capacitive couplings and the radiated EMI. Both theoretical analyses and experiments were conducted to validate the proposed modeling and EMI reduction techniques.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An electromagnetic interference (EMI) filter for reducing radiated EMI in power converters, the EMI filter comprising:
   a common mode (CM) choke located on an input cable connected to a first side of a converter, wherein the converter is connected to an output cable on a second side of the converter;
   a first set of Y-capacitors located between a primary ground (PGND) node of the converter and a secondary ground (SGND) node of the converter; and
   a second set of Y-capacitors located between the first side of the converter and the SGND node, wherein the first side of the converter comprises an AC side of the converter, wherein a first node on the input cable to which the second set of Y-capacitors are connected is farther away from the converter than a second node on the input cable to which the CM choke is connected.

2. The EMI filter of claim 1, wherein one or more of the first set of Y-capacitors or the second set of Y-capacitors comprise a safety capacitor.

3. The EMI filter of claim 1, further comprising a first shielding connected to the SGND node.

4. The EMI filter of claim 3, wherein the first shielding comprises one or more of a metal foil or a copper foil.

5. The EMI filter of claim 3, further comprising one or more additional shieldings inside the first shielding and connected to one of the PGND node or the SGND node.

6. The EMI filter of claim 5, wherein the one or more additional shieldings comprise one or more of a metal foil or a copper foil.

7. The EMI filter of claim 1, wherein the converter comprises one or more of an isolated converter, an LLC resonant power converter, a Flyback converter, a forward converter, or a push-pull power converter.

8. The EMI filter of claim 1, wherein the first set of Y-capacitors and the second set of Y-capacitors are connected to a DC side of the converter, and wherein the CM choke is located on the AC side of the converter, instead of on the input cable.

9. The EMI filter of claim 1, further comprising:
   an added filter stage located on a DC side of the converter; and
   a third set of Y-capacitors located between the SGND node and the added filter stage.

10. The EMI filter of claim 9, wherein the added filter stage comprises one or more ferrite beads.

11. The EMI filter of claim 9, wherein the added filter stage is located on L and N lines of the DC side of the converter.

12. The EMI filter of claim 9, wherein the third set of Y-capacitors comprise a safety capacitor.

13. The EMI filter of claim 9, further comprising a third shielding connected to the SGND node.

14. The EMI filter of claim 13, wherein the third shielding comprises one or more of a metal foil or a copper foil.

15. The EMI filter of claim 13, further comprising one or more additional shieldings inside the third shielding and connected to one of the SGND node or the PGND node.

16. Th EMI filter of claim 15, wherein the one or more additional shieldings comprise one or more of a metal foil or a copper foil.

17. The EMI filter of claim 9, wherein the converter comprises one or more of an isolated converter, an LLC resonant power converter, a Flyback converter, a forward converter, or a push-pull power converter.

18. A method of reducing radiated EMI in power converters, the method comprising:
   inserting a common mode (CM) choke on a first side of a converter, wherein the CM choke is located on an input cable connected to first side of the converter, wherein the first side of the converter comprises an AC side of the converter, wherein the converter is connected to an output cable on a second side of the converter;
   inserting a first set of Y-capacitors between a primary ground (PGND) node of the converter and a secondary ground (SGND) node of the converter; and
   inserting a second set of Y-capacitors between the AC side of the converter and the SGND node, wherein a node on the input cable to which the second set of Y-capacitors are connected is farther away from the converter than a node to which the CM choke is connected.

19. The method of claim 18, further comprising:
   inserting the first set of Y-capacitors and the second set of Y-capacitors on a DC side of the converter; and
   inserting the CM choke on the AC side of the converter.

20. The method of claim 18, further comprising:
   adding a filter stage located to a DC side of the converter; and
   adding a third set of Y-capacitors located between the SGND node and the added filter stage.

21. The method of claim 18, wherein the third set of Y-capacitors comprise a safety capacitor.

22. The method of claim 18, further comprising:
   adding a first shielding connected to the SGND node.

23. The method of claim 22, wherein the first shielding comprises one or more of a metal foil or a copper foil.

24. The method of claim 22, further comprising adding one or more additional shieldings inside the first shielding and connected to one of the PGND node or the SGND node.

25. The method of claim 24, wherein the one or more additional shieldings comprise one or more of a metal foil or a copper foil.

26. The method of claim 18, wherein the converter comprises one or more of an isolated converter, an LLC resonant power converter, a Flyback converter, a forward converter, or a push-pull power converter.

* * * * *